US012300400B2

(12) United States Patent
Crichlow

(10) Patent No.: US 12,300,400 B2
(45) Date of Patent: May 13, 2025

(54) SYSTEMS AND METHODS FOR LOW LEVEL WASTE DISPOSAL

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 638 days.

(21) Appl. No.: 17/566,940

(22) Filed: Dec. 31, 2021

(65) Prior Publication Data

US 2022/0134397 A1 May 5, 2022

Related U.S. Application Data

(63) Continuation of application No. 17/519,055, filed on Nov. 4, 2021, now Pat. No. 11,517,949, and a (Continued)

(51) Int. Cl.

| | |
|---|---|
| ***G21F 9/34*** | (2006.01) |
| ***B09B 1/00*** | (2006.01) |
| ***E21B 41/00*** | (2006.01) |
| ***G21F 9/16*** | (2006.01) |
| ***G21F 9/24*** | (2006.01) |
| ***G21F 9/30*** | (2006.01) |
| *E21B 43/26* | (2006.01) |

(52) U.S. Cl.

CPC ................ *G21F 9/34* (2013.01); *G21F 9/165* (2013.01); *G21F 9/24* (2013.01); *G21F 9/304* (2013.01); *B09B 1/008* (2013.01); *E21B 41/005* (2013.01); *E21B 43/26* (2013.01)

(58) Field of Classification Search

CPC . G21F 9/304; G21F 9/24; G21F 9/165; G21F 9/34; B09B 1/008

See application file for complete search history.

(56) References Cited

U.S. PATENT DOCUMENTS 4,580,925 A * 4/1986 Matich ...................... B09B 1/00 588/259
5,387,741 A * 2/1995 Shuttle .................... B09B 1/008 588/259

(Continued)

OTHER PUBLICATIONS

Yakovlev, Grigorij, et al. "Cement based foam concrete reinforced by carbon nanotubes." (2006) (Year: 2006).*

(Continued)

*Primary Examiner* — Anthony J Zimmer
*Assistant Examiner* — Eric Scott Sherman
(74) *Attorney, Agent, or Firm* — Eric Kelly

(57) ABSTRACT

Open pit mine (OPM) structures are modified or built new for use in disposing of low-level radioactive/nuclear waste (LLW). A drainage system is added to the OPM to drain water, such as, but not limited to, rain water, out of a volume of the OPM and to a particular geologic zone located far below the OPM that is isolated away from the local water table. Cells are formed within the volume of the OPM that are configured to receive the LLW. Cells are added to the OPM from a bottom towards a top of the OPM. Void spaces around the LLW materials within the cells are filled in with a protective-medium to mitigate against radionuclide migration away from the LLW materials within the cells. The protective-medium may be a blend of carbon nanotubes and a foam cement slurry. The carbon nanotubes may be made from reacting ethylene with vermiculite.

20 Claims, 21 Drawing Sheets

200
205
211
403/405
302
305
301
302
301
305
403/405
105
211
209
223
223
223
NOT TO SCALE
213
209
207
407
411
401
409
303
409
303

Related U.S. Application Data continuation-in-part of application No. 17/068,724, filed on Oct. 12, 2020, now Pat. No. 11,339,611.

(56) References Cited

U.S. PATENT DOCUMENTS

| | | | |
|---|---|---|---|
| 6,495,116 | B1 | 12/2002 | Frederick |
| 7,384,520 | B2 | 6/2008 | Iijima et al. |
| 7,618,599 | B2 | 11/2009 | Sung-See |
| 8,192,714 | B2 | 6/2012 | Kazuchika |
| 8,202,504 | B2 | 6/2012 | Kazuchika |
| 11,053,123 | B2 | 6/2021 | Son |
| 11,059,009 | B2 | 6/2021 | Kyung |

OTHER PUBLICATIONS

Zhao, et al. "Large scale intercalated growth of short aligned carbon nanotubes among vermiculite layers in a fluidized bed reactor." Journal of Physics and Chemistry of Solids 71 (2010), 624-626. (Year: 2010).*

* cited by examiner

SYSTEMS AND METHODS FOR LOW LEVEL WASTE DISPOSAL

PRIORITY NOTICE

The present application claims priority under 35 U.S.C. § 120 to U.S. nonprovisional patent application Ser. No. 17/068,724 filed on Oct. 12, 2020, the disclosure of which is incorporated herein by reference in its entirety.

The present application claims priority under 35 U.S.C. § 120 to U.S. nonprovisional patent application Ser. No. 17/519,055 filed on Nov. 4, 2021, the disclosure of which is incorporated herein by reference in its entirety.

TECHNICAL FIELD OF THE INVENTION

The present invention relates in general to the disposal of low-level nuclear waste (LLW) in human-made or naturally occurring structures at or near the earth's surface; and specifically as to management, treatment, and/or disposal of the LLW produced during commercial, industrial, medical, research, and/or energy generation operations.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Low-level radioactive and/or nuclear waste may be abbreviated as "LLW" herein. LLW may be selected from one or more of the following thirteen (13) (or more) categories and/or types of radioactive/nuclear waste materials:

(1) materials, components, parts, structures, articles, and/or tools used in and/or contaminated by nuclear technology, trade, industry, and/or nuclear power generation (but not the nuclear fuel itself);

(2) irradiated components, pipes, and/or reactor hardware systems that are or have been in continual contact with highly radioactive water (for years or more) from the nuclear power generation industry;

(3) nuclear control rods from the nuclear power generation industry;

(4) poison curtains from the nuclear power generation industry;

(5) industrial products, byproducts, resins, sludges, filters, and/or other residual materials and chemicals derived from cleansing the water that circulates around the irradiated nuclear fuel in the reactor vessel(s) and in the fuel pool(s), which holds the irradiated fuel when it is removed from the core;

(6) contaminated hand tools, components, piping, and other equipment from nuclear power plants and other nuclear industries;

(7) materials, components, parts, structures, articles, and/or tools from decommissioned and/or torn down (broken down) nuclear power plants (but not the nuclear fuel itself);

(8) research equipment from laboratories where radioactive materials are used;

(9) resins and filter materials used to clean water at a nuclear power plants;

(10) clothing, shoe covers, lab coats, cleaning cloths, paper towels, and/or the like, used when working with radioactive material, such as during refueling of a nuclear power plant;

(11) medical containers, syringes, cloth, paper, fluids, and equipment in contact with radioactive materials used in hospitals, medical facilities, laboratories, research centers, and/or the like;

(12) sampling device equipment used to test for airborne radioactive contamination;

(13) waste fluids from radioactive material operations;

portions thereof; combinations thereof; and/or the like.

However, note that LLW is not: high-level radioactive/nuclear waste (HLW); irradiated nuclear fuel; uranium, thorium and/or other ore tailings or waste from extraction and/or concentration for radioactive ore source material content; weapons grade plutonium (WGP); portions thereof; combinations thereof; and/or the like.

Depleted uranium may be disposed of as low-level radioactive waste LLW if the deplete uranium is converted to chemically stable uranium oxide compounds, such as, but not limited to, triuranium octoxide ($U_3O_8$) and/or uranium dioxide ($UO_2$), which are similar to the chemical form of natural uranium.

For example, from the nuclear power industry, irradiated components and pipes, and reactor hardware systems in continual contact with highly radioactive water for years may be examples of LLW. These systems become "activated" or radioactive from bombardment by neutron activity during power generation operations.

Additionally, nuclear control rods regulate and stop the nuclear reactions in the reactor core and are examples of LLW.

Poison curtains, which are used in nuclear power operations, absorb neutrons from the water in the reactor core and irradiated fuel storage pool, and are examples of LLW.

Industrial products and byproducts, resins, sludges, filters and/or other residual materials and chemicals derived from cleansing the water that circulates around the irradiated fuel in the nuclear reactor vessel and in the fuel pool, which holds the irradiated fuel when it is removed from the core, are examples of LLW.

For example, specifically, a large volume of LLW is generated in the nuclear power operations industry at final plant decommissioning and shutdown. The complete nuclear power plant physical infrastructure structure needs to be demolished and be disposed safely. For example, a typical 1,000-megawatt nuclear reactor building system and accessory materials may require more than 13,000 tons of contaminated concrete and structural materials—most of which may be LLW. This material has to be rubblelized into hundreds of thousands of cubic feet of waste, which may be LLW. In addition, over 1,400 tons of contaminated reinforcing steel bar has to be safely and securely dismantled and disposed of in LLW disposal sites.

In general operations, highly radioactive and long-lived nuclear reactor wastes may be included in the LLW category along with the much less concentrated and generally much shorter-lived wastes from medical treatment and diagnosis and some types of scientific research.

In addition, the nuclear industry and government commonly describe LLW in terms of volume. Normally, there may be a tremendous concentration of radioactivity in a small LLW package and conversely a small concentration may exist in a big LLW package depending on the LLW source.

A unit of measurement of radioactivity is the "curie" (Ci) wherein a curie (Ci) indicates how much radioactive energy is being emitted by the given radioactive source (waste). (One (1) curie may be about 37,000,000,000 or 37 billion disintegrations or radioactive emissions per second from a radioactive source material).

Note, a comparative range in radioactivity of various wastes and materials varies. Radioactivity is typically expressed in terms of "curies/gram" for soil-like materials as well as radioactive materials that are homogeneous in nature. However, because the inventories of some radioactive wastes are tracked in terms of "curies/cubic-meter" ($Ci/m^3$) that unit of measure is used herein.

A lowest end of the radioactivity scale is often represented by soils, as a source of natural background radiation. Radioactivity ranging from three (3) to forty (40) microcuries/cubic-meter ($\mu Ci/m^3$) may be attributed to potassium, thorium, and uranium in soils.

On average, LLW radioactivity ranges from 6.7 to 20 curies/cubic-meter ($Ci/m^3$) based on the inventory of disposal facilities; wherein a lower-limit is left undefined by regulation; but an upper limit is set at 7,000 curies/cubic-meter ($Ci/m^3$) based on specific constituents.

LLW may be classified and/or defined by various regulatory agencies. Additionally, by regulation, LLW is usually/often defined and graded into three classes (A, B, and C), according to waste radioactivity activity, concentration, and types of radioisotopes therein. It is noted that different agencies and different countries sometimes have different and contradictory definitions and classifications of LLW. Regulatory agencies usually set disposal requirements for each type, so that they are disposed of properly and safely. Class A (about 95% of all LLW) contains the lowest concentrations of radionuclides and the shortest half-lives. Classes B and C contain greater concentrations of radionuclides with longer half-lives and must meet stricter disposal requirements than Class A LLW waste. Greater than class C is yet another LLW definition class. The Greater than class C class has activity in excess of that reported in class C. One set of Class A, B, and C LLW definitions is as follows: Class A LLW may have a specific activity range from background level to 700 $Ci/m^3$, and usually consists of rubble, trash, soil, depleted uranium, mildly contaminated equipment, and clothing and usually requires no special containers for disposal; Class B LLW may have a specific activity range from 0.04 $Ci/m^3$ level to 700 $Ci/m^3$, and usually consists of reactor components, sealed radioactive sources, filters, devices and equipment from nuclear power plants and require containers for disposal that are stable for 300 years; and Class C LLW may have a specific activity range from 44 $Ci/m^3$ to 700 $Ci/m^3$, and usually consists of similar items to Class B but at higher activity levels and require special containers for disposal that are stable for 300 years and provide intrusion effective for up to 500 years.

In the U.S. in 2020 approximately 1.01 million cubic feet and 40 thousand curies of LLW were disposed that year. In the previous 15 years the average annual volume was 2.6 million cubic feet or about 60 acre-feet. (One (1) acre foot is a volume equal to one (1) acre in area and one (1) foot deep). In general, amounts of LLW needing proper disposal are significant. In general, it is predicted that there will be an increasing need to properly dispose of LLW in the future. The new LLW disposal systems and methods of LLW disposal presented, illustrated, shown, described, and discussed in this patent application are able to meet the demands of future LLW disposal volumes.

Volumetrically, LLW represents about 90% of all radioactive wastes. There are several LLW repositories operating around the world and described in the prior art references. Various prior art systems and methods have been suggested for LLW disposal. The prior art illustrates techniques for engineered disposal of LLW. The major prior art areas for LLW disposal are as follows:

(1) below human-made vaults (e.g., FIG. 1A);

(2) above-ground human-made vaults; (e.g., FIG. 1B);

(3) earth mounded human-made concrete bunkers (e.g., FIG. 1C);

(4) near surface excavations (e.g., FIG. 1D and FIG. 1E);

(5) existing mines; and (6) shallow large boreholes.

Each of these LLW prior art disposal techniques has been proposed for use and/or is in use in several countries worldwide. At least some of these LLW prior art systems are currently being used for storage of LLW in Canada, USA (U.S.), France, Belgium, West Germany, and various countries in Eastern Europe (e.g., Hungary with FIG. 1D).

Prior art vaults LLW disposal systems are human-made vault structures engineered to contain/dispose of LLW, see e.g., FIG. 1A through FIG. 1C. LLW prior art vaults for disposal may be below ground (e.g., FIG. 1A), above ground (e.g., FIG. 1B), and/or as a concrete bunker (e.g., FIG. 1C).

FIG. 1A shows a below-ground vault prior art LLW disposal system 100*a*. The vault 101 is located below a top layer 103 and the top layer 103 is located below the Earth's surface 105 (terrestrial surface 105) in an excavation zone 107. The vault 101 may be made from concrete (e.g., reinforced concrete) and may have various wall(s) 109. The vault 101 wall(s) 109 may include floor(s), ceiling(s), roof(s), and/or side-wall(s). The vault 101 may contain LLW 111. Storage in below ground vaults may be affected using drums or similar durable containers. The excavation zone 107 and/or the vault 101 may have an entryway 113 and/or a drainage system 115. Drainage system 115 is only capable of removing a relatively small amount of collected water. In large systems as contemplated herein this application larger wellbore systems are needed to dispose of significant volumes of collected waters in deep rock formations as is explained in detail below after this prior art discussion.

FIG. 1B shows an above-ground vault prior art LLW disposal system 100*b*. The vault 101 is located above the Earth's surface 105 (terrestrial surface 105). The vault 101 may be made from concrete (e.g., reinforced concrete) and may have various wall(s) 109. The vault 101 wall(s) 109 may include floor(s), ceiling(s), roof(s), and/or side-wall(s). The vault 101 may contain LLW 111. There is no drainage system in above ground vault prior art LLW disposal system 100*b*; rather, natural water disposal is expected and/or used. LLW 111 materials may be stored in drums or similar durable containers in above-ground vault prior art LLW disposal system 100*b*.

Prior art vault 101 LLW disposal systems have a variety of disadvantages. These prior art vaults 101 must be protected against flooding during construction and operations prior to disposal operations for the LLW. These prior art vaults 101 are not amenable to visual inspection and monitoring after closure of the given prior art vault 101. These prior art vaults 101 are not amenable to the use of remote handling equipment. Exposure of workers to radiation hazards in these prior art vault 101 systems could be high unless temporary covers or shields are used. The institutional control period is likely to be substantially longer than for other disposal options with prior art vault 101 systems for LLW disposal. (Institutional control period may mean that period of time in which the disposal facility license is transferred to the disposal site owner in compliance with the appropriate regulations for long-term observation and maintenance following the post-closure period.) Active maintenance requirements are likely to be more extensive and expensive than for other methods because of their exposure to the elements with prior art vault 101 systems for LLW disposal.

Below ground prior art vaults 101 (e.g., FIG. 1A) must be protected from degradation caused by corrosive soils.

Above ground vaults 101 (e.g., FIG. 1B) possess no secondary barrier to radionuclide release; and as such, insufficient time may be available for remedial actions, if required, before radionuclides leave site.

FIG. 1C shows an earth-mounded-concrete-bunker prior art LLW disposal system 100*c* (EMCB 100*c*). The vault 101 is located below a top layer 103 and the top layer 103 is located above the Earth's surface 105 (terrestrial surface 105) in an excavation zone 107. The top layer 103 may be earth substrates (e.g., soils and/or clays) that are mounded on top of the vault 101 upper and side exterior surfaces. The vault 101 may be made from concrete (e.g., reinforced concrete) and may have various wall(s) 109. The vault 101 wall(s) 109 may include floor(s), ceiling(s), roof(s), and/or side-wall(s). The vault 101 may contain LLW 111. The LLW 111 materials may be stored in drums or similar durable containers in EMCB 100*c*. The excavation zone 107 and/or the vault 101 may have an entryway 113 and/or a drainage system 115. Note, drainage system 115 may be very different from the water drainage system used in embodiments of the present invention, both structurally and functionally. For example, the drainage systems of various embodiments of the present invention may be designed and implemented to remove and dispose of very high volumes, e.g., tens of thousands of gallons per day, of water from rain, surface or other precipitation sources into deep rock formations.

In an earth-mounded-concrete-bunker prior art LLW disposal system 100*c* (EMCB 100*c*), a concrete bunker 101 may be covered by a layer of earth material 103, with the LLW 111 stored within the concrete bunker 101 (see e.g., FIG. 1C). The EMCB 100*c* may be at about or near the earth's surface 105. The prior art EMCB 100*c* has disadvantages. EMCB's 100*c* must be protected from flooding during construction and operation. With EMCB's 100*c* undesirably strict packaging requirements and LLW disposal sequencing requirements must be followed during operations. EMCB's 100*c* are not amenable to low volume or intermittent operations.

Prior art near surface excavations (e.g., FIG. 1D and FIG. 1E) have not been widely used and may have been used as emergency disposal means in times of need, intended to be temporary. An example of a prior art near surface excavations was the use of shallow near surface excavations in Chernobyl, Ukraine, to bury the carcasses of contaminated livestock and animals and then covering the shallow burial with cement slurry which hardened into a shallow monolith.

FIG. 1D shows a top-down view of a near-surface excavation prior art LLW disposal system 100*d*, used in Hungary. FIG. 1E shows a cross-sectional side view of a near-surface excavation prior art LLW disposal system 100*e*. A shallow excavation zone 107 is formed just below Earth (terrestrial) surface 105. That shallow formed excavation zone 107 is then filled with LLW 111; and then that placed LLW 111 is covered by top layer 103, which may be concrete in the form of wall 109 (i.e., wall 109 may be in the form of a concrete ceiling/roof/cap/cover that covers over the LLW 111). A bottom of the shallow formed excavation zone 107 is sometimes lines with wall(s) 109 to act as a floor, before the LLW 111 is emplaced into the shallow formed excavation zone 107. See e.g., FIG. 1D and/or FIG. 1E.

Prior art near surface excavations are easily affected by human-made activities and/or actions directly and/or indirectly. In addition, prior art near surface excavations may be of very limited and/or small volumetric capacities as compared to the very large comparable water drainage systems indicated in various embodiments of the present invention.

Various preexisting mined cavities have been used for LLW disposal. Prior art preexisting mined cavities for LLW disposal can have a variety of disadvantages. Not much can be done to enhance performance capabilities of existing mines to convert that preexisting mine for use in LLW disposal. The physical structure of the existing mine is what must be used "as is" for LLW disposal with very little ability to modify or change the mine structurally for use in LLW disposal. Construction of new mined space for LLW disposal would be quite expensive and very time consuming. Lack of physical access to the mine with LLW stored therein may create remedial action complications. Overall monitoring of LLW may be complicated by remote mine location and limited physical access. Mined cavity disposal is not amenable to the use of remote handling equipment for high activity LLW; and thus, worker exposure to radiation hazards may be high, particularly as the mine may have relatively narrow and confined work areas.

FIG. 1F shows an open-pit-mine (OPM) 100*f* prior art system from a top perspective view. OPMs are well-known and located all over the world, many in use and many abandoned. OPMs are generally inverted frustum (truncated) cone (cylindrical cones or other types of cones) shaped excavations carved out of various geologic formations 121 resulting in a region of void space/volume that has the general inverted conical frustum shape, often with terraced sides 123, access road(s) 125, and a bottom 127. When an OPM 100*f* is being formed, there is generally some desirable material (e.g., ore, minerals, and/or the like) in the materials being excavated (mined). Once a given OPM 100*f* is fully formed, it may be abandoned.

Prior art shallow disposal wellbores, implemented with large diameters are generally less than 150 feet deep and may have diameters ranging from six (6) feet to as large as ten (10) feet. These prior art shallow disposal wellbores systems have been historically proposed and/or used for LLW disposal. Prior art shallow large diameter wellbores for LLW disposal have several disadvantages. Minimization of void spaces, backfilling, and compaction are necessary to minimize settlement and long-term maintenance with prior art shallow large diameter wellbores for LLW disposal. With prior art shallow large diameter wellbores for LLW disposal, the disposal area cannot be exploited as fully as other methods because of the relatively low volume capacity of the holes (i.e., shallow large diameter wellbore) and the much higher volume of unused space surrounding each hole.

There is a need in the art for new systems and/or methods of LLW disposal that improve over the problems associated with the prior art LLW disposal systems; and/or that can accommodate disposal of the significant amounts of LLW being generated every year and into the future.

It is to these ends that the present invention has been developed.

BRIEF SUMMARY OF THE INVENTION

To minimize the limitations in the prior art, and to minimize other limitations that will be apparent upon reading and understanding the present specification, the present invention may describe open pit mine (OPM) structures are modified or built new for use in disposing of low-level radioactive/nuclear waste (LLW). Such a modified OPM may be referred to herein as a, "modified open pit repository" (MOPR). The OPM may generally have an inverted frustum (truncated) cone shape (and often with terraces sides). A drainage system is added to the OPM, to modify the OPM, to drain water, such as, but not limited to, rain water, out of a volume of the OPM and to a particular geologic zone ("water-dispersion-zone") located far below the OPM that is isolated away from the local water table. The OPM's drainage system may comprise one or more of: main-water-dispersion-wellbore(s) (located below the OPM); supplementary-water-collection-well(s) (located within the volume of the OPM); fluid-transport-zone(s); crushed rock and gravel layer(s)/pad(s); liner(s); sand/gravel filter(s); radial/injection wellbore(s); portions thereof; combinations thereof; and/or the like. Cells are formed within the volume of the OPM. These cells are configured to receive LLW materials. The cells are formed by use of vertical dividers and/or by use of horizontal cell-floor-ceiling-materials. Materials used to form a given cell (e.g., cell dividers and/or cell-floor-ceiling-materials) may be left in place and/or removed after cell formation/cell filling. Cells are added to the OPM from a bottom of the OPM towards a top of the OPM. Void spaces around the LLW materials within the cells is filled in with a protective-medium to mitigate against radionuclide migration away from the LLW materials within the cells. The protective-medium may be a blend of carbon nanotubes (CNTs) and a foam cement slurry. The carbon nanotubes (CNTs) may be made from reacting a carbon source with a catalyst. The carbon nanotubes (CNTs) may be made from reacting ethylene (e.g., as the carbon source) with vermiculite (e.g., as the catalyst).

The prior art embodiments have indicated that there are many deficiencies in the ways in which LLW is disposed around the world. The current patent application intends to minimize at least some to most of the prior art problems; and to define systems and/or methods to effectively dispose of and/or store LLW.

In light of the continued problems associated with the known (prior art) methods of disposing of LLW, it may be an object of some embodiments, to provide LLW disposal systems which may be sequestered in systems which are at the or near the earth's surface with relatively easy access.

Some embodiments may specifically address technical considerations, such as, but not limited to, disposal of LLW materials in systems in human-made repositories implemented in surface accessible geological formations. This patent application is directed at the utilization of these human-made systems for the disposal of a variety of LLW forms in the human-made excavated repositories of naturally occurring geologic formations.

It is an objective of the present invention to provide systems and/or methods that are configured and designed to dispose of LLW, wherein implementation of such disposal systems and/or methods may be configured and implemented by re-engineering existing or abandoned open pit mining (OPM) systems to dispose of LLW materials. OPMs are generally available worldwide. Existing OPMs may be converted into MOPRs (modified open pit repositories) configured for LLW disposal according to the teachings herein.

It is another objective of the present invention to provide systems and/or methods that are configured to dispose of LLW, wherein the systems and/or methods may accommodate relatively large quantities of LLW measured in the millions of pounds of LLW material, in the disposal site located there below/within a nominal surface area of a few square miles or less.

It is another objective of the present invention to provide systems and/or methods that are configured to dispose of LLW, wherein the systems and/or methods may accommodate large varieties of LLW materials, ranging all the way from cement construction LLW from nuclear power plant de-commissioning to hospital derived soft LLW items.

It is another objective of the present invention to provide systems and/or methods that are configured to dispose of LLW, wherein the disposal systems and/or methods may be located in areas which are arid, remote from human habitation, and may be relatively impervious to major weather variations and provide all-weather (all-year) operations without undue efforts.

It is another objective of the present invention to provide systems and/or methods that are configured to dispose of LLW, wherein the systems and/or methods may be able to dispose of relatively large quantities of rain water, such as, more than 1,000,000 gallons/day of rainwater or other types of water, that may inundate the disposal site during inclement weather or unforeseen surface events.

It is another objective of the present invention to provide systems and/or methods that are configured to dispose of LLW, wherein the disposal systems and/or methods may be located in areas which are accessible by a plurality of transportation means (e.g., motor vehicles, trains, planes, helicopters, boats, combinations thereof, and/or the like) without the need for additional infrastructure development.

It is another objective of the present invention to provide systems and/or methods that are configured to dispose of LLW, wherein the disposal systems and/or methods may be rapidly developed because of the prior "tenants" use, development, and operations in open pit mining (OPM) with heavy equipment and workable transportation systems.

It is another objective of the present invention to provide systems and/or methods that are configured to dispose of LLW, wherein the disposal systems and/or methods may repurpose preexisting (e.g., abandoned) open-pit-mines (OPMs) for LLW disposal operations.

It is another objective of the present invention to provide systems and/or methods that are configured to dispose of LLW, wherein the disposal systems and/or methods are designed to allow relatively easy field rework such as cleanouts, swabbing, systems updating, and reassignment of purpose in case of need or in the event of some accidental or natural consequence.

It is another objective of the present invention to provide radionuclide barrier systems and/or methods for the disposal of LLW.

It is another objective of the present invention to provide systems and/or methods that are configured to dispose of LLW, wherein the disposal systems and/or methods are designed and/or are configured to control groundwater problems encountered in disposing of a variety of radioactive material(s) in various/different waste forms.

It is another objective of the present invention to provide systems and/or methods that are configured to dispose of LLW, wherein the disposal systems and/or methods are designed and/or are configured to control and/or mitigate the dangerous effects of sediment accumulation in and around the LLW materials that are being disposed.

It is another objective of the present invention to provide systems and/or methods that can be configured such that infiltration rates are controlled and that drainage water from all sources are collected, transported, and gotten rid of with minimal operational problems without backup or flooding events.

It is another objective of the present invention to provide systems and/or methods that are configured to dispose of LLW, wherein the disposal systems and/or methods that can be configured to minimize bioturbation effects, reworking of soils and sediments by animals or plants, and their consequences; i.e., keeping animals and/or plants away from the given LLW disposal site.

It is another objective of the present invention to provide such systems and/or methods that are designed to dispose of LLW, wherein implementation of such systems and/or methods components provides for minimal radioactive contamination from the disposed LLW to the immediately surrounding environment/ecosystem by the use of selected preventative and protective media; which may include use of carbon nanotube materials.

It is another objective of the present invention to provide such systems and/or methods that are designed to dispose of LLW, wherein implementation of such systems and/or methods components provides for minimal radioactive contamination from the disposed LLW to site personnel by the use of selected preventative and protective media; which may include carbon nanotube materials.

It is another objective of the present invention to provide such systems and/or methods that are designed to dispose of LLW, wherein implementation of such systems and/or methods components may be effectively modelled to characterize the behavior and effectiveness of the radon barriers in use in the systems and/or methods.

It is another objective of the present invention to provide such systems and/or methods that are designed to dispose of LLW, wherein implementation of such disposal systems and/or methods may allow a variety of disposal "cell" geometries and capacities to be implemented in the disposal operations.

It is another objective of the present invention to provide such systems and/or methods that are designed to dispose of the LLW that are capable of accommodating varying natural water infiltration rates.

It is another objective of the present invention to provide systems and/or methods and that are configured to dispose of the LLW material(s) in manner that can accommodate and/or mitigate the effects of varying, but predetermined, amounts of sediment intrusion into the disposal site.

It is another objective of the present invention to provide methods and/or systems such that the LLW material(s) are disposed in manner that is largely/relatively unaffected by plant growth and/or plant intrusion into the given disposal site.

It is another objective of the present invention to provide systems and/or methods such that the systems and/or methods are configured to dispose of the LLW material(s) in manner in which radioactive migration is generally unaffected by pedogenic (soil changing) processes.

It is another objective of the present invention to provide systems and/or methods such that the disposal systems and/or methods are configured to dispose of the LLW material(s) in manner designed to meet the regulatory requirements (e.g., of minimal appropriate longevity by implementing stable disposal cells).

It is another objective of the present invention to provide systems and/or methods that are configured to dispose of LLW, wherein the systems and/or methods may maintain hydraulic conductivities such that the drainage water is rapidly injected into and disposed of, deep into the disposal rock formations and away from the disposal site.

It is another objective of the present invention to provide such systems and/or methods that are designed to dispose of LLW, wherein implementing such systems and/or methods requires minimal existing infrastructure and/or accessory upgrades.

It is another objective of the present invention to provide systems and/or methods that are designed to dispose of LLW, wherein implementation of such disposal systems and/or methods are largely/relatively unaffected by changes in environmental/ambient temperature and/or weather conditions from one extreme to another.

It is another objective of the present invention to provide systems and/or methods that are designed to dispose of LLW, wherein implementation of such disposal systems and/or methods may be configured and implemented that are unaffected by near surface aquifer situations (e.g., by use of protective wellbore casing(s)).

It is another objective of the present invention to provide methods that are designed to dispose of LLW, wherein implementation of such disposal systems and/or methods may be configured and/or implemented wherein the properties of the near surface geology (formations) do not affect the operation of the disposal system (e.g., surface rocks should be competent).

It is another objective of the present invention to provide systems and/or methods that are designed to dispose of LLW, wherein implementation of such disposal systems and/or methods may be configured and/or implemented that are largely/relatively unaffected by the properties of the embankment materials of the disposal site and do not affect the operation of the disposal system (e.g., wall embankments are less than or equal to 45 degrees [from vertical] and stay sloped).

It is another objective of the present invention to provide such systems and/or methods that are designed to dispose of LLW, wherein implementation of such disposal systems and/or methods may be configured and/or implemented that are largely/relatively unaffected by the potential for erosional changes in the area of disposal (e.g., disposal cells are stable; and/or means for intruding water to be rapidly dispersed).

It is another objective of the present invention to provide systems and/or methods that are configured and designed to dispose of LLW, wherein implementation of such disposal systems and/or methods may be configured and/or implemented such that the disposal systems and/or methods are unaffected by the changes in rainfall, intensity, rates, and durations during disposal and storage of the LLW materials (e.g., high-capacity water [rain] collection disposal wells of 1,000,000 gallons/day).

It is another objective of the present invention to provide systems and/or methods that are configured and designed to dispose of LLW, wherein implementation of such disposal systems and/or methods may be configured and/or implemented such that the exposure to groundwater is minimized or fully mitigated (e.g., via use of synthetic waterproof/hydrophobic layers, appropriate sloping, and/or use of water collection wells).

It is yet another objective of the present invention to provide systems and/or methods that are configured such that the components of the disposal systems and/or methods may be designed, manufactured, and/or delivered by relatively straightforward processes without the need for massive infusions of money and complex equipment systems—particularly as compared against prior art systems.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1G is prior art.

REFERENCE NUMERAL SCHEDULE

Figure 1A:
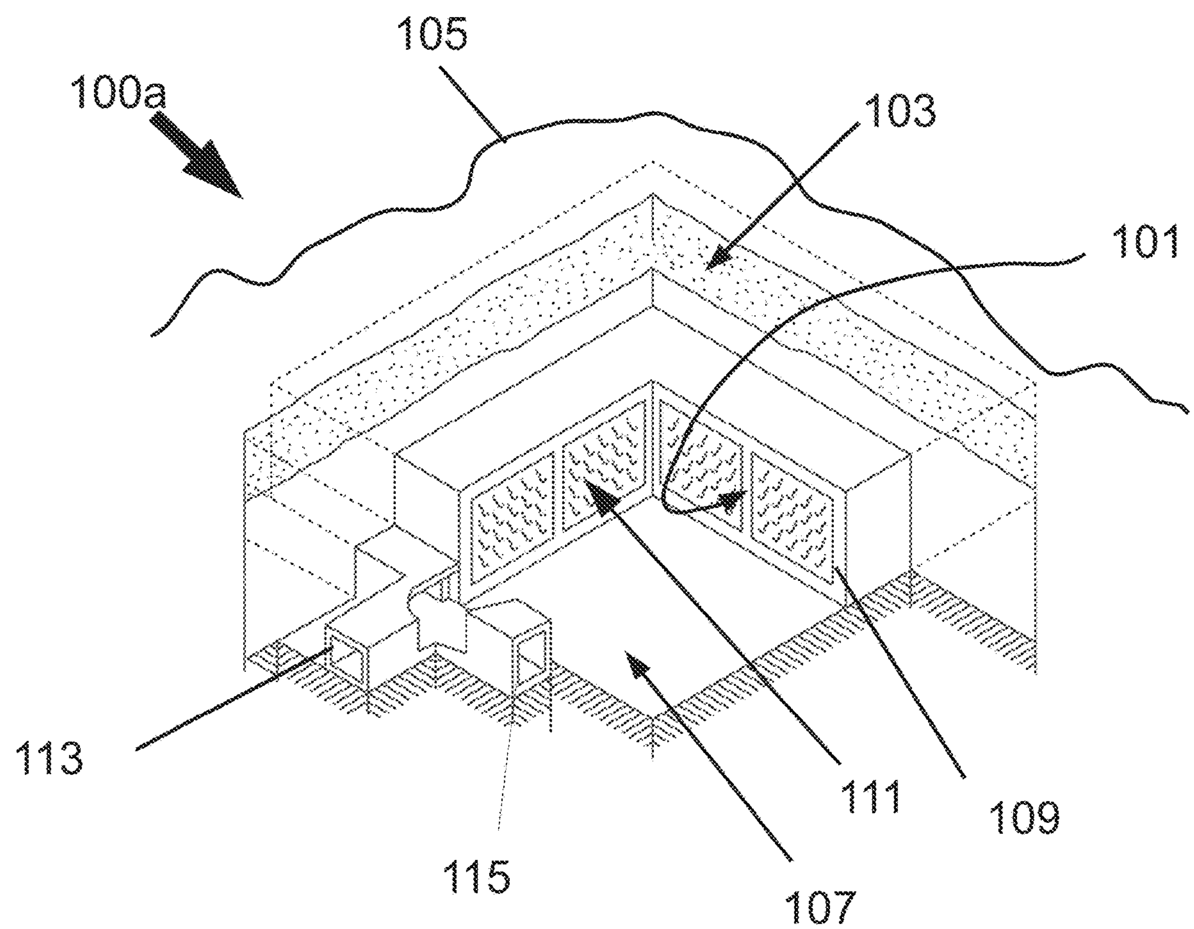
FIG. 1A shows a below-ground vault prior art low-level radioactive and/or nuclear waste (hereinafter, "LLW") disposal system.
Figure 1B:
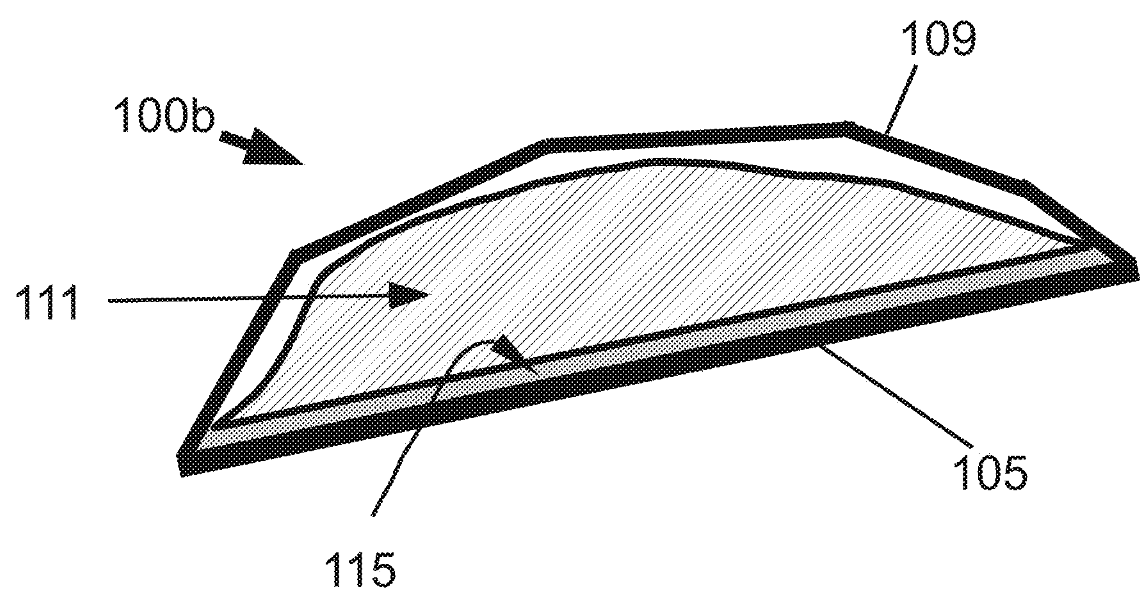
FIG. 1B shows an above-ground vault prior art LLW disposal system.
Figure 1C:
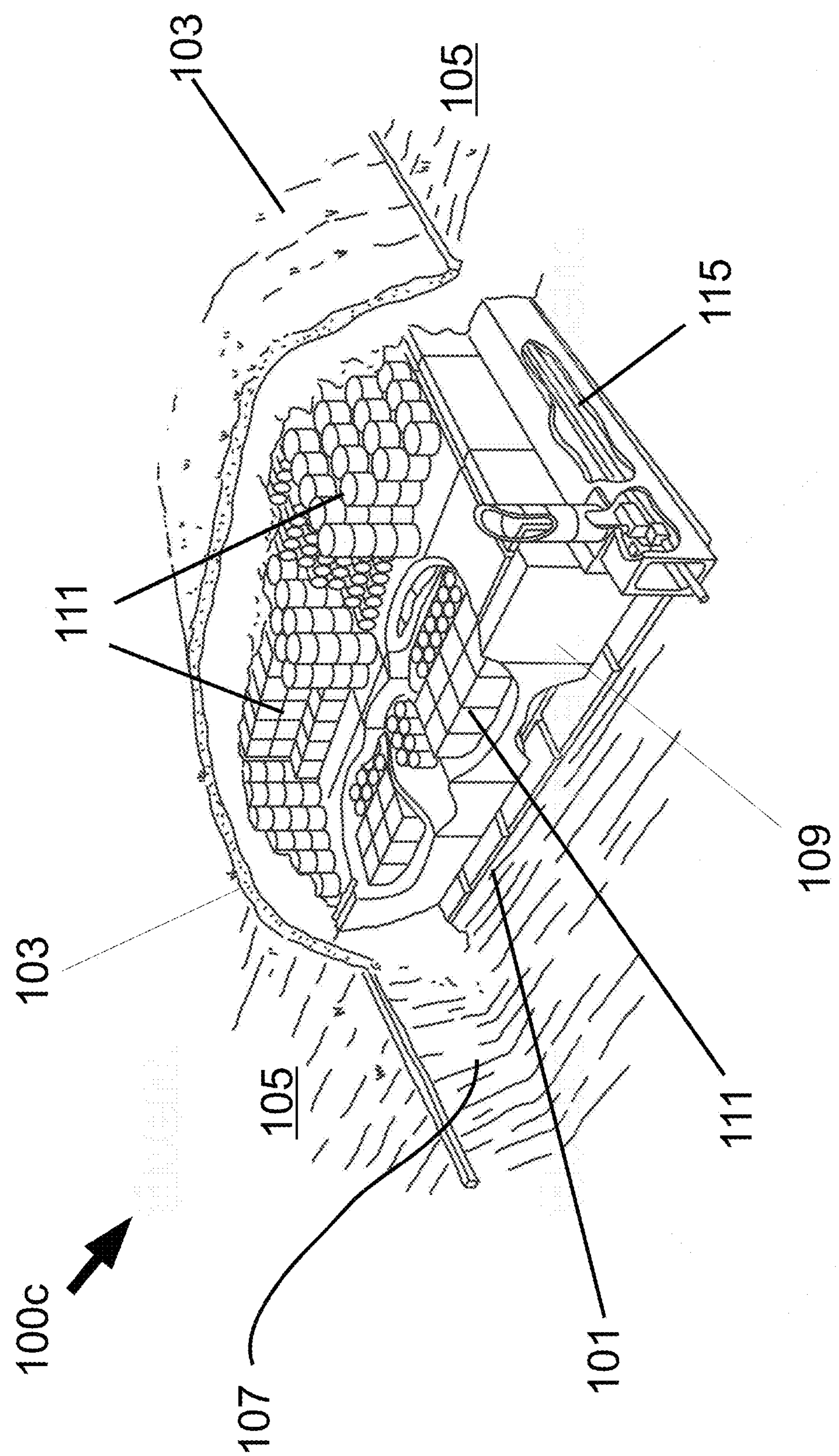
FIG. 1C shows an earth-mounded-concrete-bunker prior art LLW disposal system (EMCB).
Figure 1D:
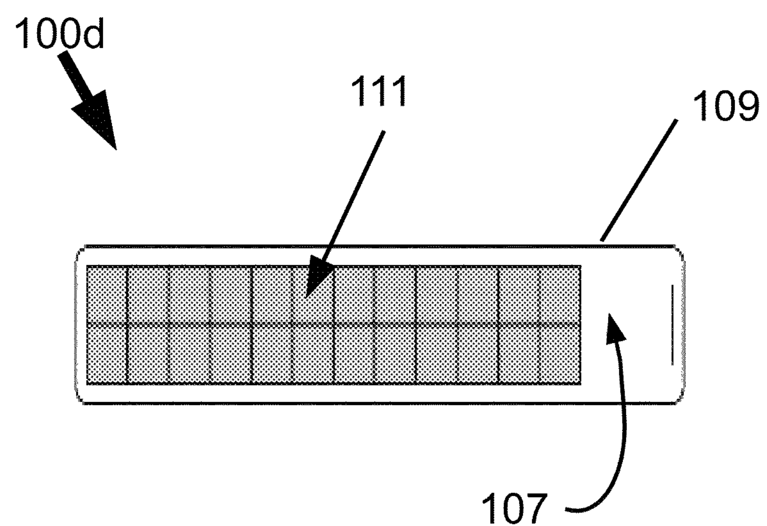
FIG. 1D shows a top-down view of a near-surface excavation prior art LLW disposal system, used in Hungary.
Figure 1E:
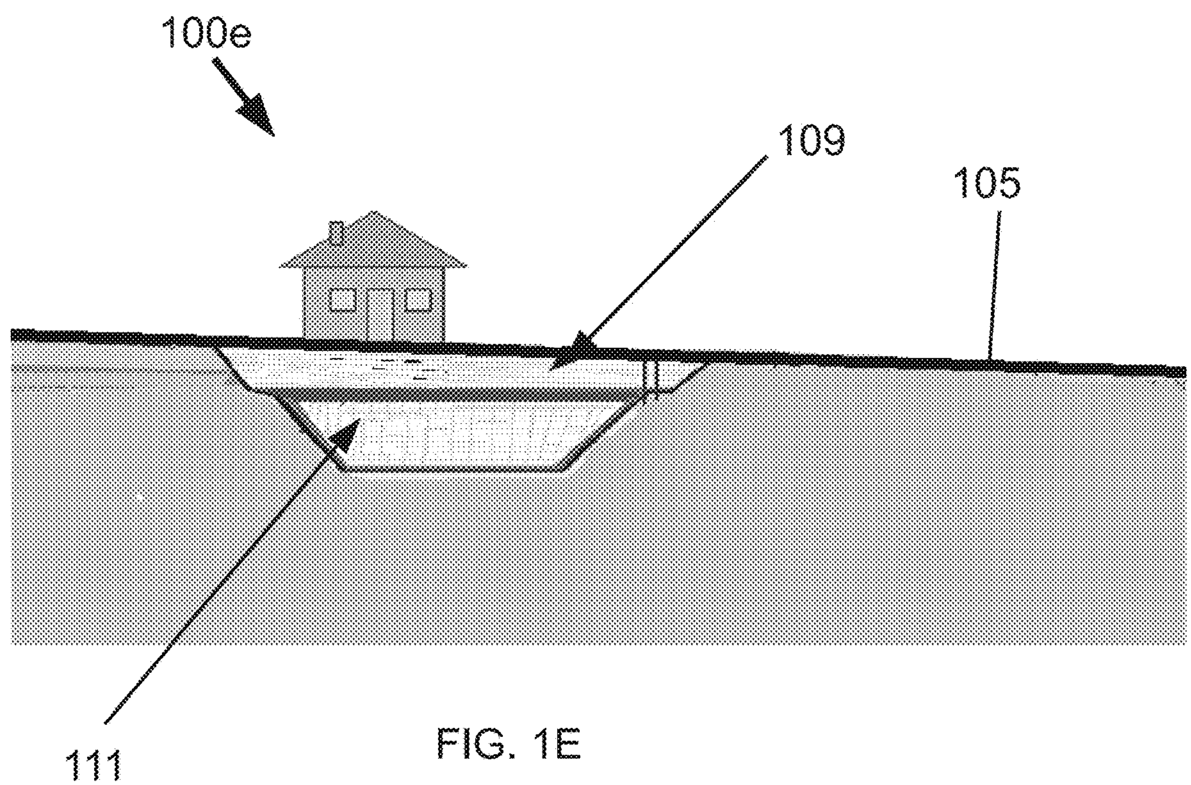
FIG. 1E shows a cross-sectional side view of a near-surface excavation prior art LLW disposal system.
Figure 1F:
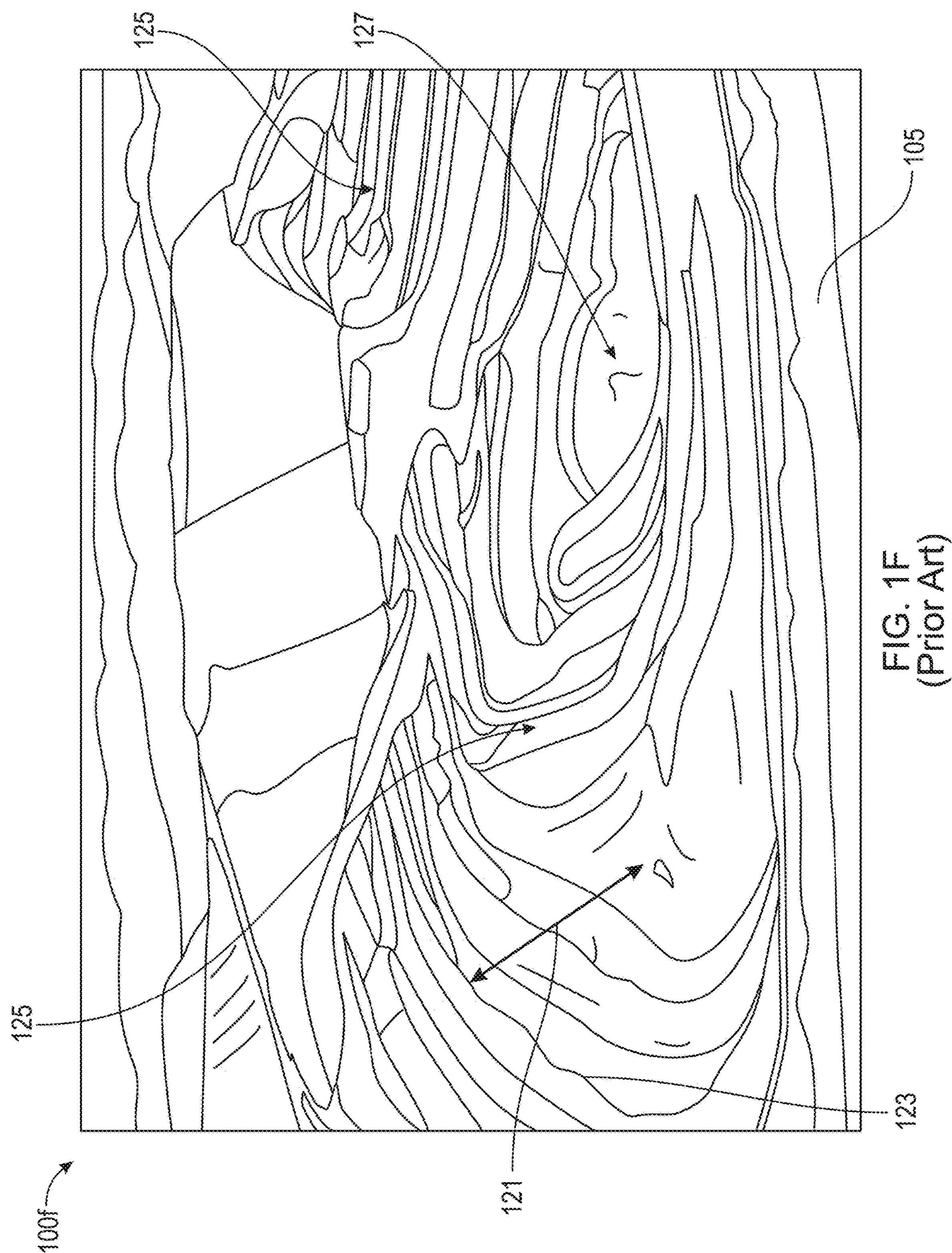
FIG. 1F shows an open-pit-mine (OPM) prior art system from a top perspective view.

**100*a* below-ground vault prior art LLW disposal system 100*a***
**100*b* above-ground vault prior art LLW disposal system 100*b***
**100*c* earth-mounded-concrete-bunker prior art LLW disposal system 100*c***
**100*d* near-surface excavation prior art LLW disposal system 100*d***
**100*e* near-surface excavation prior art LLW disposal system 100*e***
**100*f* open-pit-mine (OPM) prior art LLW disposal system 100*f***
101 vault 101
103 top layer 103
105 earth (terrestrial) surface 105
107 excavation zone 107
109 wall of vault 109
111 LLW 111
113 entryway 113
115 drainage system 115
121 geologic formation 121
123 side(s) 123
125 access road 125
127 bottom 127
131 crushed-drum 131
133 (uncrushed) drum 133
200 modified-open-pit-repository 200 (MOPR 200)
201 volume 201 (of open-pit-mine [OPM])
203 inverted conical frustum shape 203 (of open-pit-mine [OPM])
205 top 205 (of open-pit-mine [OPM])
207 bottom 207 (of open-pit-mine [OPM])
209 side(s) 209 (of inverted conical frustum shape 203)
211 access-road(s) 211 (of side(s) 209)
213 wellhead(s) 213
215 top-width 215 (of open-pit-mine [OPM])
217 bottom-width 217 (of open-pit-mine [OPM])
219 height 219 (of open-pit-mine [OPM])
221 excavation-zone 221 (of open-pit-mine [OPM])
223 geologic formation(s) 223 (of open-pit-mine [OPM])
301 LLW cell 301
302 divider(s) 302
303 radial-wellbore 303 (injection well 303)
305 supplementary-water-collection-well(s) 305
401 main-water-dispersion-wellbore 401
403 fluid-transport-zone 403
405 crushed rock and gravel layer/pad 405
407 sand/gravel filter 407
409 water-dispersion-zone 409
411 other-geologic-formation(s) 411 (not water-dispersion-zone 409)
501 LLW material 501

503 LLW material 503
505 protective-medium 505
601 cell-floor-ceiling-material 601
603 cell-width/length 603
605 cell-height 605
901 rain 901
903 water 903
905 water 905
907 water 907
913 liner 913
1001 carbon nanotubes 1001 (CNT 1001)
1003 vermiculite 1003
1100 method of providing water drainage to OPM 1100
1101 step of selecting and/or building OPM for LLW repository 1101
1103 step of designing for water drainage at OPM 1103
1105 step of constructing main-water-dispersion-wellbore(s) below OPM 1105
1107 step of constructing radial/injection wellbore(s) 1107
1109 step of constructing/placing supplementary-water-collection-well(s) 1109
1111 step of preparing and/or constructing fluid-transport-zone(s) 1111
1200 method of LLW disposal in MOPR 1200
1201 step of managing LLW repository 1201
1203 step of preparing for LLW disposal 1203
1205 step of selecting LLW cell type(s) 1205
1207 step of preparing protective-medium 1207
1209 step of executing LLW disposal operations 1209
1211 step of cessation of LLW disposal operations 1211
1300 method of preparing, organizing, and/or temporary storage of LLW materials 1300
1301 step of (temporary) warehousing LLW materials 1301
1303 step of sorting LLW materials 1303
1305 step of packing and/or transporting LLW materials 1305
1401 ethylene as carbon source 1401
1403 vermiculite as catalyst 1403
1405 react ethylene and vermiculite to form CNTs 1405
1407 select cement slurry formulation 1407
1409 select gas for use in foam cement slurry 1409
1411 form foam cement slurry 1411
1413 blend/mix CNTs with foam cement slurry to form protective-medium 1413

DETAILED DESCRIPTION OF THE INVENTION

In this patent application, "LLW" (low-level waste) refers to various types of low level radioactive and/or nuclear waste. Recall the discussion of LLW types in the previous/above "Background of the Invention" section.

In this patent application, "OPM" refers to an open pit mine, and may essentially be a single geological unit. "MOPR" refers to modified open pit repository and is an OPM that has been modified according to the teachings of this patent application (e.g., modified with the inclusion of various water drainage features and/or with LLW cells located within a volume of the OPM). The MOPR may include an OPM, a drainage system (that may be include structures below the OPM, such as various water delivery wellbore(s)), and/or LLW cells inside of a volume of the OPM.

In this patent application, radial-wellbore and injection-wellbore may be used interchangeably herein.

In terms of weight measurements, "mt" is an abbreviation for metric ton.

In this patent application, "CNT" refers to carbon nanotube material and "VAM" refers to vermiculite activated material. CNT, VAM, carbon nanotube, and/or vermiculite activated material may be used interchangeably herein.

In general, terminology used herein, particularly terminology associated/attached to a given reference numeral, may be intended to be descriptive, with the terminology naming used herein to suggest purpose, function, structure, and/or relationships.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Note, FIG. 1A through FIG. 1F are prior art and have been discussed above in the Background of the Invention section.

Figure 1G:
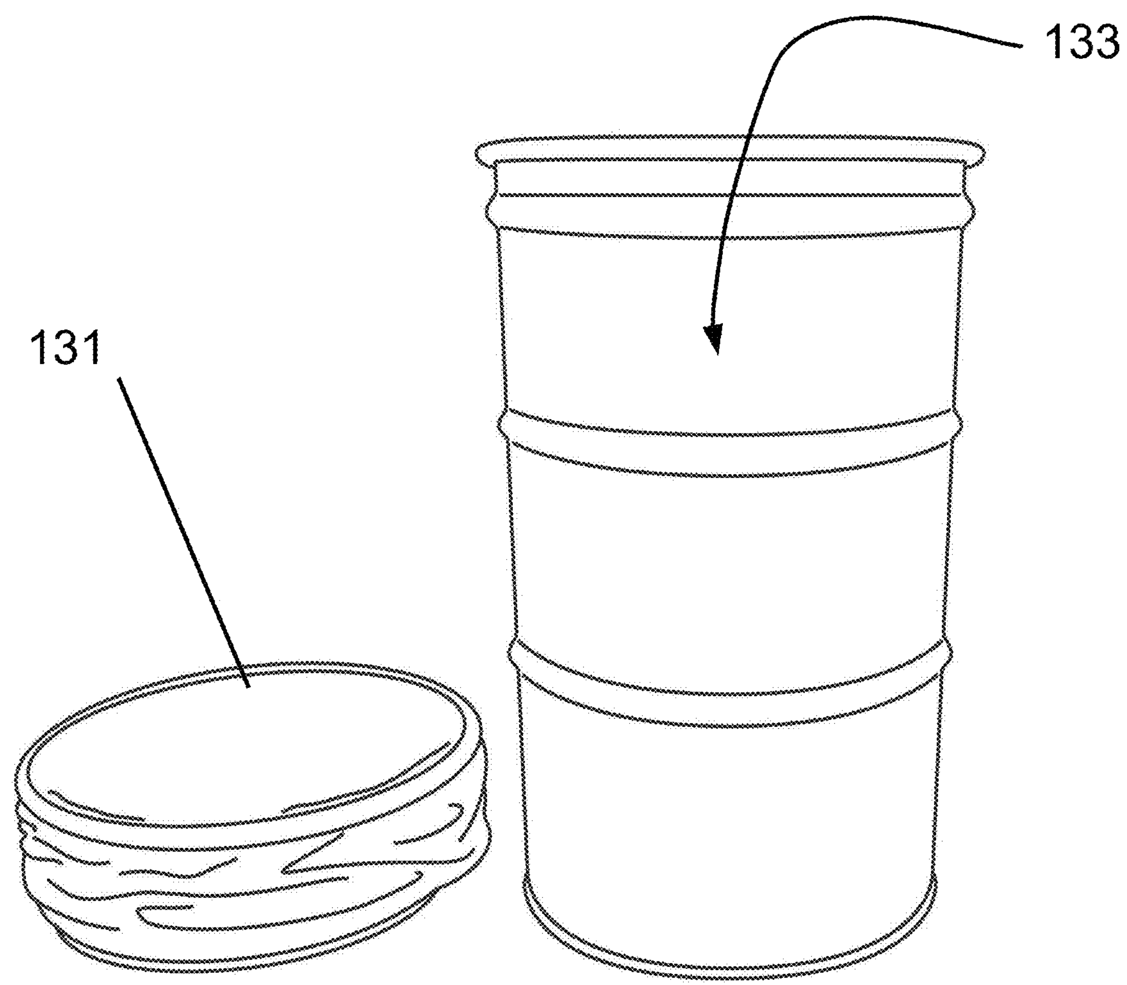
FIG. 1G shows a crushed drum and an uncrushed drum; wherein such drums may contain LLW.

FIG. 1G is also prior art; thus, FIG. 1A through FIG. 1G are prior art. FIG. 1G shows two drums (barrels), a crushed-drum 131 and an uncrushed drum 133. Each drum 131/133 may contain LLW 111. Each drum 131/133 may be radioactive from LLW 111 contamination. Crushed-drum 131 may be a result of compaction processing/operations. Each drum 133 may have a nominal volume/capacity of 200 liters or fifty-five (55) gallons. Other fixed sizes of drum 133 may be utilized. These drums 133 are about thirty-five (35) inches tall with a diameter of about twenty-four (24) inches.

Continuing discussing FIG. 1G, compactors for forming crushed-drum(s) 131 may range in size from low-force industrial compaction systems (e.g., of about five (5) tons) through to massive super compactor presses with a compaction force over 1,000 tons. A volume reduction factor may range from three (3) to ten (10), depending on the LLW material being compacted within drum 133 to arrive at crushed-drum 131. By compaction, the volume of solid LLW radwaste is reduced, but its physical and chemical properties remain unchanged. Low-force compaction may utilize a hydraulic or pneumatic press to rapidly compress a 200-litre drum 133 waste container to crushed-drum 131.

In further discussing FIG. 1G, it may be noted that the chemical, mechanical, and/or physical treatment and processing of LLW 111 may be a precursor step before the final disposal of LLW 111 in a given prior art LLW disposal system. Several means and processes are available for such LLW 111 processing and include the following: compaction/super-compaction; evaporation; consolidation; incineration/thermal; and decontamination. With compaction/super-compaction processing, the LLW may be compressed to reduce void space and/or the LLW may be repackaged from larger to smaller containers (e.g., drum(s) 131/133). With evaporation processing, removal of water from the LLW and capturing of radioactive material via scrubbers and/or filters may occur to leave mostly solid LLW residues behind. These solid LLW residues are then packed for disposal in drum(s) 131/133. With consolidation processing, there may be some repackaging of similar types, shapes, sizes, amounts, radioactivities, and/or the like of the LLW for economies of scale advantages. With incineration/thermal processing, high temperature treatment may be used to physically change organic solids/liquids to a gas and/or vapor. The radioactive effluent LLW materials are captured via scrubbers and/or filters or contained in the LLW ash for final disposal. With decontamination processing, the removal of radioactive contamination from surface area objects and then concentrating the radioactive contamination into a smaller volume produces a manageable LLW material. This LLW is then prepared for final disposal in the given prior art LLW disposal system.

Figure 2A:
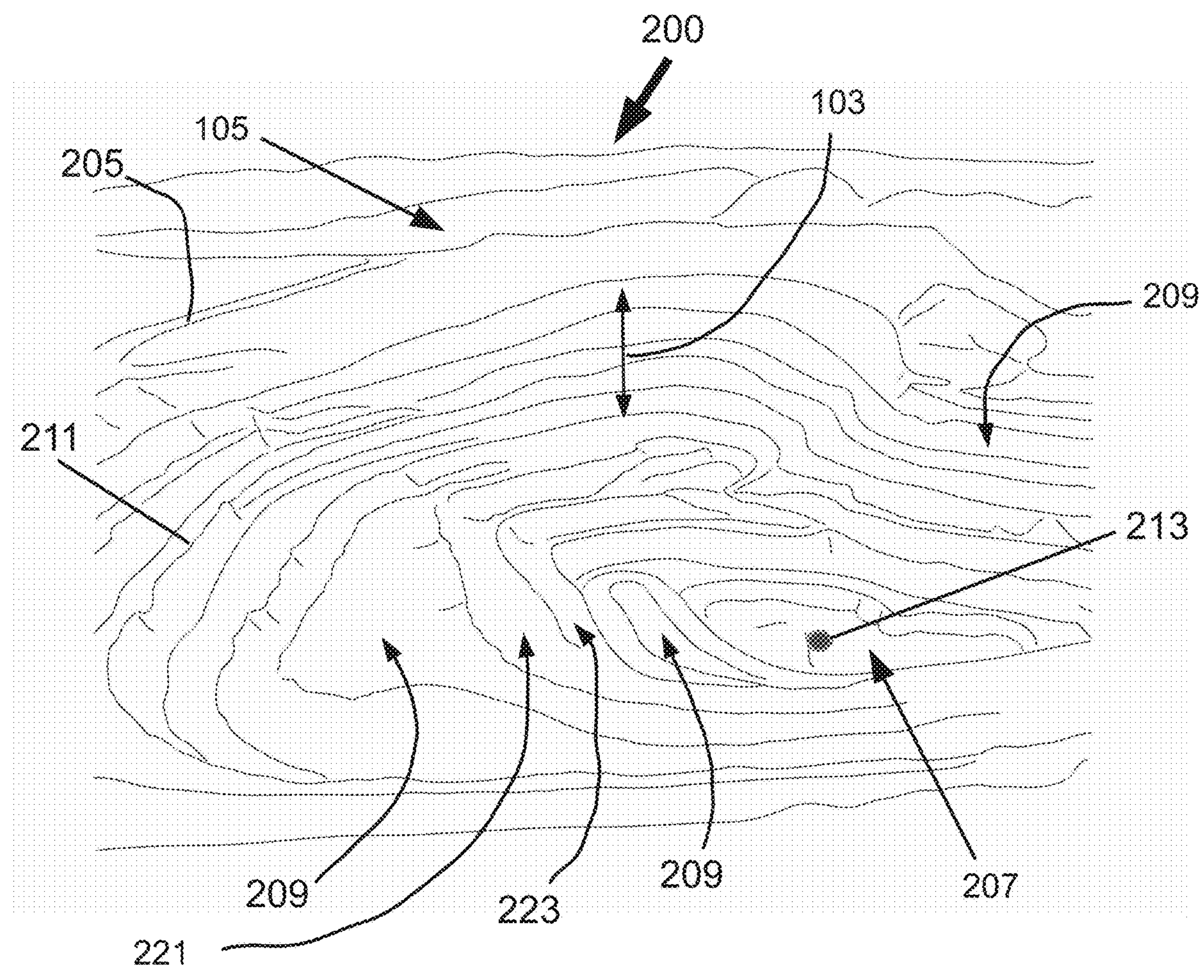
FIG. 2A shows a top-down perspective view of at least some portions of a modified-open-pit-repository (MOPR) that is configured for LLW disposal.

FIG. 2A shows a top-down perspective view of a modified-open-pit-repository 200 (MOPR 200). In some embodiments, MOPR 200 may be configured to store and/or dispose of LLW. In some embodiments, MOPR 200 may comprise a preexisting (e.g., abandoned) open-pit-mine (OPM), such as, that shown in FIG. 1F; an/or MOPR 200 may comprise a new OPM build specifically for LLW disposal. In some embodiments, the OPM of MOPR 200 may be modified and/or configured for LLW disposal. In some embodiments, a bottom 207 of the OPM of MOPR 200 may be configured to receive/hold the LLW. In some embodiments, bottom 207 of the OPM of MOPR 200 may have one or more wellheads 213 for one or more main-water-dispersion-wellbore(s) 401 that may be configured to collect and bring water (e.g., rain and/or intruding water) away from the LLW stored in/at bottom 207 of the OPM of MOPR 200. In some embodiments, wellhead(s) 213 and/or at least portions of main-water-dispersion-wellbore(s) 401 may be cased with casing (e.g., piping [e.g., steel pipes]) (e.g., for a purpose of isolating drainage water from a local water table). In some embodiments, at least one drainage well 401 (main-water-dispersion-wellbore(s) 401) may be drilled from bottom 207 of the OPM of MOPR 200 into deeper formations (e.g., water-dispersion-zone 409) for water dispersion/disposal operations. In some embodiments, bottom 207 of the OPM of MOPR 200 may have one or more supplementary-water-collection-wells 305 that may be configured to direct water (e.g., rain and/or intruding water) away from the LLW stored in/at bottom 207 of the OPM of MOPR 200 and to one or more main-water-dispersion-wellbore(s) 401.

In some embodiments, the OPM (of MOPR 200) may be substantially shaped as an inverted frustum that extends vertically downwards below a terrestrial surface 105 of the Earth to bottom 207 of the OPM. In some embodiments, the OPM has exterior surfaces that bound volume 201 (around sides 209) from bottom 207 of the OPM to top 205 of the OPM. In some embodiments, the top 205 of the OPM may be is substantially (mostly) open (such that volume 201 may not be bounded at/along top 205). See e.g., FIG. 2A, FIG. 2B, FIG. 4, FIG. 7, and/or FIG. 9.

Continuing discussing FIG. 2A, in some embodiments, the OPM of MOPR 200 may be a generally inverted frustum (truncated) cone (cylindrical cones or other types of cones) shaped excavations carved out of various geologic formations resulting in a region of void space/volume 201 that has the general inverted conical frustum shape 203. In some embodiments, 203 may begin at or around Earth's surface 105 (terrestrial surface 105) and extend downwards from a top 205 into the Earth/ground to bottom 207. In some embodiments, side(s) 209 of inverted conical frustum shape 203 may be sloped, terraced, have access-road(s) 211, portions thereof, combinations thereof, and/or the like. In some embodiments, side(s) 209 may run from top 205 to bottom 207. In some embodiments, bottom 207 may be a particular type/location of side 209, i.e., a side 209 that is at a bottom of that OPM of MOPR 200. In some embodiments, all to most of the exterior portions of the OPM of MOPR 200, including bottom 207, may be designated as side 209. In some embodiments, side(s) 209 may comprise one or more access-road(s) 211. In some embodiments, access-road 211 may spirally run alongside(s) 209 from top 205 and to bottom 207. In some embodiments, access-road 211 may be configured for ground transportation of one or more motor vehicles (on wheels, tracks, rails, rollers, skis, sleds, portions thereof, combinations thereof, and/or the like). In some embodiments, access-road(s) 211 may be built into the walls 209 for motor vehicle (e.g., truck) transport operations. In some embodiments, these Access-road(s) 211 may permit, allow, and/or facilitate for LLW disposal operations during the implementation of at least some embodiments of the present invention. In some embodiments, bottom 207 may comprise one or more (at least one) wellheads 213. In some embodiments, wellhead 213 may be physically attached to and/or in physical communication with one or more main-water-dispersion-wellbore(s) 401. In some embodiments, main-water dispersion-wellbore 401 may be configured to collect and bring water (e.g., rain and/or intruding water) away from the LLW stored in/at bottom 207 of the OPM of MOPR 200.

FIG. 2A may be a contoured graphic showing some of components/features of the OPM of MOPR 200. Excavation zones 221 may be circumferentially quarried around the forming OPM. Excavation zones 221 may decrease in areal size, from top 205 to bottom 207, as the OPR goes deeper into the earth/ground. As discussed later, a crushed rock and gravel layer/pad 405, not shown in FIG. 2A, may be implemented on top of the surface of bottom 207 and may also implemented on at least some of the side(s) 209 (wall(s) 209) of the OPM of MOPR 200 as the disposal process progresses and LLW material gradually fills the open cavity of the of the OPM of MOPR 200 from bottom 207 upwards. In some embodiments, geologic formations 223 may reflect the zones throughout the OPM of MOPR 200 that may have been excavated and from which hundreds of thousands of tons of earthen material has been removed and trucked away.

Continuing discussing FIG. 2A, in some embodiments, the OPM side(s) 209 may be structural constructs that allow typical OPM construction operations to occur efficiently; and that may also facilitate use of the OPM for disposal of LLW materials. In some embodiments, during utilization in mining operations to form the given OPM, access-road(s) 211 may provide ingress and/or egress of massive load carrying trucks to remove the mined material. In some historical operations, between 40,000 tons per day and 200,000 tons per day of ore material was removed from an OPM during several years of operation. In some embodiments, this mined ore may be transported in single haul trucks with capacities from 70 tons to 300 tons each. Based on this massive level of withdrawal of ore/filler materials, massive quantities of LLW materials may be disposed of in a similar fashion within the OPM of MOPR 200. The ability to sequester massive volumes of LLW materials at a single MOPR 200 location with available equipment is an important differentiating feature of at least some embodiments of this invention. In some embodiments, access-road(s) 211 may provide necessary access or pathways whereby the LLW materials may be easily transported into the OPM of MOPR 200 for LLW disposal.

Figure 2B:
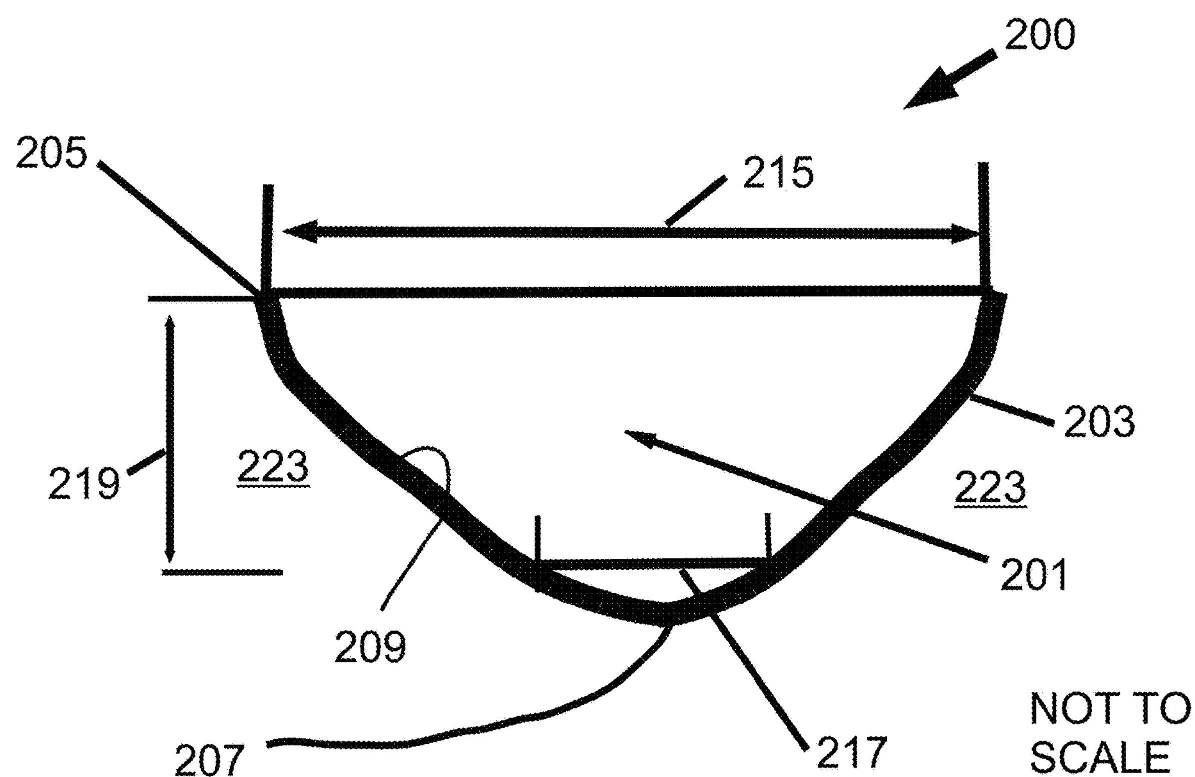
FIG. 2B shows a generalized side cross-section through the OPM (open pit mine) portion of a given MOPR.

FIG. 2B shows a generalized side cross-section through the OPM portion of MOPR 200. FIG. 2B shows that volume 201 may be disposed between top 205 and bottom 207. In some embodiments, volume 201 may be a volume of inverted conical frustum shape 203. In some embodiments, volume 201 may be substantially/mostly void space of inverted conical frustum shape 203, when inverted conical frustum shape 203 is substantially/mostly unfilled. In some embodiments, most of (majority of) volume 201 may be utilized for LLW storage/disposal. In some embodiments, volume 201 may have a capacity of fifty (50) billion cubic feet or some other predetermined volume. FIG. 2B shows that a top-width 215 may be larger than a bottom-width 217. In some embodiments, top-width 215 may be a transverse width and/or a diameter across top 205 of the OPM of MOPR 200. In some embodiments, top-width 215 may be an average of various transverse widths and/or diameters across top 205 of the OPM of MOPR 200. In some embodiments, bottom-width 217 may be a transverse width and/or a diameter across bottom 207 of the OPM of MOPR 200. In some embodiments, bottom-width 217 may be an average of various transverse widths and/or diameters across bottom 207 of the OPM of MOPR 200. In some embodiments, height 219 (depth 219) of the OPM of MOPR 200 may run from top 205 to bottom 207. In some embodiments, height 219 (depth 219) of the OPM of MOPR 200 may run from top-width 215 to bottom-width 217. In some embodiments, side(s) 209 (wall(s) 209) of the OPR of MOPR 200 may have a slope equal to or less than forty-five (45) degrees (plus or minus two (2) degrees) from vertical, to facilitate stability during excavation/mining operations and/or during LLW deposition operations.

Continuing discussing FIG. 2B, in some embodiments, a general shape of a perimeter/circumference around top 205 may be mostly circular, oval, ovoid, polygonal, portions thereof, combinations thereof, and/or like. In some embodiments, a general shape of a perimeter/circumference around top 205 may be in part determined by properties of the geology proximate to, next to, and/or adjacent to top 205. In some embodiments, a general shape of a perimeter/circumference around bottom 207 may be mostly circular, oval, ovoid, polygonal, portions thereof, combinations thereof, and/or like. In some embodiments, a general shape of a perimeter/circumference around bottom 207 may be in part determined by properties of the geology proximate to, next to, and/or adjacent to bottom 207. In some embodiments, a general shape of a perimeter/circumference around top 205 may be the same or different from a general shape of a perimeter/circumference around bottom 207.

Continuing discussing FIG. 2B, in some embodiments, top-width 215 may be selected from a range of 1,000 feet to 10,000 feet, plus or minus 200 feet. In some embodiments, bottom-width 217 may be selected from a range of 500 feet to 1,800 feet, plus or minus 100 feet. In some embodiments, height 219 may be selected from a range of 200 feet to 3,000 feet, plus or minus 100 feet. In any such embodiments, side(s) 209 may be maintained at an overall average slope of forty-five (45) degrees or less, plus or minus two (2) degrees.

As noted, the system defined by the OPR of MOPR 200 has a generally defined inverted conical frustum shape 203. This three-dimensional (3D) inverted conical frustum shape 203 may be one of the more optimal geometric shapes in three-dimensions for maximizing the operating volume 201 of the given LLW repository. In general, the available 3D basic construction shapes are spheres, cones, pyramids, rectangular prisms, and cubes.

In order to examine the appropriate structure for implementing a LLW disposal system the maximum operating volume (e.g., volume 201) for the minimal amount of structural excavation and the inherent difficulty of construction of the system should be examined. Volume/surface area ratio may be an adequate measure of size for a 3D structure. Based on operating volume ratio to a fixed surface area, the sphere has the maximum volume for any fixed surface area. However, the sphere may not a viable selection for LLW disposal in the ground because of construction/excavation limitations in building a sufficiently large spherical excavation (e.g., an upper hemisphere may want to collapse); and also, loading such a spherical structure with LLW may be difficult.

Rectangular prisms, cubes, and/or cones may be selected as a more adequate structure to be excavated for housing LLW. However, the proper selection may depend on the specific dimensions of rectangular prisms, cubes, and/or cones. It is generally easier to construct a large upside-down deep truncated frustum cone shaped type structure with available earthmoving equipment today than a cubic structure with perpendicular walls—as rectangular prisms and cubes are more prone to collapse. It is also easier to operate large equipment in and out of an upside down frustoconical structure than in and out of a steep sided cubic structure(s). A right pyramid is the least effective storage system with respect to operating volumes to surface area ratios and may not be considered as a viable LLW disposal system.

Figure 3:
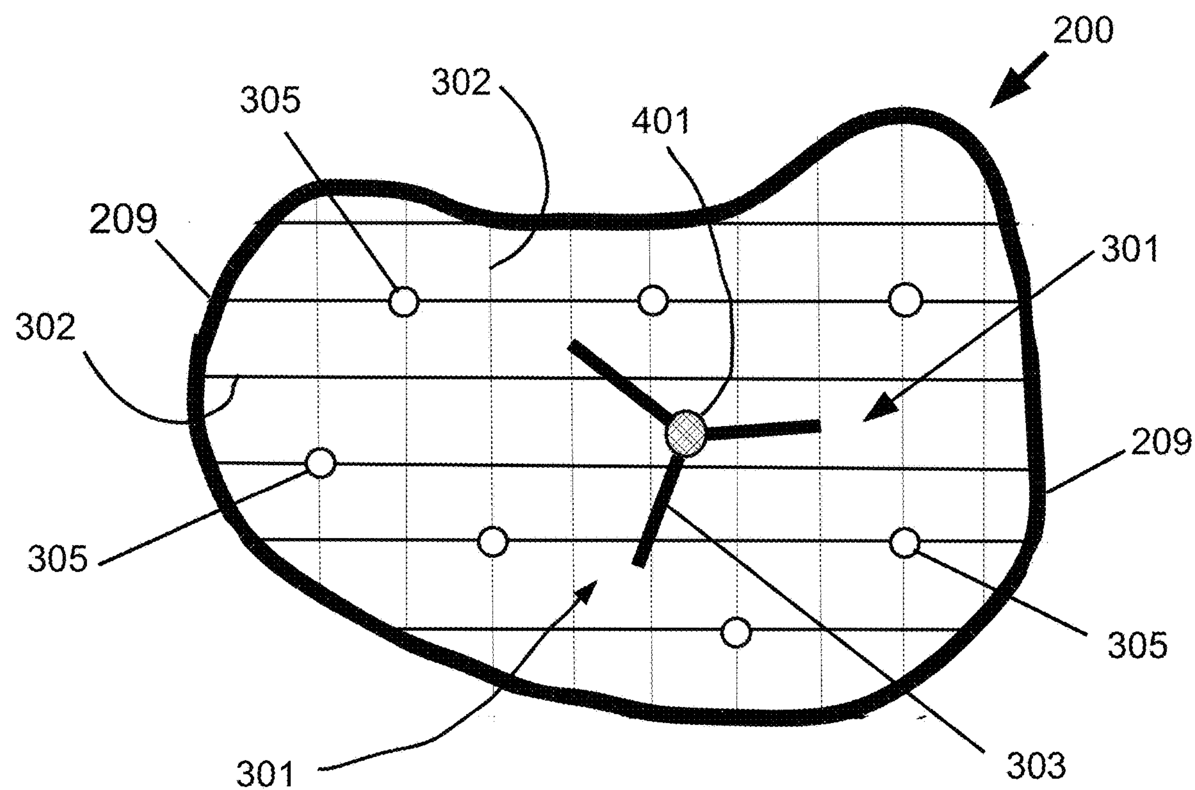
FIG. 3 shows a top-down view of a bottom of the OPM portion of a given MOPR, as viewed from above.

FIG. 3 shows a top-down view of bottom 207 of the OPM of MOPR 200 as viewed from above. In some embodiments, a top of bottom 207 may be demarked into a predetermined pattern (e.g., a grid pattern), wherein each such pattern unit may receive a cell 301 (LLW cell 301) of LLW material. In some embodiments, each LLW cell 301 may be a container structure comprising LLW materials therein. In some embodiments, each LLW cell 301 may be a predetermined and defined region of three-dimensional (3D) space that comprises LLW materials (e.g., drum(s) 131/133) therein. In some embodiments, the LLW material may be disposed of in cells or packets noted herein as a LLW cell(s) 301 which may be separated from each other by a series of dividers 302. In some embodiments, each LLW cell 301 may be formed by and/or bounded on its sides by divider(s) 302. In some embodiments, with respect to a given horizontal plane, a given LLW cell 301 may be entirely bounded around sides of that given LLW cell 301 by dividers 302. In some embodiments, with respect to a given horizontal plane, a given LLW cell 301 may be entirely bounded around sides of that given LLW cell 301 by four (4) different dividers 302. In some embodiments, divider 302 may be a structural member. In some embodiments, divider 302 may be an elongate member that runs in a horizontal plane. In some embodiments, adjacent dividers 302 may be spaced apart from each other by a width 603 and/or a length 603 of LLW cell 301 (see e.g., FIG. 6 for cell-width/length 603). In some embodiments, adjacent dividers 302 may be at least substantially/mostly parallel with each other. In some embodiments, at least two different dividers 302 may be at least substantially/mostly perpendicular and/or orthogonal with each other.

Continuing discussing FIG. 3, in some embodiments, a given LLW cell 301 may comprise one or more drum(s) 131/133, wherein drum(s) 131/133 may be as discussed above in FIG. 1G. For example, and without limiting the scope of the present invention, drum(s) 131/133 may contain LLW. In some embodiments, drum(s) 131/133 may be processed as noted in the discussion of FIG. 1G. In some embodiments, the LLW material may be packed securely at one or more remote (and secure) warehouse locations distributed around the given country (e.g., the U.S.) and drum(s) 131/133 may then compacted, where possible to minimize total disposal volumes. This packing and compaction process may be implemented in an assembly line operation with required safety practices depending on the activity level of the LLW material being contained within drum(s) 131/133. In some embodiments, the crushed drums 131 may be transported to the OPM site of a given MOPR 200 and then disposed in the LLW cell(s) 301 in a manner discussed in the various embodiments of the present invention and as illustrated in the accompanying figures.

It is expected that in the operation of the LLW disposal system of MOPR 200, varied amounts of rainfall may occur, along with possible runoff, flooding, storm surge, and/or even near surface migration of groundwater may occur above, in, and around the OPM of the MOPR 200. Removal of such intruding water may be needed and/or desired to ensure the LLW material disposed in the OPM of MOPR 200 remains protected and remains in place for the required thousands of years of burial. Removal of such intruding water may be needed and/or desired to ensure the LLW material disposed in the OPM of MOPR 200 remains isolated from such water intrusion into the site. At least some of the embodiments discussed herein may provide the necessary means for such long-term protection and isolation of stored/disposed of LLW materials.

Continuing discussing FIG. 3, in some embodiments, wellhead 213 of bottom 207 may be communicatively attached to at least one main-water-dispersion-wellbore 401. Note, because FIG. 3 is a top-down view, technically main-water-dispersion-wellbore 401 are not visible in FIG. 3; however, an upper portion of main-water-dispersion-wellbore 401 may be connected to a bottom portion of wellhead 213; and wellhead 213 may be shown in FIG. 3. See also, FIG. 4, FIG. 7, and/or FIG. 9 for main-water-dispersion-wellbore 401. In some embodiments, the major drainage well(s) 401 (main-water-dispersion-wellbore(s) 401) of which there may be several wells, may be drilled vertically downwards from bottom 207 and into a deep disposal porous and permeable zone (e.g., water-dispersion-zone 409) thousands of feet below bottom 207 of the OPM of MOPR 200. Similar to water disposal wells in the oil and gas industry, main-water-dispersion-wellbore(s) 401 may easily and readily discharge the collected water from the OPM of MOPR 200 and/or from supplementary-water-collection-well(s) 305 into the deep disposal porous and permeable zone (e.g., water-dispersion-zone 409) because of the hydrostatic head which develops inside the main-water-dispersion-wellbore(s) 401 because of the water column inside the main-water-dispersion-wellbore(s) 401. In those situations where the water injectivity of the disposal porous and permeable zone (e.g., water-dispersion-zone 409) is too low to allow adequate water disposal rates, the disposal wells 401 and/or 303 may be hydraulically fractured to enhance their injectivity. This hydraulic fracturing process is a routine and customary stimulation operation in the oil and gas industry.

Continuing discussing FIG. 3, in some embodiments, a terminal and/or bottom portion of main-water-dispersion-wellbore 401 may operatively connect to one or more radial-wellbore(s) 303. The radial-wellbores 303 shown in FIG. 3 are shown in broken lines (dotted lines) to indicated that the radial-wellbores 303 may be located beneath (under): bottom 207, LLW cells 301, dividers 302, and/or supplementary-water-collection-wells 305. In some embodiments, main-water-dispersion-wellbore 401 may be mostly/substantially vertical. In some embodiments, radial-wellbore 303 may be mostly/substantially horizontal. In some embodiments, main-water-dispersion-wellbore(s) 401 may be mostly/substantially perpendicular/orthogonal to radial-wellbore(s) 303. In some embodiments, multiple lateral (radial) injection disposal wells 303 may be implemented in the fluid-transport-zone 403 by drilling (jet drilling) small radial wellbores from each of the drainage wells 401 into the fluid-transport-zone 403. This jet drilling process is discussed in U.S. utility patent application, patent application Ser. No. 17/068,724, by the same inventor (Henry Crichlow) as the present patent application, and is incorporated by reference in its entirety as if fully set forth herein. This jet drilling operation to form radial-wellbore(s) 303 is further discussed in FIG. 11 (e.g., step 1107). In some embodiments, the radial injection disposal wells 303 disperse the water coming from above via the vertical wellbore 401, laterally and deep into the fluid-transport-zone 403.

Continuing discussing FIG. 3, in some embodiments, bottom 207 of the OPM of MOPR 200 may comprise one or more (at least one) supplementary-water-collection-wells 305. In some embodiments, supplementary-water-collection-well 305 may be mostly/substantially vertical. In some embodiments, supplementary-water-collection-well 305 may be a vertically oriented cylinder with perforations for receiving water therein. In some embodiments, supplementary-water-collection-well 305 may be made from a rigid material. In some embodiments, supplementary-water-collection-well 305 may be made from metal and/or plastic. In some embodiments, supplementary-water-collection-well 305 may be configured to collect, hold, and convey intruding water (e.g., from rain or otherwise) that may be reaching bottom 207, away from bottom 207, away from LLW cells 301, away from dividers 302 and towards wellhead(s) 213 and/or towards main-water-dispersion-wellbore(s) 401. In some embodiments, supplementary-water-collection-well 305 may be located at an intersection of dividers 302; and that such located supplementary-water-collection-well 305 may be extend vertically upwards and/or vertically downwards, above and/or below bottom 207, respectively. In some embodiments, supplementary-water-collection-well(s) 305 may be placed at selected locations through the areal extent of the OPM of MOPR 200. In some embodiments, supplementary-water-collection-well(s) 305 may comprise jointed slotted steel or other high strength pipes which may allow water to continually enter the pipe at many locations along its length. In essence, supplementary-water-collection-well(s) 305 behave like vertical "French drains" well known in the construction industry.

Figure 4:
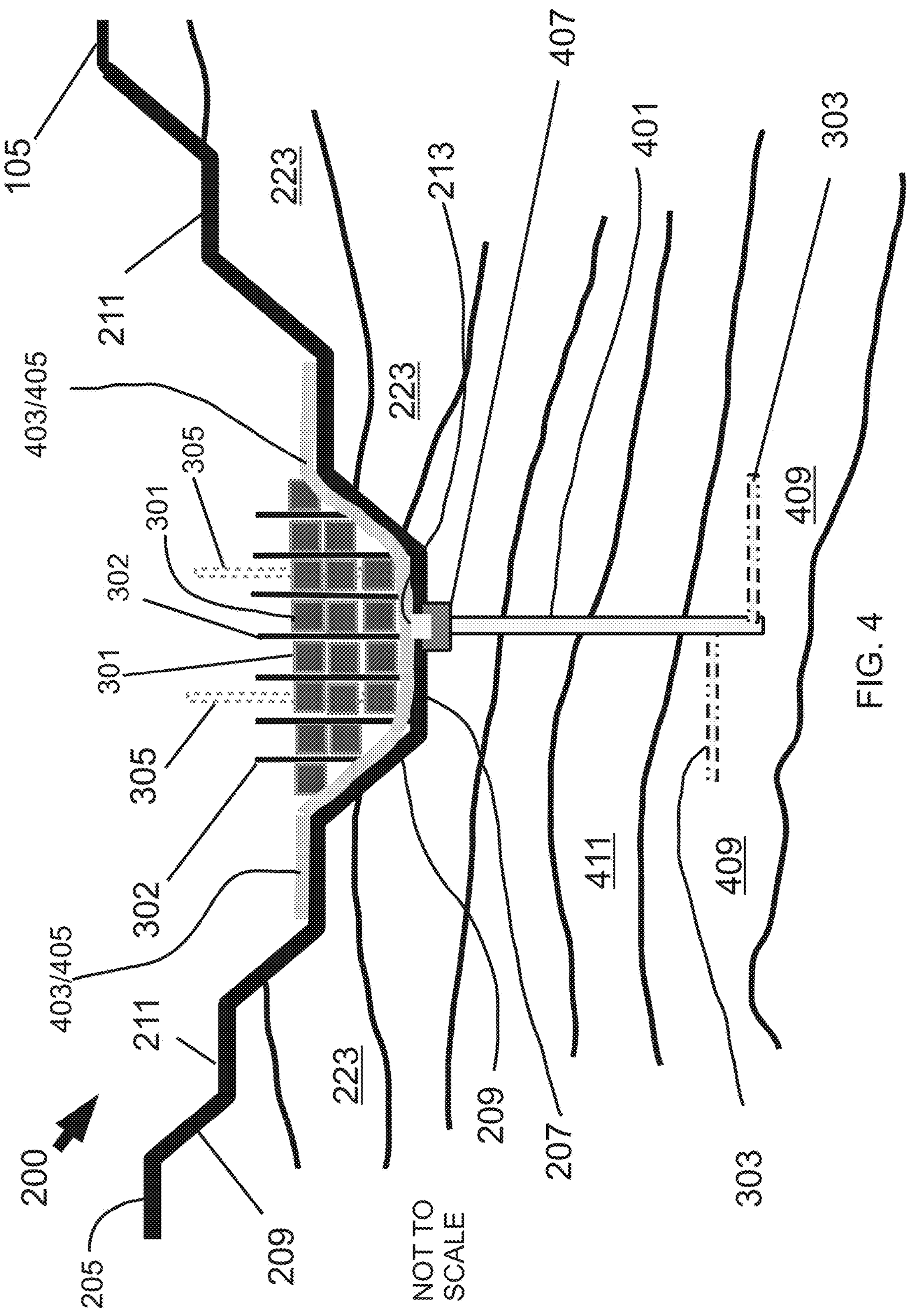
FIG. 4 shows a vertical cross-section through a given MOPR.

FIG. 4 shows a vertical cross-section through MOPR 200. FIG. 4 shows the OPM portions of MOPR 200 as well as structures (e.g., main-water-dispersion-wellbore(s) 401, radial-wellbore(s) 303, and/or sand/gravel filter 407) of MOPR 200 that are constructed/placed below the OPM portions. FIG. 4 also shows that at least some of the OPM of MOPR 200 may be modified (e.g., with the inclusion of dividers 302, LLW cells 301, supplementary-water-collection-well(s) 305, and/or a fluid-transport-zone 403 of gravel/rock 405). FIG. 4 may also that the LLW cells 301 may be stacked upon each other vertically, and/or stacked vertically onto mostly/substantially horizontal portions of side(s) 209 of the OPM as volume 201 may be filled up from the bottom upwards with LLW cells 301. For example, and without limiting the scope of the present invention, FIG. 4 may show three separate and distinct rows of LLW cells 301, with each row being at a different vertical height in volume 201 of the OPM.

Continuing discussing FIG. 4, in some embodiments, the OPM of MOPR 200 may comprise one or more fluid-transport-zone(s) 403. In some embodiments, fluid-transport-zone 403 may be located above bottom 207 of the OPM of MOPR 200, but below LLW cell(s) 301 placed into volume 201. In some embodiments, fluid-transport-zone 403 may be located above a side 209 of the OPM of MOPR 200, but below LLW cell(s) 301 placed into volume 201. In some embodiments, before placing a given LLW cell 301 into volume 201 and on top of bottom 207, that portion of side 209 may be lined with fluid-transport-zone 403. In some embodiments, before placing a given LLW cell 301 into volume 201 and on top of a side 209, that portion of side 209 may be lined with fluid-transport-zone 403. In some embodiments, fluid-transport-zone 403 may be disposed between bottom 207 and LLW cells 301. In some embodiments, fluid-transport-zone 403 may be disposed between side 209 and LLW cells 301. In some embodiments, fluid-transport-zone 403 may be configured to move water (and/or other fluids) away from LLW cells 301 and/or dividers 302 towards and to: wellhead(s) 213, sand/gravel filter 407, main-water-dispersion-wellbore(s) 401, portions thereof, combinations thereof, and/or the like.

Continuing discussing FIG. 4, in some embodiments, fluid-transport-zone 403 may comprise one or more crushed rock and gravel layer(s)/pad(s) 405. In some embodiments, MOPR 200 may comprise one or more crushed rock and gravel layer(s)/pad(s) 405. In some embodiments, fluid-transport-zone 403 may be at least one or more crushed rock and gravel layer(s)/pad(s) 405. In some embodiments, crushed rock and gravel layer(s)/pad(s) 405 may have a porosity sized to facilitate movement of water (and/or other fluids) through crushed rock and gravel layer(s)/pad(s) 405. In some embodiments, crushed rock and gravel layer(s)/pad(s) 405 may be implemented above and along the bottom exterior surfaces of the OPM of MOPR 200. In some embodiments, a given crushed rock and gravel layer/pad 405 may have a thickness of about twelve (12) inches plus or minus two (2) inches. In some embodiments, crushed rock and gravel layer(s)/pad(s) 405 may form a flow conduit through which water collected from above; e.g., from rainwater, groundwater run-off, or any sources of water above the bottom exterior surfaces of the OPM of MOPR 200 that may flow downwards to lowest point(s) of the OPM of MOPR 200 (such as wellhead(s) 213, sand/gravel filter(s) 407, and/or opening(s) to main-water-dispersion-wellbore(s) 401). In some embodiments, crushed rock and gravel layer(s)/pad(s) 405 may have an average void space that may be sized to facilitate movement of water (and/or other fluids) through crushed rock and gravel layer(s)/pad(s) 405.

In some embodiments, fluid-transport-zone 403 may be located within volume 201 and disposed between at least some of the exterior surfaces of the OPM (e.g., bottom 207 and/or side(s) 209) and the at least one LLW cell 301. In some embodiments, fluid-transport-zone 403 may be configured to convey water within volume 201 to an opening (e.g., wellhead 213) of at least one main-water-dispersion-wellbore 401. In some embodiments, at least one fluid-transport-zone 403 may be comprised of one or more of: at least one layer of crushed rock 405, at least one layer of gravel 405, at least one layer of both crushed rock and gravel 405, or a liner 913. In some embodiments, rocks, gravel, and/or sand within crushed rock and gravel layer(s)/pad(s) 405 may be sized for water drainage by gravity. In some embodiments, liner 913 may be at least substantially (mostly) water impermeable. See e.g., FIG. 4, FIG. 7, and/or FIG. 9.

Continuing discussing FIG. 4, in some embodiments, MOPR 200 may comprise one or more sand/gravel filter(s) 407. In some embodiments, at a top of main-water-dispersion-wellbore 401 may be sand/gravel filter 407. In some embodiments, disposed between wellhead 213 and a top portion of main-water-dispersion-wellbore(s) 401 may be at least one sand/gravel filter 407. In some embodiments, wellhead 213 may attach to and/or feed to at least one sand/gravel filter 407. In some embodiments, sand/gravel filter 407 may attach to and/or feed to at least one main-water-dispersion-wellbore 401. In some embodiments, sand/gravel filter 407 may be a filter comprise of sand and/or of gravel. In some embodiments, sand/gravel filter 407 may be configured to filter out at least some sediments and/or solids in water and/or fluids flowing through sand/gravel filter 407. In some embodiments, sand/gravel filter 407 may be a trap system that may filter out large particulates that may otherwise/eventually plug/clog main-water-dispersion-wellbore 401 and the pore/void spaces of water-dispersion-zone 409 the near radial-wellbore(s) 303. In some embodiments, sand/gravel filter 407 may be cleaned out as required. In some embodiments, clean out may be by washing with acids and/or by reverse circulation of clean-out fluids to maintain the effectiveness of sand/gravel filter 407.

In some embodiments, at least one (sand/gravel) filter 407 may be located proximate to the opening (e.g., wellhead 213) of at least one main-water-dispersion-wellbore 401, wherein proximate in this context may be fifteen (15) feet or less. In some embodiments, the at least one filter 407 may be operatively connected to the opening of the at least one main-water-dispersion-wellbore 401 (so that water may flow from (sand/gravel) filter 407 and into main-water-dispersion-wellbore 401). In some embodiments, at least one (sand/gravel) filter 407 may be configured to filter out at least some particulates from at least some of the water that reaches the at least one water-dispersion-wellbore 401 from (sand/gravel) filter 407. In some embodiments, at least one (sand/gravel) filter 407 may comprise one or more of: sand and/or gravel. See e.g., FIG. 4, FIG. 7, and/or FIG. 9.

Continuing discussing FIG. 4, in some embodiments, MOPR 200 may comprise one or more main-water-dispersion-wellbore(s) 401. In some embodiments, main-water-dispersion-wellbore 401 may run from bottom 207 substantially (mostly) vertically downwards to a predetermined geologic formation, a water-dispersion-zone 409. In some embodiments, water-dispersion-zone 409 may be geologic formation with one or more properties conductive for receiving water. In some embodiments, main-water-dispersion-wellbore 401 may pass through other-geologic-formation(s) 411 before reaching water-dispersion-zone 409. In some embodiments, other-geologic-formation(s) 411 may be disposed between earth's surface 105 (terrestrial surface 105) and water-dispersion-zone 409. In some embodiments, structurally located below the OPR of MOPR 200 may be one or more undisturbed geological rock formations, the other-geologic-formation(s) 411. In some embodiments, these other-geologic-formation(s) 411 may be substantially (mostly) non-ore-bearing and as such may have no part in the active ore mining operations to form the given OPM. In some embodiments, other-geologic-formation(s) 411 may be a variety of rock zones such as, but not limited to, sandstones, clays, sedimentary, conglomerates, metamorphic or different rock combinations. Also shown in FIG. 4 may be water-dispersion-zone 409. In some embodiments, water-dispersion-zone 409 may be a major/important component of the overall MOPR 200 system and may be part of the plan of operations of the repository MOPR 200 system. If a given OPM is without a water-dispersion-zone 409 located thereunder (within a reasonable distance of 5,000 feet vertically there below or less), then that OPM may not be sufficient for the MOPR 200 system and a different OPM may be required. In some embodiments, water-dispersion-zone 409 may be a porous and permeable zone such as a sandstone, conglomerate, fractured shale, or fractured granite, and/or the like formation into which water collected from the OPM above may be injected into and disposed of in the free pore space of water-dispersion-zone 409. In some embodiments, there may be a plurality of water-dispersion-zones 409 which may be vertically separated and/or isolated vertically from each other. In some embodiments, main-water-dispersion-wellbore 401 may penetrate (extend) to a plurality of water-dispersion-zones 409. In some embodiments, MOPR 200 system may comprise and/or utilize multiple water-dispersion-zones 409. In practice, multiple water-dispersion-zones 409 may be located vertically below the OPM of the given MOPR 200 system. In practice, multiple water-dispersion-zones 409 may be used for drainage water disposal out of the OPM of the given MOPR 200 system. In some embodiments, this zone water-dispersion-zone 409 may be classified as a water disposal zone similar to the hundreds of disposal zones around the U.S. wherein millions of barrels of produced water in oilfield operations are injected daily into permitted water disposal wellbores.

Continuing discussing FIG. 4, in some embodiments, main-water-dispersion-wellbore 401 may run from a wellhead 213 substantially (mostly) vertically downwards to water-dispersion-zone 409. In some embodiments, main-water-dispersion-wellbore 401 may run from a sand/gravel filter 407 substantially (mostly) vertically downwards to water-dispersion-zone 409. In some embodiments, main-water-dispersion-wellbore 401 may be conventionally drilled vertically down from bottom 207 (or thereabouts) of the OPM of MOPR 200 to, and into, at least one porous and permeable zone (e.g., water-dispersion-zone 409) disposed below the OPM of MOPR 200. In some embodiments, main-water-dispersion-wellbore 401 may be configured to move/transport water away from: LLW cells 301, dividers 302, bottom portions of supplementary-water-collection-well(s) 305, fluid-transport-zone(s) 403, crushed rock and gravel layer(s)/pad(s) 405, sand/gravel filter 407, portions thereof, combinations thereof, and/or the like; and to/towards water-dispersion-zone 409. In some embodiments, distal portion(s) (e.g., disposed away from earth's surface 105 [terrestrial surface 105]) of main-water-dispersion-wellbore 401 within water-dispersion-zone 409 may be configured to discharge water (and/or any other fluids) within main-water-dispersion-wellbore 401 into water-dispersion-zone 409. For maximum efficiency of water drainage from the OPM of MOPR 200, a wellhead 213 of main-water-dispersion-wellbore 401 may be located at or near a lowest point of the OPM of MOPR 200 (e.g., from bottom 207). By selecting at least one lowest location for wellhead(s) 213, the water drainage process may benefit from the effects of gravity assisting water drainage from the OPM of MOPR 200. In some embodiments, main-water-dispersion-wellbore 401 may be cemented and/or cased in place. In some embodiments, main-water-dispersion-wellbore 401 may have steel (or the like) casing(s). In some embodiments, main-water-dispersion-wellbore 401 may have a fixed diameter selected from a range of six (6) inches to twelve (12) inches, plus or minus one (1) inch.

In some embodiments, a given main-water-dispersion-wellbore 401 may have typical lengths from 1,000 feet deep to about 5,000 feet deep, plus or minus 100 feet, to the given water-dispersion-zone 409. It should be noted that the drilling costs of this type of water-dispersion-zone 409 is minuscule (about $400,000) compared to the total overall costs of radioactive waste (e.g., LLW and HLW) disposal today (2021) which is in the billions of dollars. Note, in some embodiments, main-water-dispersion-wellbore 401 and/or radial-wellbore 303 may be are easily drilled with non-specialized and readily available drilling rigs.

Continuing discussing FIG. 4, in some embodiments, main-water-dispersion-wellbore 401 may configured to convey water from within volume 201 to at least one (one or more) particular geologic formation (water-dispersion-zone 409). In some embodiments, main-water-dispersion-wellbore 401 may begin at bottom 207 (at a given wellhead 213) of the OPM and may extend substantially (mostly) vertically downwards into a particular geologic formation, denoted herein as, water-dispersion-zone 409. In some embodiments, main-water-dispersion-wellbore 401 may run from its opening (e.g., wellhead 213 at or near bottom 207) to a distal portion, wherein the distal portion is located within the particular geologic formation (water-dispersion-zone 409). In some embodiments, main-water-dispersion-wellbore 401 (and/or wellhead 213) may be substantially cased (e.g., with pipe(s) and/or piping) to isolate (drainage) water within main-water-dispersion-wellbore 401 from a local water table that is located above the particular geologic formation (water-dispersion-zone 409); and wherein that local water table extends radially and surrounds at least a portion of main-water-dispersion-wellbore 401.

Continuing discussing FIG. 4, in some embodiments, when distal portion(s) of main-water-dispersion-wellbore 401 reaches a given water-dispersion-zone 409 (located below the OPM), one or more radial-wellbore(s) 303 may be constructed from that distal portion of main-water-dispersion-wellbore 401 in a substantially (mostly) lateral/horizontal direction within water-dispersion-zone 409. In some embodiments, one or more radial-wellbore(s) 303 may branch off from a distal portion of main-water-dispersion-wellbore 401 in a substantially (mostly) lateral/horizontal direction within water-dispersion-zone 409. Interior portions of main-water-dispersion-wellbore 401 and connected radial-wellbore(s) 303 may be operatively linked, such that water inside of main-water-dispersion-wellbore 401 may move from main-water-dispersion-wellbore 401 and into radial-wellbore(s) 303. In some embodiments, radial-wellbore(s) 303 may be located within water-dispersion-zone 409. In some embodiments, radial-wellbore(s) 303 may be drilled in a substantially (mostly) lateral and/or horizontal directions within water-dispersion-zone 409. In some embodiments, radial-wellbore(s) 303 may be configured to discharge water (and/or any other fluids) inside of radial-wellbore(s) 303 into water-dispersion-zone 409. In some embodiments, at least one (smaller) radial-wellbore 303 may be mechanically drilled and/or "jet-drilled" from main-water-dispersion-wellbore 401 into water-dispersion-zone 409. In some embodiments, radial-wellbore 303 may extend for at least 200 feet in water-dispersion-zone 409 in at least a substantially (mostly) lateral/horizontal direction (all within water-dispersion-zone 409). In some embodiments, radial-wellbore 303 may have a fixed diameter selected from a range of two (2) inches to four (4) inches, plus or minus one-half (½) inch. In some embodiments, radial-wellbore 303 may be open hole completions, i.e., no steel casing may be used with radial-wellbore 303. In some embodiments, radial-wellbore 303 may have no (steel) casing(s). In some embodiments, radial-wellbore 303 may be cased or lined with steel casing(s). In some embodiments, the cased radial-wellbore(s) 303, may have holes or perforations (not shown in the figures) implemented in the distal/terminal sections/portions of the lateral radial-wellbore(s) 303 to allow drainage water from the above located OPM to be dispersed more rapidly into the water-dispersion-zone(s) 409.

In some embodiments, at least one water-injection-wellbore 303 (radial-wellbore 303) may extend (mostly laterally/horizontally) away from a distal portion of the at least one main-water-dispersion-wellbore 401. In some embodiments, at least one water-injection-wellbore 303 (radial-wellbore 303) may run entirely within the particular geologic formation (water-dispersion-zone 409). In some embodiments, at least one water-injection-wellbore 303 (radial-wellbore 303) may be operatively connected to the distal portion main-water-dispersion-wellbore 401 (so that water may flow from main-water-dispersion-wellbore 401 and into water-injection-wellbore 303 [radial-wellbore 303]). In some embodiments, at least one water-injection-wellbore 303 (radial-wellbore 303) may be configured to discharge water into the particular geologic formation (water-dispersion-zone 409). See e.g., FIG. 3, FIG. 4, FIG. 7, and/or FIG. 9.

Continuing discussing FIG. 4, in some embodiments, shown above fluid-transport-zone 403 may be multiple discrete three-dimensional (3D) block-like LLW cells 301 of LLW material(s) that may have been individually formed from side surrounding divider(s) 302 and filled with LLW material(s) and protective-medium 505. In some embodiments, these LLW cells 301 may be stacked on top of bottom 207, side(s) 209, and/or already emplaced LLW cells 301 within volume 201 of the OPM of MOPR 200. In some embodiments, MOPR 200 may comprise one or more divider(s) 302. In some embodiments, dividers 302 may separate LLW cells 301 into distinct vertical columns of vertically stacked LLW cells 301. In some embodiments, these divider(s) 302 may be (temporary) scaffolding-like planar components which may shape the side-walls of LLW cells 301. In some embodiments, these divider(s) 302 may be used to facilitate construction of LLW cells 301. In some embodiments, divider(s) 302 may be temporary (e.g., removed after formed LLW cell(s) 301 are filled with LLW materials). In some embodiments, divider(s) 302 may be made substantially (mostly) of one or more: rigid sheet material, wood, timber, lumber, engineered lumber, plywood, OSB (oriented strand board), plastic sheeting, portions thereof, combinations thereof, and/or the like. In some embodiments, divider(s) 302 may be made of/from disposable and/or recycled material. In some embodiments, after formation of the given LLW cell 301 and its filling with LLW material(s) and with protective-medium 505, then the divider(s) 302 may no longer be needed. In some embodiments, after formation of the given LLW cell 301 and its filling with LLW material(s) and with protective-medium 505, then the divider(s) 302 may be removed; and/or the divider(s) 302 may be left in place. When divider(s) 302 may be left in place, divider(s) 302 may eventually substantially (mostly) deteriorate (breakdown) and "disappear" over time by natural degradation.

In some embodiments, at least one LLW cell 301 may be located within volume 201. In some embodiments, LLW cell 301 may be configured to receive (hold and/or house) at least one unit of LLW. In some embodiments, vertical boundaries of a given LLW cell 301 may be formed from one or more dividers 302. In some embodiments, the at least one LLW cell 301 may be a plurality of LLW cells 301. In some embodiments, at least some LLW cells 301 selected from the plurality of LLW cells 301 may be vertically stacked upon each other within volume 201. In some embodiments, at least one LLW cell 301 (when formed and within volume 201) when viewed from above has a shape that may be substantially (mostly) polygonal. In some embodiments, at least one LLW cell 301 (when formed and within volume 201) may have a block shape. See e.g., FIG. 3, FIG. 4, FIG. 5, FIG. 6, and/or FIG. 9.

Continuing discussing FIG. 4, in some embodiments, MOPR 200 may comprise one or more supplementary-water-collection-well(s) 305. In some embodiments, supplementary-water-collection-well 305 may be a perforated, holed, slotted pipe/tube, portions thereof, combinations thereof, and/or the like. In some embodiments, when supplementary-water-collection-well 305 may be installed in volume 201 of MOPR 200, its orientation may be substantially (mostly) vertical. In some embodiments, a length/longitude of supplementary-water-collection-well 305 (when installed in volume 201 of MOPR 200) may be substantially (mostly) parallel with the vertical direction. In some embodiments, supplementary-water-collection-well(s) 305 may be strategically placed in volume 201 of MOPR 200 to allow water to be collected both vertically and horizontally and drained down into fluid-transport-zone 403 at bottom locations of the OPM of MOPR 200. In some embodiments, these supplementary-water-collection-well(s) 305 may be vertically added to, to incrementally increase their height, with additional sections of pipe added, as the OPM of MOPR 200 may be filled up with LLW materials (in LLW cells 301 and/or LLW layer(s)).

In some embodiments, at least one supplementary-water-collection-well 305 may be located within volume 201. In some embodiments, once at least one supplementary-water-collection-well 305 may be installed within volume 201, that installed supplementary-water-collection-well 305 may be substantially oriented in a vertical configuration, such that a longitude of that supplementary-water-collection-well 305 may be substantially (mostly) vertical. In some embodiments, at least one supplementary-water-collection-well 305 may be configured to transport received water (into the supplementary-water-collection-well 305) to the at least one fluid-transport-zone 403. See e.g., FIG. 3, FIG. 4, FIG. 7, and/or FIG. 9.

Figure 5:
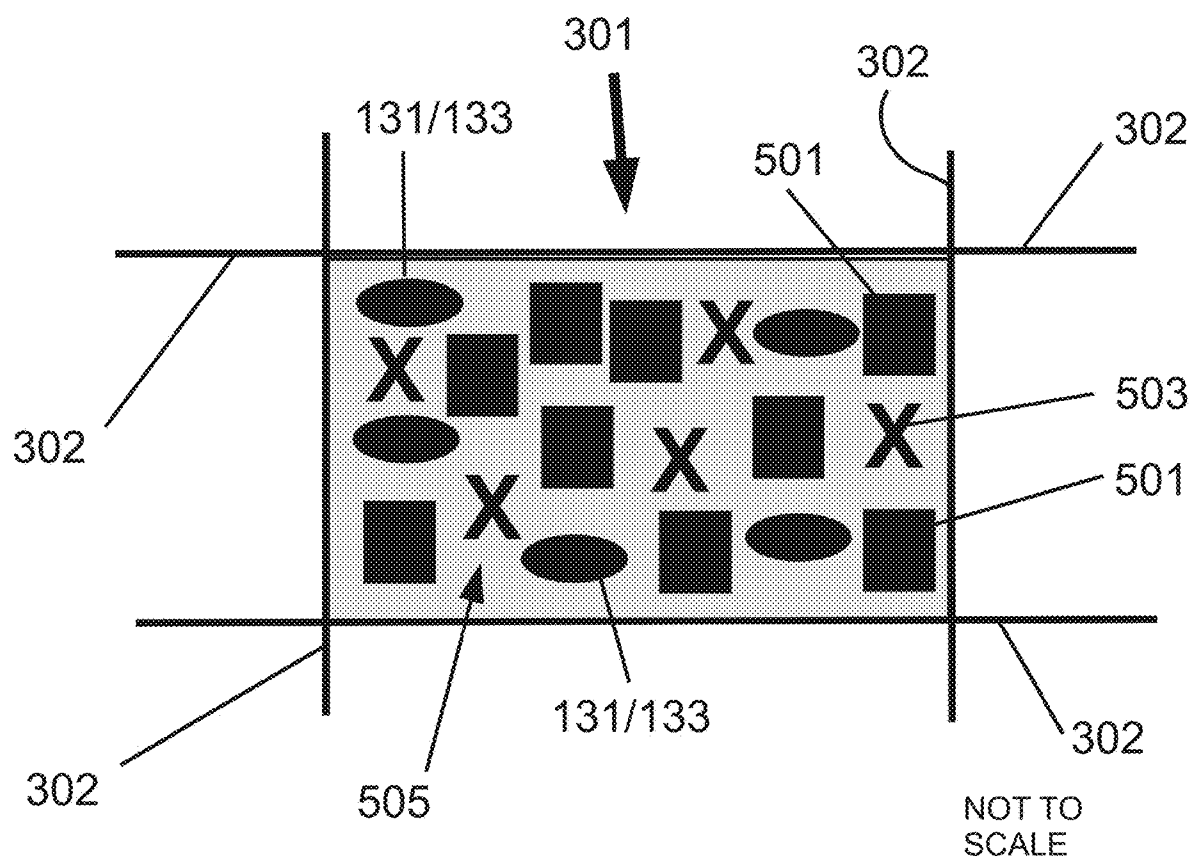
FIG. 5 shows a top-down view of a given LLW cell that may be located and/or formed within a volume of a OPM of a given MOPR.

FIG. 5 shows a top-down view of a given LLW cell 301 that may be located and/or formed within volume 201 of the OPM of MOPR 200. In some embodiments, LLW cell 301 shown in FIG. 5 may be one LLW cell 301 of out hundreds of LLW cells 301 located and/or formed within volume 201. In some embodiments, each LLW cell 301 may be bounded on its sides by portion(s) of one or more divider(s) 302. In some embodiments, divider(s) 302 may function as side-walls to a given LLW cell 301. In some embodiments, divider(s) 302 may bound sides of a given LLW cell 301. In some embodiments, when divider(s) 302 may be installed within volume 201, a major plane of a given divider 302 may be at least substantially (mostly) oriented in a vertical direction, just like a wall in a home. In some embodiments, while the major plane of a given divider 302 may be in the vertical orientation, the divider 302 may still run in lateral directions with its major plane in the vertical orientation, just as the wall in a home is in the vertical direction but the wall may run in a West-East direction (or other similar lateral direction).

Continuing discussing FIG. 5, in some embodiments once at least some divider(s) 302 form a grid or grid like pattern (such as shown in FIG. 3), each such resulting LLW cell 301 that may be entirely bounded on its sides by divider(s) 302 may be (mechanically) filled with LLW materials. In some embodiments, the LLW materials may be one or more of: drum(s) 131/133, LLW material 501, LLW material 503, portions thereof, and/or the like. In some embodiments, the LLW material(s) emplaced within a given formed LLW cell 301 may be in one or more of the LLW forms/types noted in the Background of the Invention section of this patent application. The different reference numerals of LLW material 501 and LLW material 503 are to denote that the LLW materials emplaced within given formed LLW cell 301 may be in one or more of the LLW forms/types noted in the Background of the Invention section of this patent application and with drum(s) 131/133 being yet another form/type.

Continuing discussing FIG. 5, in some embodiments, once the given formed LLW cell 301 may be filled with LLW material(s) (e.g., drum(s) 131/133, LLW material 501, LLW material 503, portions thereof, combinations thereof, and/or the like), that given formed LLW cell 301 may then be further filled with protective-medium 505. In some embodiments, protective-medium 505 may fill in around void spaces around the LLW material(s) within the given LLW cell 301. In some embodiments, protective-medium 505 may be initially injected, inserted, pumped, flooded, placed, and/or the like, into a given LLW cell 301, until that given LLW cell 301 may be filled to its top with protective-medium 505 (which may mostly/substantially cover over LLW material(s) therein). In some embodiments, when protective-medium 505 may be initially injected, inserted, pumped, flooded, placed, and/or the like, into a given LLW cell 301, that protective-medium 505 may initially be in a form of one or more of: a fluid, a liquid, a flowable material, a slurry, an uncured cement, a flowable cement, a foam, with or without additives, with or without fillers, portions thereof, combinations thereof, and/or the like. In some embodiments, protective-medium 505 may be configured to one or more of: provide a barrier to radionuclide migration (from LLW materials within a given LLW cell 301); be substantially/mostly hydrophobic (to resist water intrusion and/or expel water); provide compressive strength to LLW cells 301 filled with LLW materials and filled with protective-medium 505; minimize movement of LLW material(s) within a given LLW cell 301; portions thereof; combinations thereof; and/or the like.

In some embodiments, after the at least one LLW cell 301 (within volume 201) has received the at least one unit of LLW, at least some of protective-medium 505 may be inserted (pumped) into the at least one LLW cell 301 to fill in void spaces around the at least one unit of LLW that is located within that LLW cell 301. In some embodiments, protective-medium 505 may be configured to mitigate against migration of radionuclides away from the at least one unit of LLW (that is within the at least one LLW cell 301). In some embodiments, protective-medium 505 may be comprise carbon nanotubes (CNTs 1001) and a foam cement slurry. In some embodiments, protective-medium 505 may comprise one or more of the following materials (ingredients): carbon nanotubes (CNTs 1001), foam cement slurry, exfoliated vermiculite material aggregates, graphene derivatives, bentonite clays, bentonite fluids, tars, bitumen, heavy oils, complex hydrocarbons-, retarders, accelerators, portions thereof, combinations thereof, and/or the like. In some embodiments, the complex hydrocarbons may comprise one or more of: fluorinated polyethers, perfluro-polyethers, phenal-polyethers, silicones, their derivatives, portions thereof, combinations thereof, and/or the like—which may possess high useful temperature stability, extensive corrosion resistance, controllable flow characteristics, long term mechanical stability, portions thereof, combinations thereof, and/or the like. See e.g., FIG. 5, FIG. 10, FIG. 12, and FIG. 14 and their corresponding discussions.

Figure 6:
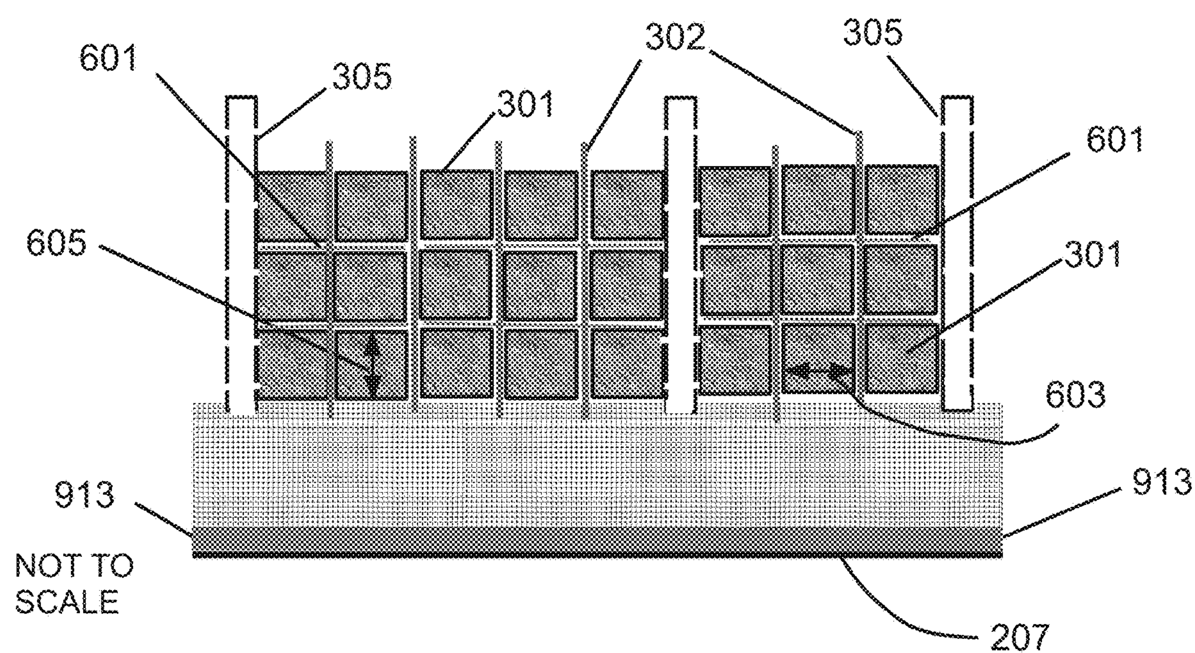
FIG. 6 illustrates a localized close-up vertical cross-sectional view of a section/portion of a OPM of a given MOPR being used as a repository for LLW material(s).

FIG. 6 illustrates a localized close-up vertical cross-sectional view of a section/portion of the OPM of MOPR 200 being used as a repository for LLW material(s). FIG. 6 may show a vertical cross-section of a portion of at least some vertically stacked LLW cells 301 on top of fluid-transport-zone 403. Note, no main-water-dispersion-wellbore 401 are shown in FIG. 6 (e.g., main-water-dispersion-wellbore 401 are either omitted for clarity in FIG. 6 and/or the portions shown in FIG. 6 is a portion without main-water-dispersion-wellbore 401). In some embodiments, filled and completed LLW cells 301 may be constructed as three-dimensional (3D) blocks of finite sizes made by discharging the LLW material(s) and protective-medium 505 combination mixture into individually formed cells/packet defined from the scaffolding system of divider(s) 302 and/or with cell-floor-ceiling-material(s) 601. In some embodiments, the LLW material(s) may be mixed with protective-medium 505 in a pre-set ratio to form (cure and/or at least partially solidify) on setting up, as a complex 3D solid block which becomes a given completed (and filled) LLW cell 301. This process may be further explained later in FIG. 12 (e.g., step 1209). In some embodiments, a given completed and filled LLW cell 301 may be a non-homogenous solid as shown in FIG. 5. In some embodiments, a given completed and filled LLW cell 301 may maintain a desired/required compressive strength (e.g., of a cured foam cement), such that multiple completed and filled LLW cells 301 may be vertically stacked on top of each other in the OPM of MOPR 200; and without undue completed and filled LLW cell 301 breakage occurring.

Continuing discussing FIG. 6, in some embodiments, the LLW material(s) may be disposed of in LLW cells 301. In some embodiments, the vertical sides of the LLW cells 301 may be formed and divided by dividers 302. In some embodiments, a floor and/or ceiling of a given LLW cell 301 may be formed from cell-floor-ceiling-material 601. Where a major plan of divider(s) 302 may be in a vertical orientation, a major plane of cell-floor-ceiling-material 601 may be in a horizontal orientation. In some embodiments, a major plane of cell-floor-ceiling-material 601 may be substantially (mostly) orthogonal (perpendicular) to the major planes of divider(s) 302. In some embodiments, cell-floor-ceiling-material 601 may be structural and/or load bearing. In some embodiments, cell-floor-ceiling-material 601 may be non-structural and/or non-load bearing. In some embodiments, cell-floor-ceiling-material 601 may be made substantially (mostly) of one or more: rigid sheet material, semi-rigid sheet material, flexible/pliable sheet material, wood, timber, lumber, engineered lumber, plywood, OSB (oriented strand board), plastic sheeting, elastomeric sheeting, portions thereof, combinations thereof, and/or the like.

Continuing discussing FIG. 6, in some embodiments, fluid-transport-zone(s) 403 (and/or crushed rock and gravel layer(s)/pad(s) 405) may be disposed between a bottom most layer/row of LLW cells 301 and upper/exterior surfaces of bottom 207/side(s) 209. In some embodiments, fluid-transport-zone(s) 403 (and/or crushed rock and gravel layer(s)/pad(s) 405) may be located directly on top of upper/exterior surfaces of bottom 207/side(s) 209; and below the bottom most layer/row of LLW cells 301. In some embodiments, fluid-transport-zone(s) 403 (and/or crushed rock and gravel layer(s)/pad(s) 405) may overlay (cover) bottom 207 and/or side(s) 209, before LLW cells 301 may be formed in volume 201 of the OPM of MOPR 200 above bottom 207 and/or above side(s) 209. In some embodiments, fluid-transport-zone(s) 403 (and/or crushed rock and gravel layer(s)/pad(s) 405) may underlay completely all formed/installed LLW cells 301 in volume 201 of the OPM of MOPR 200. In some embodiments, fluid-transport-zone(s) 403 (and/or crushed rock and gravel layer(s)/pad(s) 405) may physically help support the weight of the LLW cells 301 (that may be filled with LLW material(s) and/or with protective-medium 505).

Continuing discussing FIG. 6, in some embodiments, supplementary-water-collection-well(s) 305 may be vertically implemented strategically at multiple locations across the areal extent of the OPM of MOPR 200 to collect and drain away collected waters. In some embodiments, bottom portion(s) of supplementary-water-collection-well(s) 305 may be inserted into fluid-transport-zone(s) 403 (and/or crushed rock and gravel layer(s)/pad(s) 405). In some embodiments, bottom portion(s) of supplementary-water-collection-well(s) 305 may be floating on fluid-transport-zone(s) 403 (and/or crushed rock and gravel layer(s)/pad(s) 405), but held vertically place by surrounding LLW cells 301, dividers 302, and/or cell-floor-ceiling-material 601. In some embodiments, bottom portion(s) of supplementary-water-collection-well(s) 305 may be anchored into bottom 207 (and/or into side(s) 209). In some embodiments, supplementary-water-collection-well(s) 305 may drain into fluid-transport-zone(s) 403 (and/or crushed rock and gravel layer(s)/pad(s) 405).

FIG. 6 shows that a given LLW cell 301 may have a cell-width/length 603 (dimensions in a horizontal plane) and a cell-height 605 (dimension in a vertical plane). In some embodiments, cell-width/length 603 may be a length and/or a width of a given LLW cell 301 in a lateral or horizontal direction. In some embodiments, cell-height 605 may be a height of a given LLW cell 301 in a vertical direction. In some embodiments, cell-width/length 603 may be perpendicular/orthogonal to cell-height 605. In other embodiments, cell-width/length 603 and/or cell-height 605 may be of predetermined, fixed, and/or finite dimension(s). In some embodiments, cell-length 603 may be about thirty (30) feet long, plus or minus five (5) feet. In some embodiments, cell-width 603 may be about twenty (20) feet wide, plus or minus five (5) feet. In some embodiments, cell-height 605 may be about twenty (20) feet tall, plus or minus five (5) feet. In other embodiments, cell-width/length 603 and/or cell-height 605 may be of different dimensions. In some embodiments, a given LLW cell 301 may have dimensions of thirty (30) feet long by twenty (20) feet wide by twenty (20) feet tall. In some embodiments, when filling a given LLW cell 301 that has already been filled with LLW material(s), protective-medium 505 may be filled in that LLW cell 301 to a height of cell-height 605.

Figure 7:
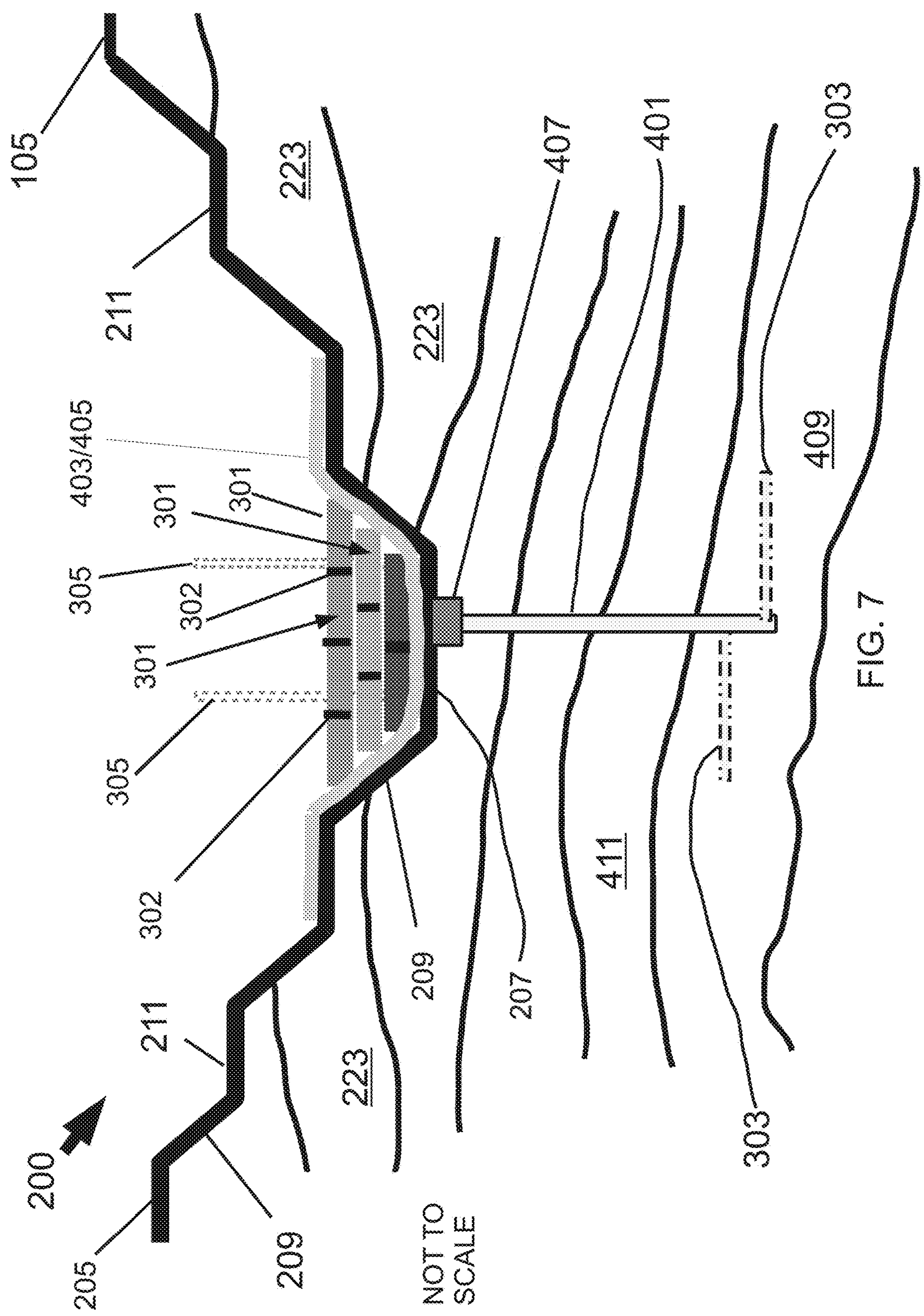
FIG. 7 shows a vertical cross-section through a given MOPR.

FIG. 7 shows a vertical cross-section through MOPR 200. FIG. 7 shows the OPM portions of MOPR 200 as well as structures (e.g., main-water-dispersion-wellbore(s) 401, radial-wellbore(s) 303, and/or sand/gravel filter 407) of MOPR 200 that are constructed/placed below the OPM portions. FIG. 7 also shows that at least some of the OPM of MOPR 200 may be modified (e.g., with the inclusion of dividers 302, LLW cells 301, supplementary-water-collection-well(s) 305, and/or a fluid-transport-zone 403 of gravel/rock 405). FIG. 7 may also that the LLW cells 301 may be stacked upon each other vertically, and/or stacked vertically onto mostly/substantially horizontal portions of side(s) 209 of the OPM as volume 201 may be filled up from the bottom upwards with LLW cells 301. For example, and without limiting the scope of the present invention, FIG. 7 may show three separate and distinct rows (layers) of LLW cells 301, with each row being at a different vertical height in volume 201 of the OPM.

FIG. 7 may be similar to FIG. 4, except in FIG. 7 the LLW materials (and protective-medium 505) may be disposed in thick (e.g., about five [5] feet thick) individual lamellar sheets, horizontally layered, and vertically separated polygonal segments in the OPM portions of MOPR 200. FIG. 7 may differ from FIG. 4 in how the LLW cells 301 are formed and laid out within volume 201. In FIG. 7, a given horizontal layer (row) of LLW cell(s) 301 may be formed at a given height/elevation within volume 201, working from the bottom upwards. In FIG. 7, vertical divider(s) 302 may be specific for a given layer of LLW cell(s) 301 of a given height/elevation within volume 201; such that the vertical divider(s) 302 of each horizontal layer (row) do not necessarily pass/extend vertically upwards and/or downwards into a different layer of LLW cell(s) 301 at a different height/elevation within volume 201. Whereas, in FIG. 4, a given vertical divider 302 may pass through/extend through several different horizontal rows of LLW cells 301.

Continuing discussing FIG. 7, in some embodiments, a given horizontal layer (row) of LLW cell(s) 301 may be formed by placing one or more vertical divider(s) 302, in a vertical orientation, at a height/elevation in volume 201 for that given horizontal layer (row) of LLW cell(s) 301; and then filling each such formed horizontal layer (row) of LLW cell(s) 301 with LLW materials along with protective-medium 505 to a top height of that given horizontal layer (row) of LLW cell(s) 301. In some embodiments, prior to positioning the one or more vertical divider(s) 302 for that given horizontal layer (row) of LLW cell(s) 301, cell-floor-ceiling-material 601 may be laid down first to create a floor (floor barrier) for that given horizontal layer (row) of LLW cell(s) 301.

Continuing discussing FIG. 7, in some embodiments, each horizontal layer (row) of LLW cell(s) 301, at a given elevation within volume 201, may have a plurality of LLW cell(s) 301, at that given elevation; and each such LLW cell(s) 301 of that specific layer may be bounded around the vertical sides of the LLW cell 301 by one or more vertical divider(s) 302. In some embodiments, each LLW cell 301 of a given horizontal layer (at a given elevation within volume 201) may have a mostly/substantially polygonal shape when that given LLW cell 301 is viewed from above, with the sides of that polygonal shape being formed from the vertical divider(s) 302.

Continuing discussing FIG. 7, in some embodiments, each such formed given horizontal layer (row) of LLW cell(s) 301, may have a height (e.g., cell-height 605). In some embodiments, the height (e.g., cell-height 605) of each formed given horizontal layer (row) of LLW cell(s) 301 may be fixed, finite, and/or predetermined. In some embodiments, the height (e.g., cell-height 605) of each formed given horizontal layer (row) of LLW cell(s) 301 may be five (5) feet, plus or minus six (6) inches. In some embodiments, the height (e.g., cell-height 605) of each formed given horizontal layer (row) of LLW cell(s) 301 may be another dimension. In some embodiments, the height (e.g., cell-height 605) of one formed given horizontal layer (row) of LLW cell(s) 301 (at a first elevation within volume 201) may be different from the height (e.g., cell-height 605) of another (different) formed given horizontal layer (row) of LLW cell(s) 301 (at a different [second] elevation within volume 201).

Continuing discussing FIG. 7, in some embodiments, the vertical dividers 302 may have vertical height that is the same or (just a bit) longer than the height (e.g., cell-height 605) of a formed given horizontal layer (row) of LLW cell(s) 301. In some embodiments, the vertical height of a given vertical divider 302 may be longer/higher than the height (e.g., cell-height 605) of its formed given horizontal layer (row) of LLW cell(s) 301, by a thickness of cell-floor-ceiling-material 601. In some embodiments, each LLW cell 301 of a given layer (row) (at a given elevation within volume 201) may be filled with LLW materials and with protective-medium 505 to the height (e.g., cell-height 605) of the given LLW cell 301.

In some embodiments, the at least one LLW cell 301 may be a plurality of LLW cells 301. In some embodiments, at least some LLW cells 301 selected from the plurality of LLW cells 301 may be laid down and formed within volume 201 in a horizontal layer configuration, with other LLW cells 301 selected from the plurality of LLW cells 301 may be subsequently laid down in within volume 201 in another/different horizontal layer configuration. See e.g., FIG. 7.

Note, forming the empty LLW cell(s) 301 of a given layer of empty LLW cell(s) 301, at a given elevation within volume 201, by use of vertical divider(s) 302 (and with cell-floor-ceiling-material 601 in some embodiments) may be somewhat similar to forming a region for a concrete slab pour. And once the empty LLW cell(s) 301 of a given layer of empty LLW cell(s) 301, at a given elevation within volume 201, have been so formed; filling those formed LLW cell(s) 301 of a given layer of LLW cell(s) 301, with LLW materials and with protective-medium 505, may be similar to pouring a concrete slab within its forms.

Figure 8:
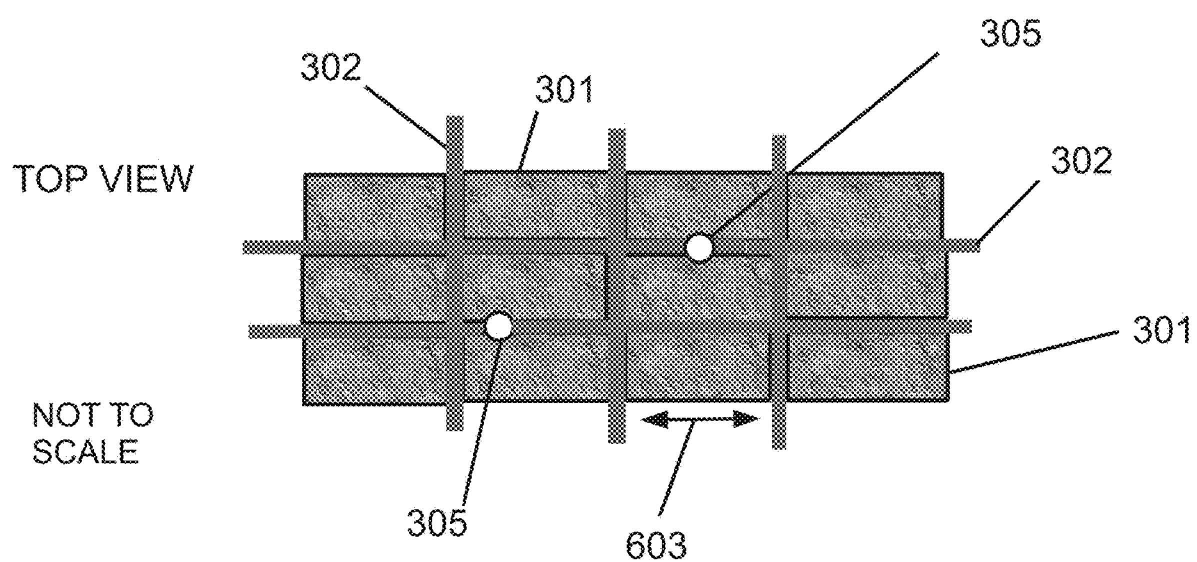
FIG. 8 illustrates a top-down (plan) view looking down on a section of an OPM portion of a given MOPR being used as a repository for LLW materials.

FIG. 8 illustrates a top-down (plan) view looking down on a section of an open pit OPM portion of MOPR 200 being used as a repository for LLW materials disposed of in LLW cells 301 within volume 201 of the OPM. Note, FIG. 8 may be a top-down (plan) view of a section of FIG. 3, FIG. 4, FIG. 6, and/or FIG. 7. Note, no main-water-dispersion-wellbore 401 are shown in FIG. 8 (e.g., main-water-dispersion-wellbore 401 are either omitted for clarity in FIG. 8 and/or the overall section shown in FIG. 8 is a section without main-water-dispersion-wellbore 401). In some embodiments, the LLW materials may be disposed of in LLW cells 301 (or blocks 301) which may be separated from each other by vertical dividers 302. In some embodiments, a shape of such LLW cells 301 may be at least mostly (substantially) polygonal (e.g., rectangular) when viewed from above. In some embodiments, horizontal dividing material, cell-floor-ceiling-material 601, may also implemented between the tops and the bottoms of the LLW cells 301. These horizontal dividers cell-floor-ceiling-material(s) 601 are not shown in FIG. 8 because FIG. 8 is a top-down (plan) view.

Figure 9:
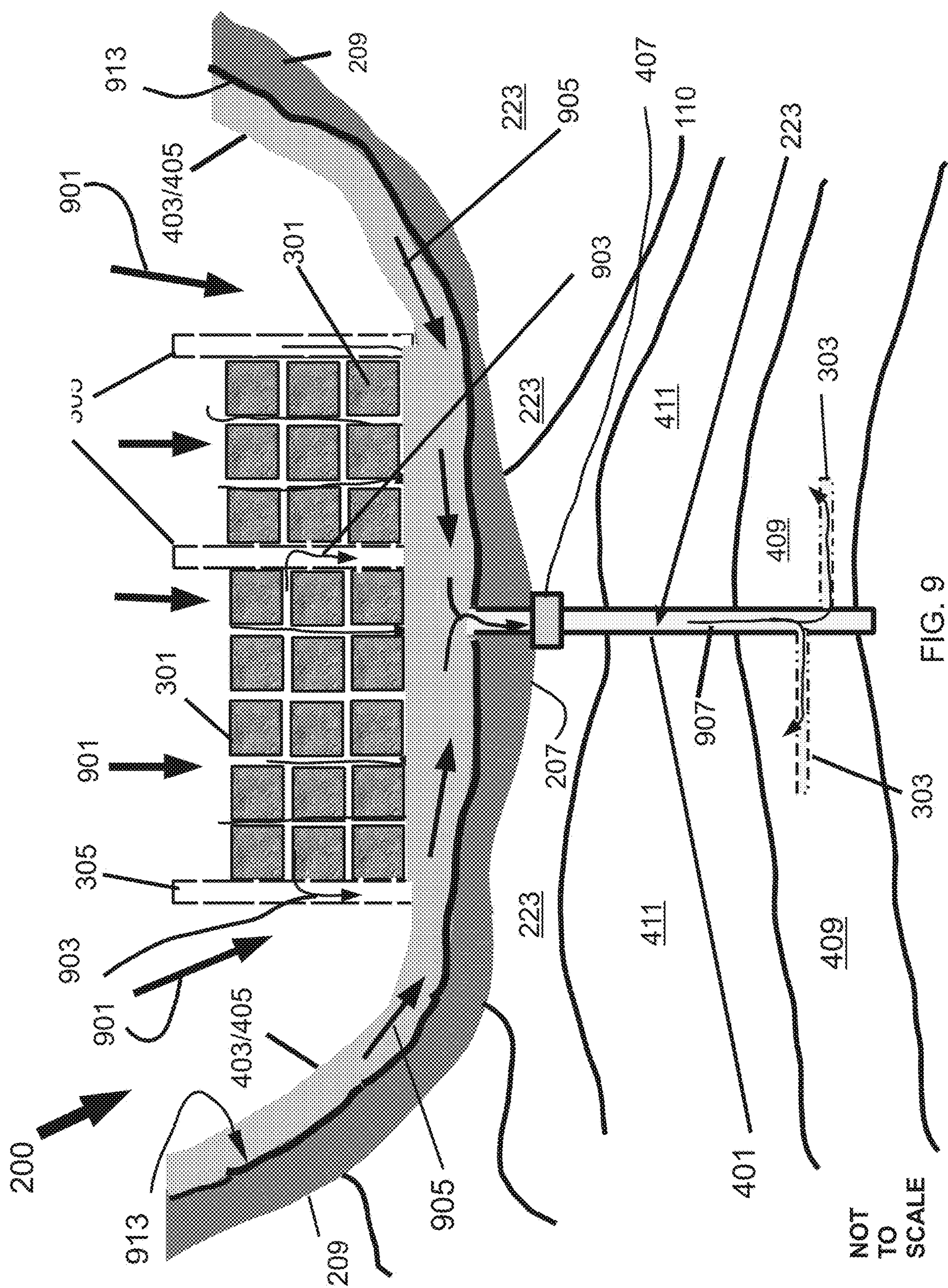
FIG. 9 shows a vertical cross-section through a given MOPR showing water drainage pathways beginning as rain and ending up with such collected water in a particular geologic formation referred to as, "water-dispersion-zone."

Continuing discussing FIG. 8, in some embodiments, supplementary-water-collection-well(s) 305 may be vertically implemented strategically across the plan of the OPM of MOPR 200 to collect and drain away collected waters in a manner shown in FIG. 9. In some embodiments, the supplementary-water-collection-well(s) 305 shown in FIG. 8 may be in plan view (top-down view). In some embodiments, bottom portions of the supplementary-water-collection-well(s) 305 may be positioned to discharge and drain waters into fluid-transport-zone 403 (crushed rock and gravel layer/pad 405) at the bottom of the OPM portion of MOPR 200 (this is not shown in FIG. 8 but is shown in FIG. 9). Also shown in FIG. 8 may be several (e.g., twelve [12]) completed/formed LLW cells 301 which may be constructed as three-dimensional blocks of finite sizes from vertical dividers 302 and cell-floor-ceiling-material 601. In some embodiments, the formed LLW cells 301 may be filled with LLW materials and with protective-medium 505. In some embodiments, cell-length 603 of LLW cell 301 may be about thirty (30) feet plus or minus five (5) feet; and in some embodiments, cell-width 603 of LLW cell 301 may be twenty (20) feet plus or minus five (5) feet—as indicated earlier in the FIG. 6 discussion. In some embodiments, a given cell 301 may be about thirty (30) feet by twenty (20) feet by twenty (20) feet in all three dimensions.

FIG. 9 may be similar to FIG. 4 and/or similar to FIG. 7, but FIG. 9 may be further annotated to show water drainage pathways beginning as rain 901 and ending up in geologic formation water-dispersion-zone 409. FIG. 9 may show how water may generally flow, be collected, directed, and disposed of (dispersed) within the geologic formation of water-dispersion-zone 409. FIG. 9 may show how water may flow with respect to structures, components, and/or elements of MOPR 200 shown in FIG. 2A, FIG. 2B, FIG. 3, FIG. 4, FIG. 5, FIG. 6, FIG. 7, and/or FIG. 8. In FIG. 9, not all elements, components, and/or structures of a given MOPR 200 system may be shown; however, water collection, water flow, and/or water disposal/dispersion aspects MOPR 200 may be shown in FIG. 9.

FIG. 9 shows a vertical cross-section through MOPR 200. FIG. 9 shows the OPM portions of MOPR 200 as well as structures (e.g., main-water-dispersion-wellbore(s) 401, radial-wellbore(s) 303, and/or sand/gravel filter 407) of MOPR 200 that are constructed/placed below the OPM portions. FIG. 9 also shows that at least some of the OPM of MOPR 200 may be modified (e.g., with the inclusion of dividers 302, LLW cells 301, supplementary-water-collection-well(s) 305, and/or a fluid-transport-zone 403 of gravel/rock 405). FIG. 9 may also that the LLW cells 301 may be stacked upon each other vertically, and/or stacked vertically onto mostly/substantially horizontal portions of side(s) 209 of the OPM as volume 201 may be filled up from the bottom upwards with LLW cells 301.

FIG. 9 also shows rain 901 falling into volume 201 of the OPM of MOPR 200. In some embodiments, rain 901 may: fall into supplementary-water-collection-well(s) 305; flow onto and around filled LLW cells 301 (which may be hydrophobic); flow onto upper/exterior surfaces of bottom 207; flow onto upper/exterior surfaces of side(s) 209; flow through and into fluid-transport-zone 403; flow through and into crushed rock and gravel layer/pad 405; flow through and into sand/gravel filter 407; flow through and into main-water-dispersion-wellbore(s) 401; flow through and into radial-wellbore(s) 303; and lastly, flow through and into water-dispersion-zone 409 (a geologic formation conductive for receiving and moving water).

Continuing discussing FIG. 9, in some embodiments, water 903 inside of supplementary-water-collection-well(s) 305 (e.g., from rain 901 or elsewhere) may flow down and into fluid-transport-zone 403 and/or crushed rock and gravel layer/pad 405. In some embodiments, water 905 flowing (downwards) through fluid-transport-zone 403 and/or crushed rock and gravel layer/pad 405, may flow into sand/gravel filter(s) 407 and/or into main-water-dispersion-wellbore(s) 401. In some embodiments, water from sand/gravel filter(s) 407 may flow downwards into and through main-water-dispersion-wellbore(s) 401. In some embodiments, water 907 within main-water-dispersion-wellbore(s) 401 may flow into radial-wellbore(s) 303. In some embodiments, water within radial-wellbore(s) 303 may then flow into geologic formation(s) of water-dispersion-zone 409.

Continuing discussing FIG. 9, in some embodiments, at least some rain 901 may avoid most or all of supplementary-water-collection-well(s) 305 and instead hit side(s) 209, bottom 207, fluid-transport-zone 403, and/or crushed rock and gravel layer/pad 405—and such water may eventually reach and flow into and through fluid-transport-zone 403 and/or crushed rock and gravel layer/pad 405, wherein that water is designated as water 905. Water 905 in fluid-transport-zone 403 and/or crushed rock and gravel layer/pad 405 may flow as noted above (i.e., water 905 may flow into sand/gravel filter(s) 407 and/or into main-water-dispersion-wellbore(s) 401).

Continuing discussing FIG. 9, in some embodiments, at least some rain 901 and/or water reaching LLW cells 301 may flow into supplementary-water-collection-well(s) 305, wherein such water is then designated as water 903 and may flow as noted above. Rain 901 and/or water hitting/reaching LLW cells 301 that does not flow into supplementary-water-collection-well(s) 305, may instead flow downwards until reaching fluid-transport-zone 403 and/or crushed rock and gravel layer/pad 405, wherein such water may be designated as water 905 and may flow as noted above.

Continuing discussing FIG. 9, in some embodiments, the water flow/drainage shown in FIG. 9 may be occur by gravity and/or via hydrostatic head/pressure (e.g., within main-water-dispersion-wellbore(s) 401 and/or radial-wellbore(s) 303). In some embodiments, side(s) 209 may slope downwards to bottom 207; and bottom 207 may drain into wellhead(s) 213, opening(s) to sand/gravel filter(s) 407, and/or opening(s) to main-water-dispersion-wellbore(s) 401. In some embodiments, bottom most location(s) of bottom 207 may have wellhead(s) 213, opening(s) to sand/gravel filter(s) 407, and/or opening(s) to main-water-dispersion-wellbore(s) 401. In some embodiments, bottom most location(s) of bottom 207 may be attached to wellhead(s) 213, opening(s) to sand/gravel filter(s) 407, and/or opening(s) to main-water-dispersion-wellbore(s) 401. In some embodiments, wellhead(s) 213 may be an opening to sand/gravel filter(s) 407, and/or to main-water-dispersion-wellbore(s) 401. In some embodiments, at least some upper/exterior surfaces of side(s) 209 and/or of bottom 207 may be at least partially covered with fluid-transport-zone 403 and/or crushed rock and gravel layer/pad 405. In some embodiments, fluid-transport-zone 403 and/or crushed rock and gravel layer/pad 405 may slope downwards towards wellhead(s) 213, opening(s) to sand/gravel filter(s) 407, and/or opening(s) to main-water-dispersion-wellbore(s) 401. All such sloping may be general be done to minimize pooling of water. Essentially any water (or other liquid), whether rain 901 or otherwise (runoff and/or flood waters), reaching volume 201 may flow as shown in FIG. 9 and/or as described above. In some embodiments the geologic water disposal/dispersion formation (water-dispersion-zone 409) may be hydraulically "fraced" by conventional fracturing operations to increase water disposal/dispersion rates within water-dispersion-zone 409.

Figure 10:
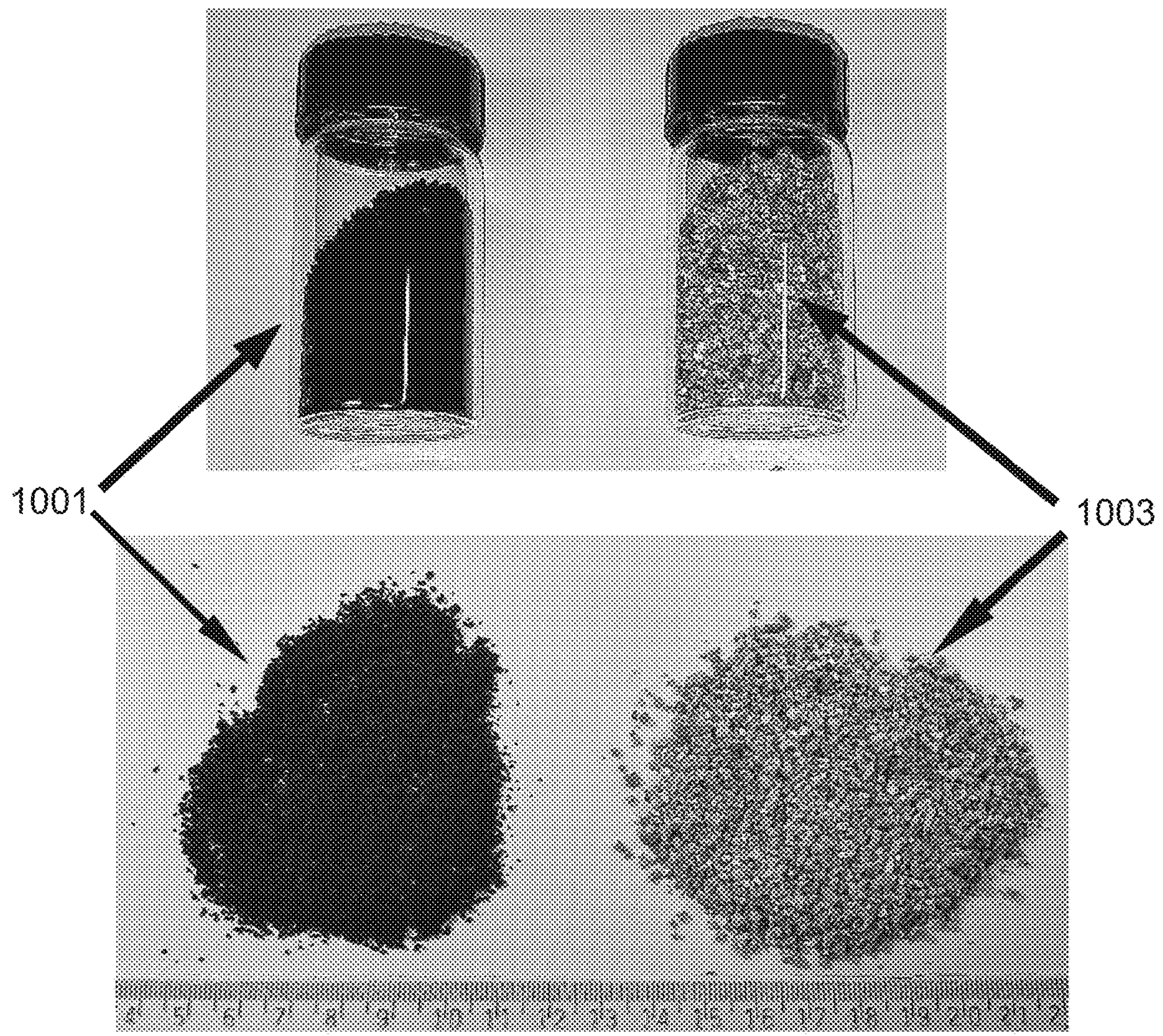
FIG. 10 shows illustrations/depictions of carbon nanotubes (CNT) aggregates (vermiculite activated medium) and exfoliated vermiculite material aggregates.

FIG. 10 shows illustrations/depictions of carbon nanotubes (CNT) aggregates 1001 and exfoliated vermiculite material aggregates 1003. In some embodiments, CNTs 1001 and/or exfoliated vermiculite material aggregates 1003 may be ingredients of protective-medium 505. In some embodiments, protective-medium 505 may include one or more of the following materials (ingredients): carbon nanotubes aggregates 1001 (CNT 1001), carbon nanotubes, exfoliated vermiculite material aggregates 1003, graphene derivatives, bentonite clays, bentonite fluids, tars, bitumen, heavy oils, cement slurries, regular cement slurries, specialized cement slurries, foam, foam slurries, foamed cement slurries, foam cement, retarders, accelerators, portions thereof; combinations thereof, and/or the like.

In some embodiments, protective-medium 505 may comprise foam cement (slurry) and carbon nanotubes aggregates 1001 (CNT 1001). In some embodiments, protective-medium 505 may comprise foam cement (slurry), carbon nanotubes aggregates 1001 (CNT 1001), and exfoliated vermiculite material aggregates 1003. In some embodiments, protective-medium 505 may comprise foam cement (slurry), carbon nanotubes aggregates 1001 (CNT 1001), and at least one other predetermined ingredient. In some embodiments, protective-medium 505 may comprise foam cement (slurry), carbon nanotubes aggregates 1001 (CNT 1001), exfoliated vermiculite material aggregates 1003, and at least one other predetermined ingredient. In some embodiments, the at least one other predetermined ingredient (of protective-medium 505) may be one or more of: graphene, graphene flakes, graphene oxide(s), graphene derivative(s), portions thereof, combinations thereof, and/or the like. In some embodiments, graphene flakes may be homogeneously dispersed within protective-medium 505.

In some embodiments, the graphene based protective-medium 505 additive may also make significant changes in the physical and/or the mechanical properties of protective-medium 505. For example, and without limiting the scope of the present invention, with only 0.1% by weight (wt.) of graphene flakes may result in a 31% increase in Young's modulus (stress to strain ratio), a 40% increase in tensile strength, and 53% increase in fracture toughness—versus media without the graphene flakes.

In some instances, the improvements in mechanical properties by inclusion of graphene may be similar to those with CNTs but may be achieved with much lower weight fractions. The improved properties relative to CNTs may be due to enhanced adhesion between the graphene and protective-medium 505 matrix; high surface area of the graphene material; and/or two-dimensional (2D) geometric nature of the graphene material.

Foam cement slurries with densities as low as 0.48 grams per cubic centimeter (g/cc) have been utilized in industry. The foam cement quality and physical properties may easily be adapted by varying the gas component (e.g., nitrogen, air, or the like) used in the foam process. In this patent application a range of foam cement slurry protective-medium 505 densities may be selected from a range of 0.4 g/cc to 1.2 g/cc, including either or both of those endpoints of that range and densities in between.

Foamed cement slurries are well known in industry. These slurries are usually generated by mixing a gas phase (such as, but not limited to, nitrogen or air) with a cement slurry and selective surfactants to keep the discrete gas phase bubbles stable until the cement slurry sufficiently sets/cures. Chemical accelerators and/or chemical retarders may be added to control the chemistry of reaction(s) in the foamed cement slurry; and thus, decrease or increase slurry setting/curing time(s). The gas phase modifies the foam cement density but has a small effect on the compressive strength of the slurry when set, cured, and/or hardened.

Another quality of the foamed cement (slurry) is its ductility compared to untreated cement slurry. Foam cement has a ductility at least one order of magnitude more ductile than regular cement (non-foamed cement). This property means that the foam cement may deform under tensile stress without fracturing. This ductility provides for additional benefits in the LLW disposal processes explained and described herein, wherein the formed (and filled) LLW cells 301 may fluctuate, i.e., increase or decrease in size, with temperature and pressure changes in the disposal environment. The foam cement may absorb and/or allow such variations in LLW cell 301 size without rupturing or breaking of the given LLW cells 301, with respect to expected temperatures and pressures.

An additional benefit of foam cement (slurry) in this patent application, is foam cement (slurry) ability to "bond" or adhere to solid surfaces. Foam cement (slurry) has better bonding properties than conventional (non-foam) cement slurries and because of this property the foam cement (slurry) may physically contact and adhere to LLW waste materials exterior surfaces better than other protective media. In some embodiments, protective-medium 505, with the ductile foam cement (slurry), may remain bonded to exterior surfaces of the LLW waste materials within a given LLW cell 301.

Foam cement (slurry) may currently cost about 15% more than regular cement (i.e., non-foam cement), however, this is not a major impediment to use of foam cement (slurry) in protective-medium 505, especially in the nuclear waste industry, wherein costs are routinely measured in billions of dollars.

A further complimentary and/or beneficial attribute of the foamed cement (slurry) of protective-medium 505, may be that the gas bubbles present in the foam cement (slurry) may "plate out" against the LLW material during the foam cement slurry setting/curing process. This thin layer of gas may provide a fluid barrier that may minimize migration of fluids from the LLW materials in physical contact with protective-medium 505. This gas layer which plates out, may allow the gas phase to selectively plug up (block) the interstitial pore spaces in the matrix of formed and filled LLW cells 301 and this increase in gas saturation may lower the relatively permeability for other fluid phases which may try to migrate or flow through the connected pore spaces away from the disposed LLW waste materials within the given formed and filled LLW cells 301. Such lowered fluid flow characteristics may prevent or block the LLW waste product fluids from migrating away from the disposal location and thus be an additional beneficial effect of this novel process of nuclear LLW waste disposal.

In some embodiments, a given foam cement slurry (of protective-medium 505) may have a density selected from a range of 0.4 grams per cubic centimeters (g/cc) to 1.2 g/cc (including those endpoints). In some embodiments, forming a given foam cement slurry may entail mixing a given cement slurry with a given gas to form the given foam cement slurry. In some embodiments, this gas may be at least one of: nitrogen, air, and/or carbon dioxide. In other embodiments, other gasses may be used.

In some embodiments, protective-medium 505 may be prepared from its components onsite (e.g., at the OPM of MOPR 200) by blending of its ingredients and other mechanical means and then being made immediately available for injection and utilization in the modular disposal LLW cells 301 which are constructed within volume 201 of the given OPM of MOPR 200, for receiving the LLW materials and the protective-medium 505.

Continuing discussing FIG. 10, exfoliated vermiculite material aggregates 1003 may possess novel and useful chemical, electrical, and/or physical properties for applications in the LLW disposal. In some embodiments, protective-medium 505 may comprise exfoliated vermiculite material aggregates 1003. In particular, exfoliated vermiculite material aggregates 1003 may be widely available; have a generally low price; have beneficial chemical structure; be processed by non-sophisticated equipment; and/or form a substrate on which chemical absorption may occur readily and effectively. All these qualities and/or properties of exfoliated vermiculite material aggregates 1003 may effectively help with LLW disposal.

Vermiculite is a mineral. Vermiculite is a mica, a hydrated, magnesium-iron-aluminum trioctahedral sheet silicate of varied composition. The term "vermiculite" applies to a group of minerals characterized by their ability to expand into long strands when heated. This expansion process is called exfoliation. Expanded vermiculite also has a very large chemically active surface area, which makes it useful as an absorbent in some chemical processes and ideal for use in absorbing radionuclides present in the LLW disposal processes.

A typical approximate chemical composition of commercial vermiculite is as follows: 38-46% silicon dioxide ($SiO_2$), 16-35% magnesium oxide (MgO), 10-16% aluminum oxide ($Al_2O_3$), 8-16% water, and plus lesser (trace and/or trivial) amounts of several other chemicals like iron oxide ($Fe_2O_3$), calcium oxide (CaO), and/or titanium oxide (TiO2).

Currently, virtually all vermiculite ores require mineral processing, by either dry air methods or by wet froth flotation methods before exfoliation. Currently, processing of vermiculite is needed before any industrial and commercial use. Exfoliation is the accepted industrial practice to prepare vermiculite for the marketplace. Pure vermiculite can be exfoliated up to thirty (30) times its original thickness when heated to about 1,600 to 2,000 degrees Fahrenheit (° F.) (or 870 to 1,100 degrees Celsius [° C.]). The exfoliation results from the flash conversion of interlayer water molecules into steam. High porosity develops as the layers are forced apart into an accordion-like structure.

Worldwide, vermiculite is readily available and in massive quantities. At least some major regions of vermiculite natural availability are in North America, Europe, Asia-Pacific, South America, the Middle East, and Africa. Annual worldwide production is about 500,000 metric tons (mt). The volumes of vermiculite available today are sufficient to meet any foreseeable need for the use of this mineral in LLW disposal processes. In addition, the current (2021) prices of exfoliated vermiculite are in the range of $100/mt to $200/mt which is low enough to make the widespread use of exfoliated vermiculite in protective-medium 505 very attractive.

Continuing discussing FIG. 10, the carbon nanotubes aggregates 1001 (CNT 1001) may sometimes referred to as vermiculite activated medium (VAM). CNTs are tubes which are nanometers in diameters and made in the form of cylindrical carbon molecules. Structurally, CNTs have an outer wall or external surface, an inner cavity (tube), and also have inter-wall space between coaxial tubes of the molecular structures. This unique molecular structure allows the CNT material to act as an effective absorbent and as efficient barrier to radionuclide migration in LLW disposal processes.

CNTs may possess novel and useful chemical, electrical, and/or physical properties for applications in industry and materials science. CNTs have many different uses. CNTs possess exceptional properties which may be exploited in LLW disposal. In particular, CNTs have efficient and effective absorption properties, including for radionuclides, that may be used effectively in LLW disposal.

Some prior art related to LLW disposal has recommended and used CNTs as a buffer or absorbent system in radioactive waste disposal, wherein the CNT material is implemented as a localized backfill or discrete plug in a disposal system such as a wellbore or surrounding a capsule in a disposal vault. That intended prior art approach, was to absorb radionuclides migrating from the waste material. This plug or backfill approach has drawbacks in efficacy and efficiency. Its effectiveness is mostly localized to the plugged area around the waste; and plug may be easily bypassed by migrating radionuclides in flow away from the waste and where the vast content (portion) of the waste is not being directly contacted by the CNTs buffers. Also, the prior art approach of CNTs use may only affect a small portion of the waste material adjacent to the backfill or the plug zone (location).

In contrast to the prior art approaches, in some embodiments, the CNTs (CNT 1001) may be in direct surface contact with exterior surfaces of the LLW materials and CNT 1001 may be interstitially dispersed within the LLW material matrix (LLW cell 301). In some embodiments, CNT 1001 may be an integral part of and literally distributed in three dimensions, in and around, the LLW materials within a given LLW cell 301, since the LLW materials are immersed in protective-medium 505 within the given LLW cell 301. The LLW materials, the radionuclides, and the CNT 1001 (in/of protective-medium 505) may be considered a mostly dispersed homogenous mixture/matrix, e.g., as shown in FIG. 5.

As opposed to other industrial uses of CNT in electronics and optical industries, CNT purity is not a critical requirement, nor is it a limiting factor, in LLW disposal technologies as taught in this patent application. There is no need for high purity CNTs for use in protective-medium 505 for LLW disposal as illustrated and taught herein. CNT for LLW disposal may be impure. In some embodiments, CNT 1001 may be impure. Note, electronics often require CNT purity close to 99% pure or better. Our applications require considerably less purity, which is considerably cheaper to manufacture. In some embodiments, CNT 1001 may be less than: 99% pure, 95% pure, 90% pure, 85% pure, 80% pure, 75% pure, or 70% pure.

CNTs in general exhibit high chemical stability and have large surface area. The free electrons in CNTs may be able to form strong chemical bonds with radionuclides. Published data has shown the effective ability of CNTs to adsorb crucial radionuclides in LLW products.

CNTs may provide strong surface activity reactions. Analytical means to analyze these reactions may be "surface complexation models" and/or chemisorption models as the primary adsorption mechanisms for radionuclides. Surface complexation models describe sorption based on surface reaction equilibrium. The radionuclides may be bound to CNTs in at least two forms, fast adsorption on the outer surfaces of CNTs and slow adsorption in the inner channels of CNTs. It has been reported that more and more radionuclides may enter the inner channel of CNTs with over increasing time and form strong complexes in the central channel of CNTs.

The radionuclides in the inner channel of CNTs may be difficult to be desorbed from CNTs, whereas the adsorbed radionuclides on the outer surfaces of CNTs may be desorbed from CNTs. Comparing to other adsorbents, the irreversible adsorption of radionuclides on CNTs is much more important for radionuclides disposal for long time periods.

Some embodiments of this patent application teach means whereby an effective protective-medium 505 may be implemented by a combination of materials that may be produced economically and be effective in LLW radionuclide protection. In some embodiments, protective-medium 505 may comprise carbon nanotubes (CNTs) (CNT 1001) which have demonstrated excellent qualities in the absorption of dangerous radionuclides. These CNT products (CNT 1001) are expected to be blended with specialized foam cement slurries to form a novel protective-medium 505 utilized in the disposal process for the LLW materials in LLW cells 301 in the OPM of MOPR 200.

In regular industrial practice, production of high quality/purity CNTs has been an expensive and quantity limited undertaking. In CNT synthesis, a precursor or carbon source and a catalyst source are both required. It has been discovered that naturally occurring materials may have the necessary catalyst material to allow for synthesis of CNTs. This approach utilizing naturally occurring materials may be used herein such that massive amounts of the CNTs (CNT 1001) may be produced economically for use in protective-medium 505.

In some embodiments, a material for the CNT catalyst source in CNT formation is naturally occurring clay vermiculite. However, other naturally occurring materials like bentonite, laterite, and/or other clays, may also be used to produce CNT 1001 for use in protective-medium 505. Vermiculite is both readily abundant and affordable; and vermiculite may be processed in granular form for use in the fluidized bed reactors for CNT 1001 synthesis. In addition, these natural vermiculite minerals when used in CNT 1001 formation do not require any additional catalysts or pretreatment for synthesis of CNT 1001 and as such may replace the expensive catalysts previously used in the manufacturing of high purity CNT materials. These natural materials contain natural catalyst materials useful in the product of CNT 1001 for use in protective-medium 505. As noted, CNT 1001 for use in protective-medium 505 need not be high quality/purity. The affordable cost of vermiculite, reduces the prior high cost of manufacturing CNTs, such that production of (lower quality/purity) CNT 1001 is very economic.

In some embodiments, with respect to CNT 1001 production, the CNT carbon source or precursor may be a hydrocarbon like ethylene or methane. In some embodiments, ethylene may be used in the preparation of CNT 1001. Ethylene is a widely available, inexpensive (e.g., at $1,000 USD per metric ton [at 2017-2021 pricing]), and safely transported byproduct of the crude oil refining and natural gas industry. Current worldwide capacity (2020) of ethylene production is about 200 million tons annually.

A process and method of CNT 1001 manufacture is by the use of fluidized bed reactors into which the vermiculite and ethylene are introduced under specific operating conditions. The operating conditions for the fluidized bed reactors are as follows: generally, temperature conditions are in a range of 300 degrees Celsius (° C.) to 1,600 degrees Celsius (° C.); and the pressure conditions are in a range from near atmospheric to slightly above atmospheric pressure (or about 20 to 25 pounds per square inch [psi]).

Depending on CNT 1001 manufacture plant design capacity, several thousand metric tons per day of CNT 1001 may be produced with a single fluidized bed reactor. This end-product derived from the vermiculite material and the hydrocarbon (e.g., ethylene) precursors is vermiculite activated medium (VAM) CNT 1001 and is one of the components of protective-medium 505 used in the LLW disposal by at least some embodiments of the present invention.

An expected range of LLW radioactivity allows for an optimal design/blend of protective-medium 505. Based on the radioactivity level(s) of a specific batch of LLW, it may be possible to design and utilize a specific protective-medium 505 component set such that the LLW radionuclide migration problems may be minimized without over-designing the amount of vermiculite activated material (VAM) (CNT 1001) product blended into that protective-medium 505 formulation. For example, a batch of radioactive hospital gowns as LLW does not need the same level of protection as a set of industrial tools LLW used in a nuclear power plant demolition operation; and the amount of VAM (CNT 1001) used in the protective-medium 505 may be substantially less for the batch of radioactive hospital gowns LLW, since a smaller number of radionuclides may emanate (result) during the burial time of that specific type of LLW.

As indicated later, in FIG. 12 and/or in FIG. 14, the constituents (ingredients) of protective-medium 505, may be blended or mechanically combined on site (e.g., at the OPM of MOPR 200) as needed for filling in around LLW materials within LLW cells 301.

Figure 11:
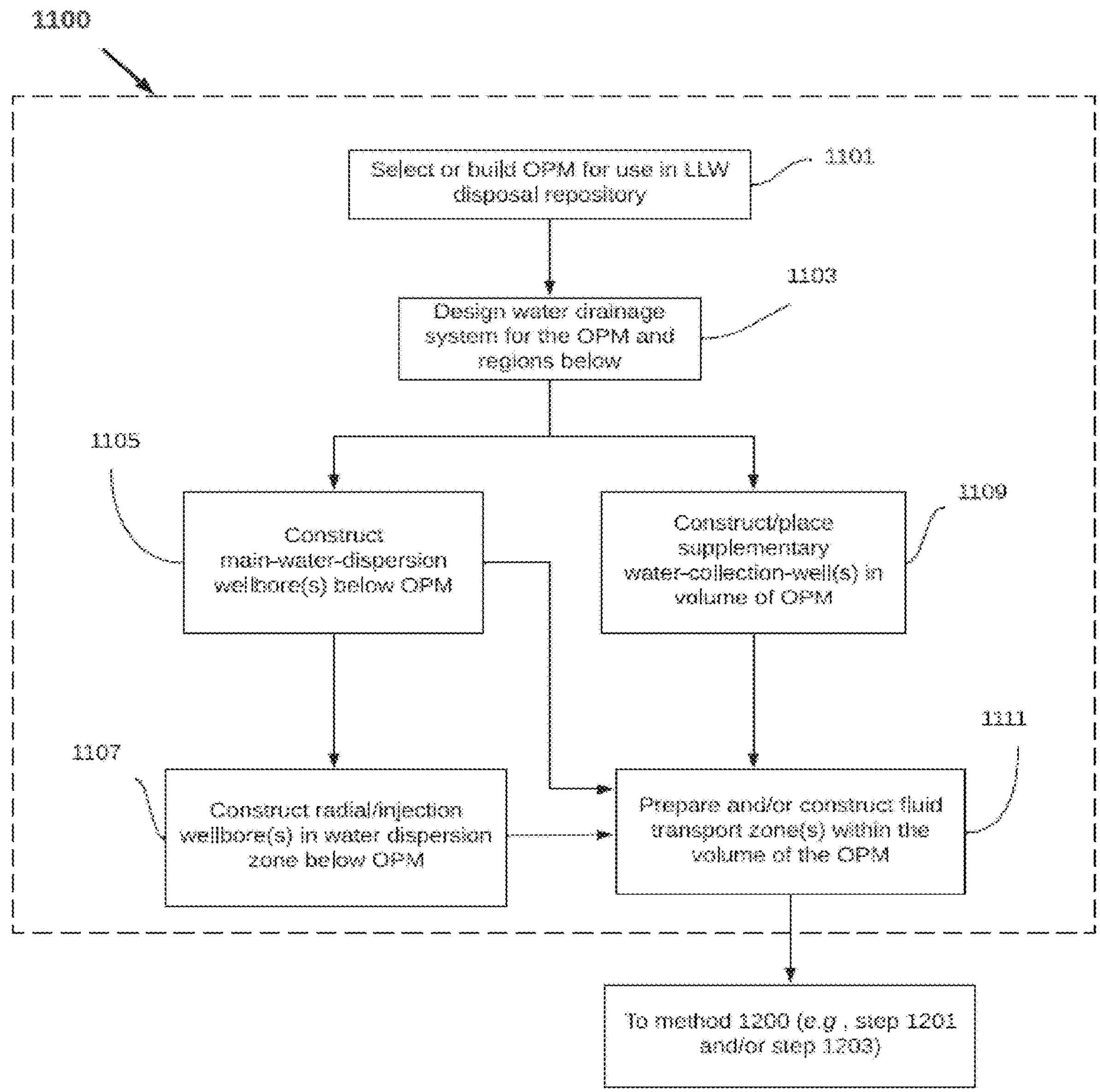
FIG. 11 is a flow diagram depicting a method of providing water drainage to an OPM, wherein that OPM is intended for use as a LLW disposal repository (MOPR).

FIG. 11 is a flow diagram depicting a method 1100. FIG. 11 is a flow diagram depicting at least one step of method 1100. In some embodiments, method 1100 may be a method of providing water drainage to an OPM (open pit mine), wherein that OPM, along with the water drainage, is intended for use as a LLW disposal repository (MOPR 200). In some embodiments, method 1100 may comprise one or more steps of: step 1101, step 1103, step 1105, step 1107, step 1109, step 1111, portions thereof, combinations thereof, and/or the like. In some embodiments, one or more of these steps may be omitted. In some embodiments, one or more of these steps may be executed out of numerical order. In some embodiments, one or more of these steps may be repeated.

Continuing discussing FIG. 11, in some embodiments, step 1101 may be a step of selecting and/or building an OPM for use as a LLW repository. In some embodiments, step 1101 may be a step of selecting a suitable repository site with sufficient capacity for receiving LLW materials and predetermined geologic formation (rock) properties there below. In some embodiments, a given suitable repository site may need to have a volume 201 large enough to accommodate millions of pounds of LLW materials therein. In some embodiments, a given suitable repository site may be a preexisting OPM (e.g., an abandoned and/or a decommissioned OPM) that is modified into a MOPR 200; and/or the given suitable repository site may be a newly built/constructed OPM according to the teachings herein (e.g., built as a MOPR 200). In some embodiments, step 1101 may be a step of selecting a preexisting OPM for use as a LLW repository. In some embodiments, step 1101 may be a step of selecting an abandoned and/or decommissioned OPM for use as a LLW repository. In some embodiments, step 1101 may be a step of building a new OPM for use as a LLW repository. In some embodiments, the OPM that may be used as a repository for LLW may be as the OPM described and/or shown in FIG. 2A, FIG. 2B, FIG. 3, FIG. 4, FIG. 6, FIG. 7, FIG. 9, portions thereof, combinations thereof, and/or the like. In some embodiments, step 1101 may progress into step 1103.

Continuing discussing FIG. 11, in some embodiments, in step 1103 the overall water collection, disposal (drainage), and injection system is designed to meet the overall needs of the LLW disposal process for a given MOPR 200. For example, the water drainage system shown in FIG. 9 may be designed to keep the OPM portions of the MOPR 200 (in particular the LLW cells 301) as dry as possible by removing most intrusive water from the OPM portions of the MOPR 200; and thus minimize liquid (water) fluid migration and any subsequent environmental impacts from the disposed LLW materials within the MOPR 200. In some embodiments, step 1103 may be a step of designing water drainage systems, components, elements, main-water-dispersion-wellbore(s) 401, radial-wellbore(s) 303, supplementary-water-collection-well(s) 305, fluid-transport-zone(s) 403, crushed rock and gravel layer(s)/pad(s) 405, sand/gravel filter(s) 407, MOPR 200 bottom 207 liner(s), side(s) 209 liner(s), portions thereof, combinations thereof, and/or the like for the MOPR 200, so that water (e.g., from rainfall, runoff, and/or flooding) getting into volume 201 of the MOPR 200 may largely drain out to a particular geologic formation, designated as "water-dispersion-zone 409," located below the OPM portions of the MOPR 200. In some embodiments, this design step 1103 may entail soil analysis and/or pilot wellbore drilling at various bottom 207 (and/or side 209) surface locations within volume 201 of the OPM portions of the MOPR 200. In some embodiments, this design step 1103 may entail determining/selecting quantities, locations, materials, diameters, depths, drilling equipment, portions thereof, combinations thereof, and/or the like, to construct and/or place the water drainage systems, components, elements, main-water-dispersion-wellbore(s) 401, radial-wellbore(s) 303, supplementary-water-collection-well(s) 305, fluid-transport-zone(s) 403, crushed rock and gravel layer(s)/pad(s) 405, sand/gravel filter(s) 407, bottom 207 liner(s), side(s) 209 liner(s), portions thereof, combinations thereof, and/or the like for the MOPR 200. In some embodiments, step 1103 may comprise engineering, environmental design, and/or assessments of the MOPR 200 for implementation of: the water drainage systems, components, elements, main-water-dispersion-wellbore(s) 401, radial-wellbore(s) 303, supplementary-water-collection-well(s) 305, fluid-transport-zone(s) 403, crushed rock and gravel layer(s)/pad(s) 405, sand/gravel filter(s) 407, bottom 207 liner(s), side(s) 209 liner(s), portions thereof, combinations thereof, and/or the like for the MOPR 200. In some embodiments, step 1103 may progress into step 1105, step 1109, and/or step 1111.

Continuing discussing FIG. 11, in some embodiments, step 1105 may be a step of constructing main-water-dispersion-wellbore(s) 401 for an above located OPM of the MOPR 200. Main-water-dispersion-wellbore 401 may be as discussed above. In some embodiments, the main-water-dispersion-wellbore(s) 401 of MOPR 200 may be sufficiently designed, sized, and constructed to handle the expected variations in rainfall and other water sources as needed at a given OPM portion of MOPR 200. In some embodiments, a given main-water-dispersion-wellbore 401 may be similar to water disposal wells currently utilized by the thousands in oil industry operations where hundreds of millions of barrels of wastewater are disposed of annually in the United States (U.S.). In some embodiments, in step 1105 main-water-dispersion-wellbore(s) 401 may be designed, installed, and/or constructed below the OPM portions of MOPR 200 that extend vertically downwards into water-dispersion-zone 409. In some embodiments, a given water-dispersion-wellbore 401 may be designed, installed, and/or constructed using the predetermined dimensions of well diameter, height (length/deepness), and perforation zones to allow for efficient water injection into the water-dispersion-zone 409 selected far below the OPM portions of MOPR 200. In some embodiments, expected water disposal (drainage) may be accomplished solely under gravity due to the hydrostatic head developed within a main-water-dispersion-wellbore 401. For example, and without limiting the scope of the present invention, the hydraulic head may be about 0.43 pounds per square inch (psi) per foot of fluid height. In some embodiments, in cases where the hydrostatic head may be insufficient, (displacement) pumps may be utilized to aid in water disposal. Such considerations may have been addressed in execution of step 1103. In general, a given main-water-dispersion-wellbore 401 may be begin at a wellhead 213 located at a lowest elevation of/in bottom 207 of the OPM portion of MOPR 200, and then penetrate mostly/substantially vertically downwards through various sediments and/or geologic formations until reaching the particular geologic formation of water-dispersion-zone 409. In some embodiments, main-water-dispersion-wellbore 401 may be cased (e.g., lined with pipe, piping, and/or cement). In some embodiments, casing of main-water-dispersion-wellbore 401 may protect the local water table (which may be located above water-dispersion-zone 409) from water moving through main-water-dispersion-wellbore 401. In some embodiments, MOPR 200 may comprise at least one main-water-dispersion-wellbore 401. In some embodiments, MOPR 200 may comprise one or more main-water-dispersion-wellbore(s) 401. In some embodiments, each main-water-dispersion-wellbore 401 may have a distal portion (disposed away from wellhead 213 and/or away from earth (terrestrial) surface 105) that extends to and/or into water-dispersion-zone 409. As used herein, "distal/terminal" portions of main-water-dispersion-wellbore 401 are those portions of main-water-dispersion-wellbore 401 that are disposed vertically downwards and away from wellhead 213 and/or away from earth (terrestrial) surface 105. See e.g., FIG. 4, FIG. 7, and/or FIG. 9. In some embodiments, step 1105 may progress into step 1107, if radial-wellbore(s) 303 (injection wellbore(s)) are deemed desired or necessary; otherwise, step 1105 may progress into step 1111. In some embodiments, radial-wellbore(s) 303 (injection wellbore(s)) may be desired or necessary depending upon properties of water-dispersion-zone 409 (e.g., water-dispersion-zone's 409 capacity to receive water).

Continuing discussing FIG. 11, in some embodiments, step 1107 may be a step of constructing one or more radial-wellbore(s) 303 (injection wellbore(s) 303) that extend away from and operatively connect to distal portion(s) of main-water-dispersion-wellbore 401 within water-dispersion-zone 409. Radial-wellbore(s) 303 may be as discussed above. Note, as used herein, "radial-wellbore" may be used interchangeably with "injection wellbore." This water injection system may comprise multiple radially disposed radial-wellbore(s) 303 emanating laterally (horizontally) from a primary main-water-dispersion-wellbore 401 as shown in FIG. 9 (and/or in FIG. 3). The design protocol of step 1103 may provide the dimensions, diameters, and radial lengths, of the radial-wellbore(s) 303 which enable adequate disposal of the water volumes collected by the: supplementary-water-collection-well(s) 305, fluid-transport-zone(s) 403, crushed rock and gravel layer(s)/pad(s) 405, bottom 207 liner(s), and/or side(s) 209 liner(s), into the deep porous water-dispersion-zone 409. Radial-wellbore(s) 303 may be referred as "radial" because when main-water-dispersion-wellbore 401 may be viewed from above, radial-wellbore(s) 303 may extend radially away from that main-water-dispersion-wellbore 401, see e.g., FIG. 3. In some embodiments, radial-wellbore(s) 303 may help to distribute draining water from volume 201 into water-dispersion-zone 409. In some embodiments, radial-wellbore(s) 303 may be extend in a mostly/substantially horizontal/lateral fashion entirely within water-dispersion-zone 409. In some embodiments, each main-water-dispersion-wellbore 401 may comprise at least one radial-wellbore 303. In some embodiments, each main-water-dispersion-wellbore 401 may comprise one or more radial-wellbore(s) 303. In some embodiments, each distal/terminal portion of main-water-dispersion-wellbore 401 may comprise at least one radial-wellbore 303. In some embodiments, each distal/terminal portion of main-water-dispersion-wellbore 401 may comprise one or more radial-wellbore(s) 303. In some embodiments, MOPR 200 may comprise at least one radial-wellbore 303. In some embodiments, MOPR 200 may comprise one or more radial-wellbore(s) 303. In some embodiments, radial-wellbore(s) 303 may be constructed by jet drilling from the distal/terminal portions of main-water-dispersion-wellbore 401, in a generally horizontal/lateral direction, away from main-water-dispersion-wellbore 401 and within water-dispersion-zone 409. This jet drilling process is discussed in U.S. utility patent application, patent application Ser. No. 17/068,724, by the same inventor (Henry Crichlow) as the present/instant patent application, and is incorporated by reference in its entirety as if fully set forth herein. As previously noted, in some embodiments, water-dispersion-zone 409 may be fractured to facilitate a greater rate of water uptake. In some embodiments, step 1107 may progress into step 1111.

Continuing discussing FIG. 11, in some embodiments, step 1109 may be a step of constructing/placing one or more supplementary-water-collection-well(s) 305. Supplementary-water-collection-well(s) 305 may be as discussed above. In some embodiments, supplementary-water-collection-well(s) 305 may be smaller in diameter than a diameter of main-water-dispersion-wellbore 401. In some embodiments, supplementary-water-collection-well(s) 305 may incrementally extend to various heights/elevations within in the OPM portions of MOPR 200, as the LLW materials are disposed of within volume 201. In some embodiments, supplementary-water-collection-well(s) 305 may collect and direct water from rain (and/or other sources) down into fluid-transport-zone(s) 403 and/or crushed rock and gravel layer(s)/pad(s) 405. In this step 1109, multiple supplementary-water-collection-well(s) 305 may be disposed strategically across volume 201 to adequately remove water from volume 201. In some embodiments, the heights and/or diameters of these supplementary-water-collection-well(s) 305 may be dictated/determined by the design step 1103. In some embodiments, these supplementary-water-collection-well(s) 305 may be made with slotted, holed, and/or perforated type tubular goods which increases collection water rates throughout the full vertical length of the supplementary-water-collection-well(s) 305. In some embodiments, it is also possible to utilize non-metal pipes (e.g., plastic pipes) for supplementary-water-collection-well(s) 305, since there is a very low risk of any high hydrostatic or burst pressures in the supplementary-water-collection-well(s) 305 which are constantly being emptied into lower located drainage elements, such as, but not limited to, fluid-transport-zone(s) 403, crushed rock and gravel layer(s)/pad(s) 405, sand/gravel filter(s) 407, main-water-dispersion-wellbore(s) 401, radial-wellbore(s) 303, and/or water-dispersion-zone 409. In some embodiments, MOPR 200 may comprise at least one supplementary-water-collection-well 305. In some embodiments, MOPR 200 may comprise one or more supplementary-water-collection-well(s) 305. In some embodiments, a given supplementary-water-collection-well 305 may be configured to collect water reaching into volume 201, and to direct such collected water, vertically downwards to fluid-transport-zone 403 and/or to crushed rock and gravel layer/pad 405. In some embodiments, a given supplementary-water-collection-well 305 may be a plastic or metal (corrugated) pipe. In some embodiments, a given supplementary-water-collection-well 305 may be a plastic or metal (corrugated) vertical culvert. In some embodiments, a given supplementary-water-collection-well 305 may be similar to a vertical French-drain pipe. In some embodiments, a given supplementary-water-collection-well 305 may be mostly/substantially hollow, cylindrical, vertically installed pipe like member, with through perforations and/or slots (for water passage). In some embodiments, the perforations and/or the slots in a cylindrical side-wall of a given supplementary-water-collection-well 305 may be configured to permit water passage from outside the given supplementary-water-collection-well 305 into the (mostly/substantially)

hollow interior of the given the given supplementary-water-collection-well 305. In some embodiments, supplementary-water-collection-well(s) 305 may be installed vertically (or at least mostly vertically) within volume 201. In some embodiments, initially installed supplementary-water-collection-well(s) 305 within volume 201, may have bottom portions in physical contact with fluid-transport-zone 403, crushed rock and gravel layer/pad 405, bottom 207, and/or side(s) 209. In some embodiments, a given supplementary-water-collection-well 305 may be taller (longer) than multiple vertically stacked layers of LLW cells 301. In some embodiments, after multiple vertically stacked layers of LLW cells 301 have been formed and filled within volume 201, additional supplementary-water-collection-well(s) 305 may be installed, vertically positioned, on top of those already formed and filled LLW cells 301. In some embodiments, step 1109 may progress into step 1111.

Continuing discussing FIG. 11, in some embodiments, step 1111 may be a step of preparing and/or constructing one or more fluid-transport-zone(s) 403. Fluid-transport-zone(s) 403 may be as already discussed. Crushed rock and gravel layer(s)/pad(s) 405 may be as already discussed. In some embodiments, execution of step 1111 may implement fluid-transport-zone(s) 403, crushed rock and gravel layer(s)/pad(s) 405, and/or liner(s) 913 along at least the bottom 207 exterior surfaces and/or along the exterior surfaces of inclined walls (side(s) 209) of the OPM portion of MOPR 200 as shown in FIG. 9. In some embodiments, a given fluid-transport-zone 403 may be a high-water permeability gravel/sand combination layer (e.g., crushed rock and gravel layer(s)/pad(s) 405). In some embodiments, fluid-transport-zone 403 may (also) comprise at least one liner 913. In some embodiments, liner 913 may be a geo-synthetic layer that may be water impermeable. In some embodiments, fluid-transport-zone(s) 403, crushed rock and gravel layer(s)/pad(s) 405, and/or liner(s) 913 may direct the flows of water vertically and laterally downwards towards wellhead(s) 213 and/or towards entries of main-water-dispersion-wellbore(s) 401. In some embodiments, fluid-transport-zone(s) 403, crushed rock and gravel layer(s)/pad(s) 405, and/or liner(s) 913 may behave as a sump and/or as a localized sink of the OPM portions of MOPR 200. Note, in some embodiments, fluid-transport-zone(s) 403, crushed rock and gravel layer(s)/pad(s) 405, and/or liner(s) 913 may incrementally grow in size and extent (e.g., be increased and/or added onto) onto the exteriors surface of the OPM portions of MOPR 200 as the LLW materials gradually fills up volume 201.

Continuing discussing FIG. 11, in some embodiments, fluid-transport-zone(s) 403 may be configured to direct water to: wellhead(s) 213, sand/gravel filter(s) 407, and/or main-water-dispersion-wellbore(s) 401. In some embodiments, crushed rock and gravel layer(s)/pad(s) 405 may be configured to direct water to: wellhead(s) 213, sand/gravel filter(s) 407, and/or main-water-dispersion-wellbore(s) 401. In some embodiments, water impermeable liner(s) may be configured to direct water to: wellhead(s) 213, sand/gravel filter(s) 407, and/or main-water-dispersion-wellbore(s) 401. In some embodiments, fluid-transport-zone(s) 403, crushed rock and gravel layer(s)/pad(s) 405, and/or the water impermeable liner(s), may generally line/cover bottom exterior surfaces of volume 201 of the OPM of MOPR 200. In some embodiments, fluid-transport-zone(s) 403, crushed rock and gravel layer(s)/pad(s) 405, and/or the water impermeable liner(s), may generally line/cover bottom exterior surfaces of bottom 207 and/or side(s) 209 of the OPM of MOPR 200. In some embodiments, MOPR 200 may comprise at least one fluid-transport-zone 403. In some embodiments, MOPR 200 may comprise one or more fluid-transport-zone(s) 403. In some embodiments, the OPM of MOPR 200 may comprise at least one fluid-transport-zone 403. In some embodiments, the OPM of MOPR 200 may comprise one or more fluid-transport-zone(s) 403. In some embodiments, MOPR 200 may comprise at least one crushed rock and gravel layer/pad 405. In some embodiments, MOPR 200 may comprise one or more crushed rock and gravel layer(s)/pad(s) 405. In some embodiments, the OPM of MOPR 200 may comprise at least one crushed rock and gravel layer/pad 405. In some embodiments, the OPM of MOPR 200 may comprise one or more crushed rock and gravel layer(s)/pad(s) 405. In some embodiments, fluid-transport-zone 403 may comprise at least one crushed rock and gravel layer/pad 405. In some embodiments, fluid-transport-zone 403 may comprise one or more crushed rock and gravel layer(s)/pad(s) 405. In some embodiments, fluid-transport-zone 403 may comprise at least one water impermeable liner. In some embodiments, fluid-transport-zone 403 may comprise one or more water impermeable liner(s). In some embodiments, fluid-transport-zone 403 may comprise at least one: crushed rock and gravel layer/pad 405; and/or water impermeable liner. In some embodiments, fluid-transport-zone 403 may comprise at one or more of: crushed rock and gravel layer(s)/pad(s) 405; and/or water impermeable liner(s). In some embodiments, a first/bottom most fluid-transport-zone 403 may be located/installed on top of exterior surfaces of bottom 207 and/or of side(s) 209. In some embodiments, a first/bottom most crushed rock and gravel layer/pad 405 may be located/installed on top of exterior surfaces of bottom 207 and/or of side(s) 209. In some embodiments, a first/bottom most water impermeable liner may be located/installed on top of exterior surfaces of bottom 207 and/or of side(s) 209. In some embodiments, a first/bottom most crushed rock and gravel layer/pad 405 may be located/installed on top of exterior surfaces of the first/bottom most water impermeable liner. In some embodiments, when fluid-transport-zone 403 may comprise at least one water impermeable liner, the water impermeable liner may be disposed between bottom 207/side(s) 209 and crushed rock and gravel layer/pad 405, with crushed rock and gravel layer/pad 405 being on top, bottom 207/side(s) 209 being on the bottom, and the water impermeable liner being sandwiched in the middle. In some embodiments, the first/bottom most LLW cells 301 may be formed on top of the first/bottom most fluid-transport-zone 403. In some embodiments, the first/bottom most LLW cells 301 may be formed on top of the first/bottom most crushed rock and gravel layer/pad 405. In some embodiments, the first/bottom most LLW cells 301 may be formed on top of the first/bottom most water impermeable liner. In some embodiments, on top of the first/bottom most fluid-transport-zone 403, crushed rock and gravel layer/pad 405, and/or liner may be: the first/bottom most LLW cells 301 and/or cell-floor-ceiling-material 601. See also, FIG. 4, FIG. 6, FIG. 7, and/or FIG. 9. In some embodiments, step 1111 may progress into method 1200 (such as, into step 1201 and/or into step 1203). In some embodiments, step 1111 may be a final (last step) of method 1100.

Figure 12:
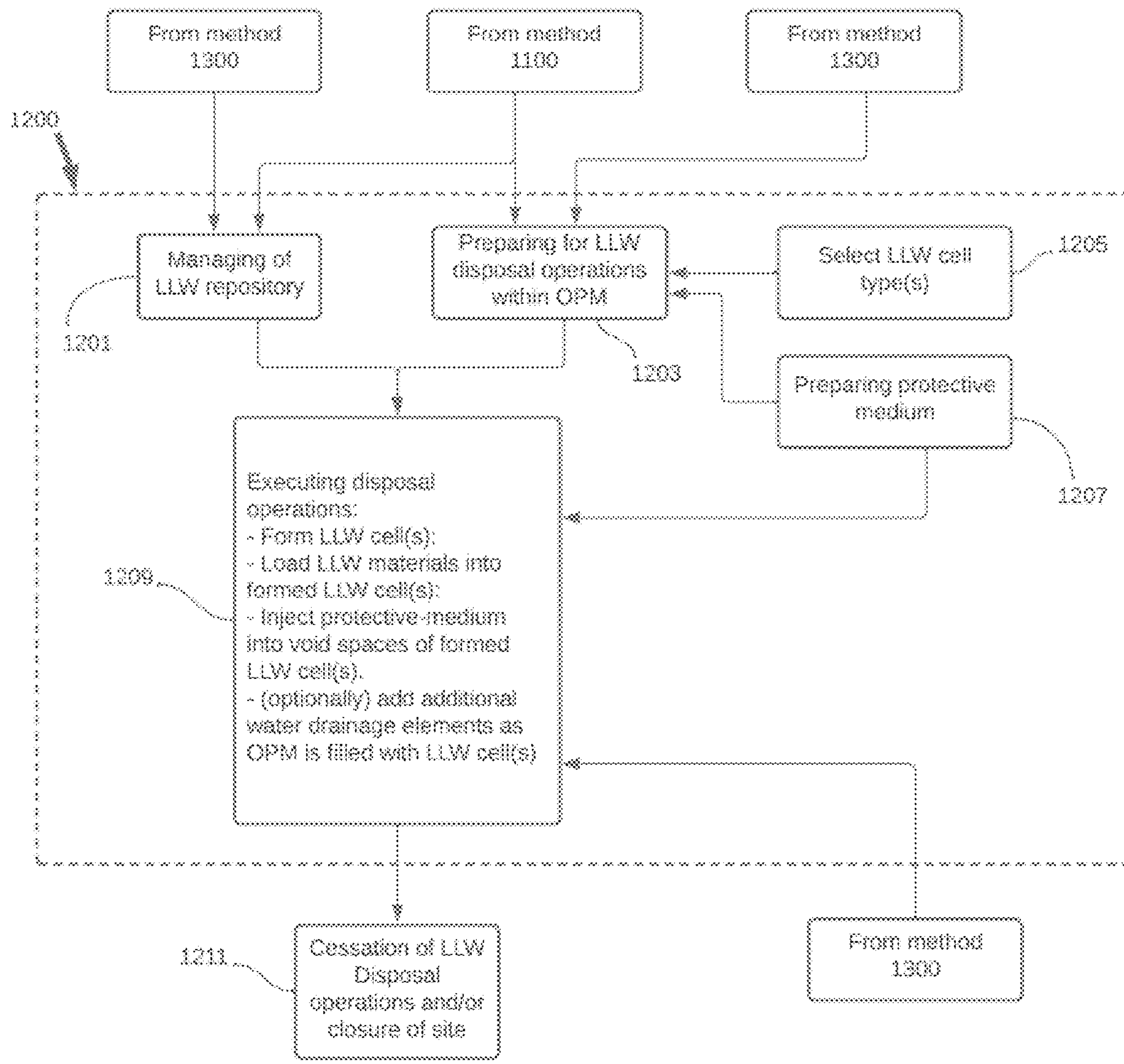
FIG. 12 is a flow diagram depicting a method of disposing of LLW materials within a MOPR.

FIG. 12 is a flow diagram depicting a method 1200. FIG. 12 is a flow diagram depicting at least one step of method 1200. In some embodiments, method 1200 may be a method of disposing of LLW materials within a MOPR 200 (modified open pit repository 200). In some embodiments, method 1200 may comprise one or more steps of: step 1201, step 1203, step 1205, step 1207, step 1209, step 1211, portions thereof, combinations thereof, and/or the like. In some embodiments, one or more of these steps may be omitted. In some embodiments, one or more of these steps may be executed out of numerical order. In some embodiments, one or more of these steps may be repeated.

Continuing discussing FIG. 12, in some embodiments, step 1201 may be a step of managing operations of the LLW repository. In some embodiments, step 1201 may be a step of managing operations of a given MOPR 200. In some embodiments, step 1201 may be a step of managing the activities at the disposal site of MOPR 200. In some embodiments, this step 1201 may occur at the site of MOPR 200 and/or may be remotely implemented. In some embodiments, at least some execution of step 1201 may occur onsite at the given MOPR 200. In some embodiments, at least some execution of step 1201 may occur remotely from the given MOPR 200. In some embodiments, this step 1201 may involve coordination and control of multiple processes such as loading, unloading, stacking, disposal cell building, communication between multiple operators, various operations, portions thereof, combinations thereof, and/or the like. In some embodiments, step 1201 may progress into step 1203 and/or into step 1209.

Continuing discussing FIG. 12, in some embodiments, step 1203 may be a step of prepping and/or preparing for LLW disposal operations at a given MOPR 200. In some embodiments, step 1203 may entail making sure a proper/appropriate protective-medium 505 may available and ready for use for the intended LLW disposal operations within the given MOPR 200. In some embodiments, step 1203 may entail making sure proper/appropriate LLW cell(s) 301 have been selected for implementation within the given MOPR 200. In some embodiments, step 1203 may entail making sure proper/appropriate materials for construction of LLW cell(s) 301 may be available and ready for implementation within the given MOPR 200. In some embodiments, step 1203 may entail making sure that LLW materials are available and ready onsite at the given MOPR 200 for intended disposal operations within the given MOPR 200 (see e.g., FIG. 13 and method 1300). In some embodiments, step 1203 may entail making sure that proper/appropriate equipment and/or materials are available and ready for one or more of: LLW cell(s) 301 construction within the given MOPR 200; filling of the constructed LLW cell(s) 301 with LLW materials; further filling of constructed LLW cell(s) that have already been filled with the LLW material with protective-medium 505; portions thereof; combinations thereof; and/or the like. In some embodiments, such equipment may include one or more of: truck(s), scaffolding, material handling equipment, crane(s), forklift(s), pump(s), radiation shielding equipment, portions thereof, combinations thereof, and/or the like. In some embodiments, step 1203 may progress into step 1201 and/or into step 1209.

Continuing discussing FIG. 12, in some embodiments, step 1205 may be a step of selecting a type, characteristic, and/or property of the LLW cell(s) 301 to be implemented within the given MOPR 200. In some embodiments, step 1205 may be a step of selecting between the LLW cell(s) 301 of FIG. 4 (and/or of FIG. 6) or of FIG. 7. FIG. 4 and FIG. 6 shows LLW cell(s) 301 in a block (or block like) configuration, wherein blocks of LLW cells 301 may be stacked vertically and/or laid out horizontally at a given elevation with the given MOPR 200. FIG. 7 shows LLW cell(s) 301 arranged in horizontal sheets/layers configuration, wherein the LLW cells 301 are laid down in a (first) horizontal sheet/layer at a given (first) elevation within the given MOPR 200 before moving on a new (second) sheet/layer at a different (second) elevation within the given MOPR 200. In some embodiments, because of the large areal size of bottom 207 and/or of bottom surfaces of side(s) 209, it may be possible that both types of LLW cell 301 disposal schemes (e.g., block and layer/sheet) may occur either simultaneously at different places within volume 201 of that OPM of the given MOPR 200; and/or both types of LLW cell 301 disposal schemes (e.g., block and layer/sheet) may occur in sequential operations within volume 201 of that OPM of the given MOPR 200. In some embodiments, step 1205 may progress into step 1203.

Continuing discussing FIG. 12, in some embodiments, step 1207 may be a step of preparing, compounding, blending, mixing, forming, and/or constructing the protective-medium 505 for intended use in filling in the void spaces within the formed LLW cell(s) 301 that have already received LLW materials, within that given MOPR 200. In some embodiments, it may be desirable to provide a suitable immersive protective-medium 505 to protect, mitigate, and/or prevent migration of radionuclides away from the disposed LLW materials within the formed and filled LLW cells 301. For further details of step 1207 see FIG. 14 and the FIG. 14 discussion below. In some embodiments, step 1207 may progress into step 1203 and/or into step 1209.

Continuing discussing FIG. 12, in some embodiments, step 1209 may be a step of executing the disposal operations at the given MOPR 200. In some embodiments, step 1209 may comprise: (1) forming/constructing the (selected) LLW cell(s) 301 within the given MOPR 200; (2) filling those formed LLW cell(s) 301 with LLW materials; and (3) filling void spaces in the formed LLW cell(s) 301 that have already received LLW materials with protective-medium 505. In some embodiments, step 1209 may be a step of implementing the (selected) type(s) and/or geometries of disposal LLW cell(s) 301; e.g., as shown in FIG. 3, FIG. 4, FIG. 5, FIG. 6, FIG. 7, FIG. 8, and/or FIG. 9. In some embodiments, the LLW cell(s) 301 may be formed/constructed using divider(s) 302 and/or cell-floor-ceiling-material 601. In some embodiments, the LLW materials may be inserted (loaded) into the formed LLW cell(s) 301 with various material handling equipment such as, but not limited to, material conveyor systems, drum/bag dischargers, dumpers, control systems, portions thereof, combinations thereof, and/or the like. In some embodiments, step 1209 may be a step of physically and mechanically implementing the disposal of LLW materials within the predetermined types and/or geometries of disposal LLW cell(s) 301; e.g., as shown in FIG. 3, FIG. 4, FIG. 5, FIG. 6, FIG. 7, FIG. 8, and/or FIG. 9. In some embodiments, the protective-medium 505 may be inserted into the void spaces of formed LLW cell(s) 301 that have LLW material inside of the given formed LLW cell(s) 301, via cement/slurry pump(s) to insert the protective-medium 505. In some embodiments, step 1209 may progress from the bottom 207 upwards, as the lower elevation regions of volume 201 are filled up with formed and filled LLW cell(s) 301. In some embodiments, step 1209 may optionally include adding additional (water) drainage elements to the volume 201 of the given MOPR 200 as necessary/desired, as that volume 201 gets filled up with formed and filled LLW cell(s) 301. In some embodiments, these additional (water) drainage elements may comprise one or more of: additional supplementary-water-collection-well(s) 305 (at higher elevations within volume 201 of MOPR 200); additional fluid-transport-zone(s) 403 (at higher elevations within volume 201 of MOPR 200); additional crushed rock and gravel layer(s)/pad(s) 405 (at higher elevations within volume 201 of MOPR 200); liner(s); portions thereof; combinations thereof; and/or the like. In some embodiments, step 1209 may progress into step 1211.

Continuing discussing FIG. 12, in some embodiments, step 1211 may be a step of cessation of disposal operations at the given MOPR 200. In some embodiments, step 1211 may be a step of stopping disposal operations at the given MOPR 200. In some embodiments, disposal operations at a given MOPR 200 may cease/stop, once volume 201 of that MOPR 200 has been filled to a predetermined fill level. In some embodiments, step 1211 may be a step of closing the disposal site (MOPR 200) after completing the disposal of millions of pounds of LLW materials within formed LLW cells 301 within volume 201 of the OPM portions of that MOPR 200. In some embodiments, it is contemplated that closure of a given filled MOPR 200 may occur many years or even decades after the initial start of disposal operations. In some embodiments, suitable/appropriate barrier(s), notice(s), signage, and/or marking(s) may be placed in and around the closed MOPR 200 site to warn and deter unintended and/or undesirable intrusions of people and/or animals.

Figure 13:
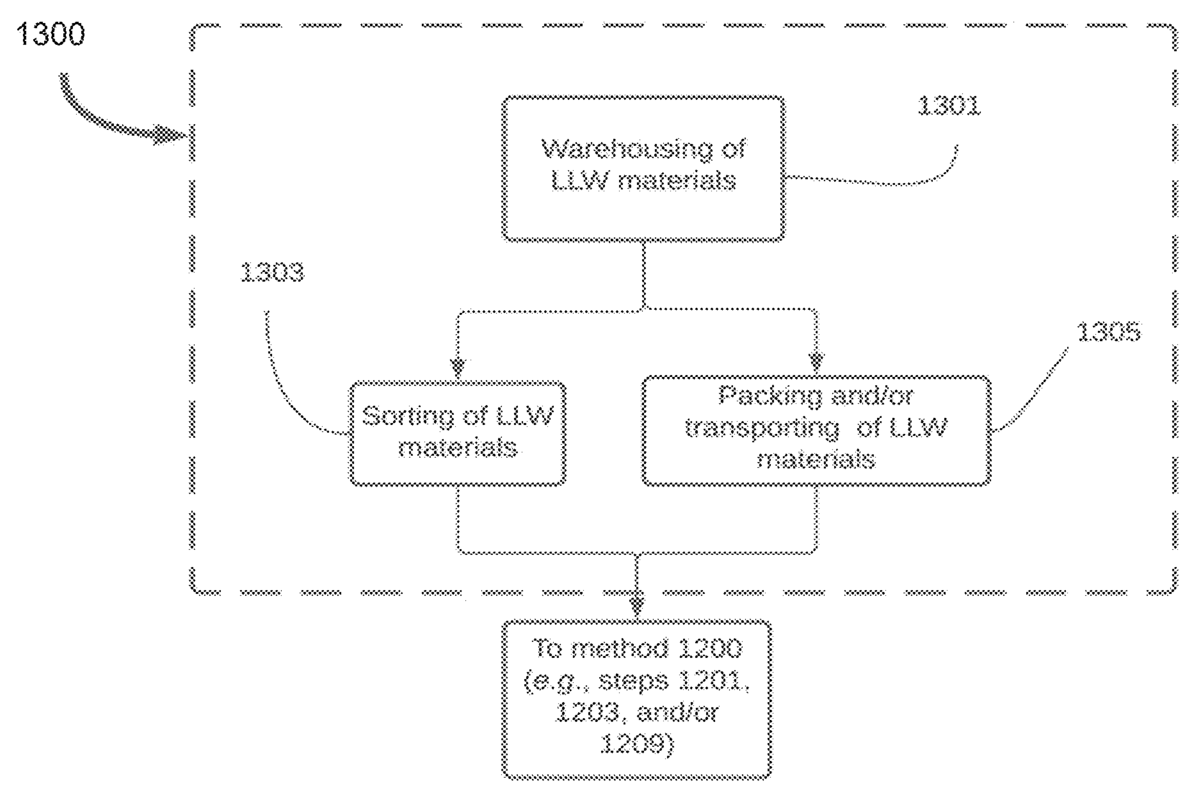
FIG. 13 is a flow diagram depicting a method of warehousing (which may be for temporary storage), preparing, organizing, sorting, and/or transporting LLW materials for eventual disposal within a MOPR.

FIG. 13 is a flow diagram depicting a method 1300. FIG. 13 is a flow diagram depicting at least one step of method 1300. In some embodiments, method 1300 may be a method of preparing, organizing, sorting, and/or transporting LLW materials for eventual disposal within a MOPR 200. In some embodiments, method 1300 may comprise one or more steps of: step 1301, step 1303, step 1305, portions thereof, combinations thereof, and/or the like. In some embodiments, one or more of these steps may be omitted. In some embodiments, one or more of these steps may be executed out of numerical order. In some embodiments, one or more of these steps may be repeated.

Continuing discussing FIG. 13, in some embodiments, step 1301 may be a step of warehousing LLW materials. In some embodiments, step 1301 may be a step of warehousing the LLW materials/products. In some embodiments, in step 1301 the incoming LLW materials from multiple/different sources may be aggregated at least one (or one or more) centralized location(s), such as a warehouse facility. In some embodiments, a location of a given warehouse facility may be remote from a given MOPR 200 site and readily accessible by a multiplicity (plurality) of transport means such as, but not limited to, road(s), rail(s), water, portions thereof, combinations thereof, and/or the like. In some embodiments, step 1301 may be a step of temporarily storing LLW materials one or more warehouse facilities. In some embodiments, the warehouse facilities may be located remotely from the given MOPR 200 and/or proximate (adjacent) to the given MOPR 200. In some embodiments, the warehouse facilities may be accessed by road (and motor vehicle [e.g., trucks]); by rail (via train); and/or by water (via a ship and/or barge). In some embodiments, road(s), rail(s), and/or waterways may link a given warehouse facility (that temporarily stores the LLW materials) to a given MOPR 200. In some embodiments, the warehouse facilities are intended to store the LLW materials only temporarily, until those LLW materials may be (permanently) disposed of within a given MOPR 200. In some embodiments, step 1301 may progress into step 1303 and/or into step 1305.

Continuing discussing FIG. 13, in some embodiments, step 1303 may be a step of sorting the LLW materials/products. In some embodiments, in step 1303 the (warehoused) LLW materials/products may be sorted. By sorting the LLW materials/products, LLW cell 301 loading of such sorted LLW materials/products may be more efficient and/or optimized with respect to LLW materials loading times and use of space in volume 201. This sorting process may be operationally more effective in helping to provide better management of the work force and/or equipment at the MOPR 200 disposal site, since handling heavy LLW waste requires a different combination of manpower/equipment than handling light and/or bulky waste items of LLW waste. In some embodiments, this step 1303 of sorting the LLW materials/products may minimize ongoing operational costs of a given MOPR 200 disposal site that is being fed sorted LLW materials from method 1300. In some embodiments, the LLW materials may be sorted by one or more of: type, size, shape, mass, weight, density, dryness, phase, compaction (compressed or not), radioactivity, holding container (e.g., drum/barrel 131/133), temperature, heat output, portions thereof, combinations thereof, and/or the like. Recall, the "Background of the Invention" section discussed and noted various different types of LLW materials/products. Like elements, properties, and/or characteristics of LLW materials may be sorted together and separated from LLW materials with dissimilar elements, properties, and/or characteristics. In some embodiments, step 1303 may progress into step 1305, into step 1201, and/or into step 1203.

Continuing discussing FIG. 13, in some embodiments, step 1305 may be a step of packing, packaging, and/or transporting the LLW materials. In some embodiments, prior to step 1305, the LLW material may have been previously sorted via step 1303. In some embodiments, step 1305 may be executed before step 1303. In some embodiments, step 1305 may be a step of packing the (sorted) LLW materials/products. In some embodiments, in step 1305 bulky, voluminous, and/or compressible LLW materials may be compressed using the compressors discussed earlier in relation to FIG. 1G. By compressing the LLW materials, more LLW materials maybe loaded (inserted) into a given LLW cell 301. By compressing the LLW materials, better packing inside the operating volume 201 of the given OPM portions of MOPR 200 may be realized. In some embodiments, in step 1305 LLW material(s) may be filled and sealed into (uncrushed) drum(s) 133. In some embodiments, in step 1305, (uncrushed) drum(s) 133 that may be filled and sealed with LLW materials, may then be compacted/compressed into crushed-drum(s) 131. In some embodiments, in step 1305, the packaged LLW materials (e.g., within drum(s) 131/133) may be transported from the temporary warehouse facilities to the given MOPR 200. In some embodiments, transportation in step 1305 may occur by one or more of: truck, train, ship, barge, portions thereof, combinations thereof, and/or the like. In some embodiments, step 1305 may culminate with the packaged (and/or sorted) LLW materials arriving at the given MOPR 200 (e.g., for subsequent disposal operation via method 1200). In some embodiments, step 1305 may progress into step 1303, into step 1201, and/or into step 1203.

Figure 14:
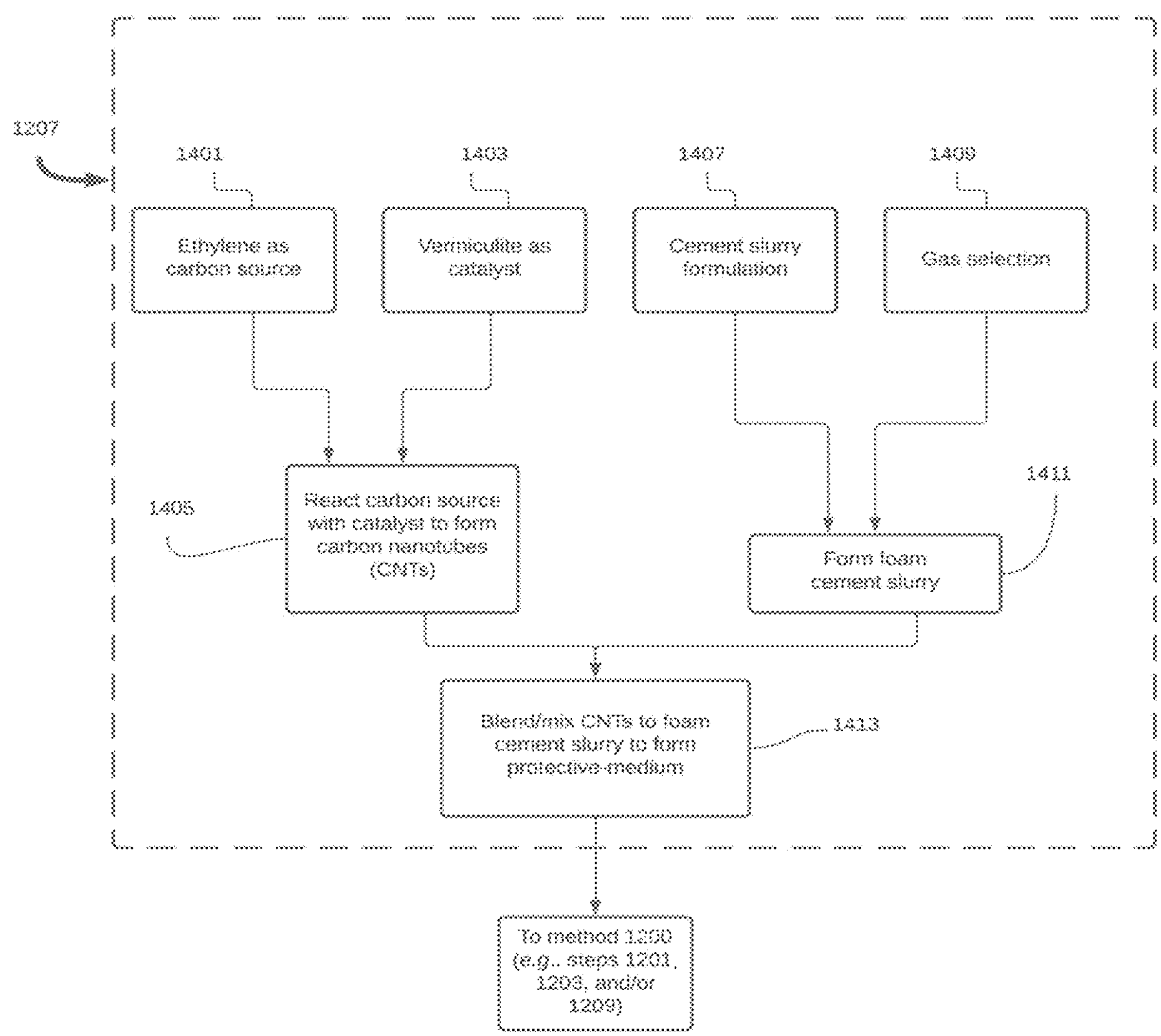
FIG. 14 may depict a flow chart showing manufacturing process(es) for making protective-medium that may be used in void spaces of LLW cell(s).

FIG. 14 is a flow diagram depicting details (sub-step(s)) of step 1207. FIG. 14 may depict a flow chart showing protective-medium 505 manufacturing process(es). FIG. 14 is a flow diagram depicting at least one sub-step of step 1207. In some embodiments, step 1207 may be a step/method of preparing, compounding, blending, mixing, forming, and/or constructing a given protective-medium 505 for use in filling in void spaces within formed LLW cell(s) 301 that have received LLW materials, within a given MOPR 200. In some embodiments, step 1207 may comprise one or more sub-steps of: sub-step 1405, sub-step 1411, sub-step 1413, portions thereof, combinations thereof, and/or the like. In some embodiments, one or more of these sub-steps may be omitted. In some embodiments, one or more of these sub-steps may be executed out of numerical order. In some embodiments, one or more of these sub-steps may be repeated.

Continuing discussing FIG. 14, in some embodiments, sub-step 1405 may be a sub-step of reacting ethylene 1401 (as a carbon source) with vermiculite 1403 (as a catalyst) to output/form carbon nanotubes (CNTs), such as, CNTs 1001. In some embodiments, sub-step 1405 may be implemented (executed) (at least in part) within at least one fluidized bed reactor (and/or the like). In some embodiments, sub-step 1405 may occur in a fluidized bed type reactor in which the catalyst (e.g., vermiculite 1403) and a carbon source (e.g., ethylene 1401) may be reacted together to produce the carbon nanotube materials (e.g., CNTs 1001); e.g., as shown in FIG. 10. In some embodiments, the carbon source for producing CNTs 1001 may be a readily available hydrocarbon. In some embodiments, the hydrocarbon may be ethylene 1401 because of ethylene 1401 may be readily available, easy to use, and/or generally affordable (cost effective). In some embodiments, prior to reacting the carbon source (e.g., ethylene 1401) with the catalyst (e.g., vermiculite 1403) the catalyst may be prepared and/or processed. In some embodiments, the catalyst may be vermiculite (e.g., vermiculite 1403). In some embodiments, sub-step 1405 may progress into sub-step 1413.

Continuing discussing FIG. 14, in some embodiments, sub-step 1411 may be a sub-step of forming a given foam cement slurry. In some embodiments, sub-step 1411 may entail using a selected cement slurry formulation 1407. In some embodiments, cement slurry formulation 1407 may be selected based on chemistry considerations and/or on cost considerations. In some embodiments, sub-step 1411 may entail using a selected gas 1409. In some embodiments, gas 1409 may be one or more predetermined types of gasses. In some embodiments, gas 1409 may be one or more of: a generally non-reactive gas; a generally non-corrosive gas; a generally non-oxidative gas; air; nitrogen; carbon dioxide; portions thereof; combinations thereof; and/or the like. In some embodiments, the generally non-reactive, non-corrosive, and/or non-oxidative gas (gasses) may be with respect to: materials within cement slurry formulation 1407; CNTs 1001 materials; LLW cell 301 materials; LLW materials; drum 131/133 materials; portions thereof; combinations thereof; and/or the like. In some embodiments, in sub-step 1411, the selected cement slurry formulation 1407 may be blended and/or mixed with the selected gas 1409. In some embodiments, in sub-step 1411, the selected gas 1409 may be pumped into the selected cement slurry formulation 1407 and mixed/blended. In some embodiments, sub-step 1411 may progress into sub-step 1413.

Continuing discussing FIG. 14, in some embodiments, sub-step 1413 may be a sub-step of mixing and/or blending the output from step 1404 (e.g., CNTs 1001) with the output of step 1411 (e.g., a formed foam cement slurry) to form a given protective-medium 505. In some embodiments, sub-step 1413 may be a sub-step of mixing and/or blending the CNTs 1001 with the formed foam cement slurry to form a given protective-medium 505. In some embodiments, sub-step 1413 may be (mostly/substantially) a mechanical blending process. Mechanical blenders are readily available and are easily transported to the MOPR 200 disposal repository site. In some embodiments, a mix/ratio of CNTs 1001 to foam cement slurry may be determined based on the compressive strength of the foam cement needed/desired; and/or and also on an expected/anticipated level of expected radioactivity in the LLW materials disposed of within volume 201 (within LLW cells 301). Higher radioactive levels of LLW materials may require a higher concentration of CNTs 1001 materials in protective-medium 505 for appropriate containment by mitigation/absorption of radionuclides. In some embodiments, a weight range CNTs 1001 materials in protective-medium 505 for the disposal of LLW materials may be selected from a range of 0.01% to 10% CNTs 1001 materials (by weight). In some embodiments, sub-step 1413 may be implemented (executed) at the MOPR 200 disposal site. In some embodiments, it may be convenient/desirable to execute sub-step 1413 onsite (i.e., at the MOPR 200 disposal site); as doing so may minimize some transportation costs and/or also allow for on-the-fly changes in the properties of protective-medium 505 as dictated by changes in the types and/or quantities of LLW material being disposed at that MOPR 200 disposal site. In some embodiments, sub-step 1413 may progress into step 1203 and/or into step 1209 (see e.g., FIG. 12 and method 1200).

In some embodiments, a method for disposing of LLW may comprise steps of: (a) selecting or building at least one OPM (see e.g., step 1101); (b) adding a water drainage system to the at least one OPM to convey water away from volume 201 of the at least one OPM (see e.g., steps 1105 to 1111); (c) forming at least one LLW cell 301 within volume 201 of the at least one OPM (see e.g., step 1209); (d) loading the at least one LLW cell 301 with at least one unit of LLW (see e.g., step 1209); and (e) inserting protective-medium 505 into the at least one LLW cell 301 such that protective-medium 505 fills in void spaces around the at least one unit of LLW (see e.g., step 1209). In some embodiments, the at least one OPM may be preexisting or newly built. In some embodiments, the steps (a) through (e) may occur in sequential order. In some embodiments, the steps (c), (d), and (e) may be repeated until volume 201 is at least mostly filled with a plurality of LLW cells 301, wherein the plurality of cells includes the at least one LLW cell 301. In some embodiments, the repeating of the steps (c), (d), and (e) is carried from bottom 207 of volume 201 towards top 205 of volume 201.

In some embodiments, the water drainage system of the LLW disposal method may comprise at least one main-water-dispersion-wellbore 401 and at least one fluid-transport-zone 403. In some embodiments, the water drainage system may further comprise at least one water-injection-wellbore 303 (radial-wellbore 303). In some embodiments, the water drainage system may further comprise at least one supplementary-water-collection-well 305. In some embodiments, the water drainage system may further comprise at least one filter 407.

In some embodiments, the LLW disposal method may further comprise a step of fracturing at least a portion of the particular geologic formation (water-dispersion-zone 409) that may be proximate to a distal portion of the at least one main-water-dispersion-wellbore 401 that is located within the particular geologic formation (water-dispersion-zone 409) to increase a capacity of the particular geologic formation (water-dispersion-zone 409) to receive water (see e.g., step 1103).

In some embodiments, the LLW disposal method may further comprise a step of fracturing at least a portion of the particular geologic formation (water-dispersion-zone 409) that may be proximate to radial-wellbore(s) 303 that may be located within the particular geologic formation (water-dispersion-zone 409) to increase a capacity of the particular geologic formation (water-dispersion-zone 409) to receive water (see e.g., step 1103).

In some embodiments, as volume 201 may be filled with a plurality of LLW cells 301, the LLW disposal method may further comprise a step of adding in additional (water drainage) elements to the water drainage system (see e.g., step 1209). In some embodiments, these additional elements may be one or more of: water-dispersion-wellbores 401, water-injection-wellbores 303, fluid-transport-zones 403, supplementary-water-collection-wells 305, liners 913, sand/gravel filters 407, or sand/gravel layers 405.

In some embodiments, prior to the step (c) the LLW disposal method may further comprise a step of selecting a type of LLW cell 301 to form within volume 201 (see e.g., step 1205). In some embodiments, the type of LLW cell 301 may be one or more of: a block type (see e.g., FIG. 4 and/or FIG. 6) or a layered type (see e.g., FIG. 7). When the block type is viewed from above the at least one LLW cell 301 has a shape that may be substantially (mostly) polygonal (see e.g., FIG. 3, FIG. 4, FIG. 5, and/or FIG. 6). In implementing the layered type, at least some LLW cells 301 selected from a plurality of LLW cells 301 may be laid down within volume 201 in a (first) horizontal layer configuration, with other/different LLW cells 301 selected from the plurality of LLW cells 301 being subsequently laid down within volume 201 in another/different (second) horizontal layer configuration. The second (later) layer of LLW cells 301 may be on top of the first (earlier) layer of LLW cells 301. See e.g., FIG. 7.

In some embodiments, MOPR 200 may comprise one or more of: an OPM; main-water-dispersion-wellbore(s) 401 (located below the OPM); radial/injection wellbore(s) 303 (located within water-dispersion-zone 409); supplementary-water-collection-well(s) 305 (located within volume 201); fluid-transport-zone(s) 403 (located within volume 201); crushed rock and gravel layer(s)/pad(s) 405 (located within volume 201); liner(s) 913 (located within volume 201); sand/gravel filter(s) 407; formed LLW cell(s) 301 (located within volume 201); divider(s) 302 (located within volume 201); cell-floor-ceiling-material 601 (located within volume 201); LLW materials (within formed LLW cell(s) 301); crushed-drum(s) 131 (within formed LLW cell(s) 301); (uncrushed) drum(s) 133 (within formed LLW cell(s) 301); LLW material 501 (within formed LLW cell(s) 301); LLW material 503 (within formed LLW cell(s) 301); protective-medium 505 (within formed LLW cell(s) 301 but around otherwise void spaces around LLW materials therein); portions thereof; combinations thereof; and/or the like. In some embodiments, such a system may also further comprise fractured portions of water-dispersion-zone(s) 409.

MOPR 200 may be a system for disposing of LLW, within LLW cell(s) 301, wherein LLW cell(s) 301 with LLW materials inside, may reside within volume 201 of MOPR 200. In some embodiments, such a system may comprise one or more of: an OPM; main-water-dispersion-wellbore(s) 401 (located below the OPM); radial/injection wellbore(s) 303 (located within water-dispersion-zone(s) 409); supplementary-water-collection-well(s) 305 (located within volume 201); fluid-transport-zone(s) 403 (located within volume 201); crushed rock and gravel layer(s)/pad(s) 405 (located within volume 201); liner(s) 913 (located within volume 201); sand/gravel filter(s) 407; formed LLW cell(s) 301 (located within volume 201); divider(s) 302 (located within volume 201); cell-floor-ceiling-material 601 (located within volume 201); LLW materials (within formed LLW cell(s) 301); crushed-drum(s) 131 (within formed LLW cell(s) 301); (uncrushed) drum(s) 133 (within formed LLW cell(s) 301); LLW material 501 (within formed LLW cell(s) 301); LLW material 503 (within formed LLW cell(s) 301); protective-medium 505 (within formed LLW cell(s) 301 but around otherwise void spaces around LLW materials therein); portions thereof; combinations thereof; and/or the like. In some embodiments, such a system may also further comprise fractured portions of water-dispersion-zone(s) 409.

In some embodiments, a system for disposing of LLW may comprise at least one: OPM, main-water-dispersion-wellbore 401, fluid-transport-zone 403, and LLW cell 301. In some embodiments, the at least one OPM may be preexisting or newly built. In some embodiments, the system may further comprise protective-medium 505. In some embodiments, the system may further comprise at least one (sand/gravel) filter 407. In some embodiments, the system may further comprise at least one water-injection-wellbore 303 (radial-wellbore 303). In some embodiments, the system may further comprise at least one supplementary-water-collection-well 305. In some embodiments, the system may further comprise the at least one unit of LLW. In some embodiments, the at least one unit of LLW may be in the form of a drum 133 that contains an amount of the LLW. In some embodiments, the drum may be crushed to generate crushed-drum 131 (which may still contain the amount of LLW).

Note, FIG. 3, FIG. 5, and FIG. 8 may be at least substantially (mostly) orthogonal to FIG. 4, FIG. 6, FIG. 7, and FIG. 9.

Note, in some embodiments, because of heat given off by the disposed of LLW materials within volume 201, water draining out of volume 201 (and into water-dispersion-zone 409) need not be protected from freezing and clogging the drainage system during times when ambient environmental air temperatures may be below freezing. That is, the drainage system of MOPR 200 may not need insulation and/or heaters to prevent water freezing in the drainage system.

Systems and methods for low-level nuclear/radioactive waste (LLW) disposal have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for disposing of low-level radioactive waste, wherein the method comprises steps of:

(a) selecting or building at least one open-pit-mine;

(b) adding a water drainage system to the at least one open-pit-mine to convey water away from a volume of the at least one open-pit-mine, wherein the water drainage system comprises at least one water impermeable liner that lines at least a portion of a boundary of the at least one open-pit-mine;

(c) forming at least one cell within the volume of the at least one open-pit-mine;

(d) loading the at least one cell with at least one unit of the low-level radioactive waste; and (e) inserting a protective-medium into the at least one cell such that the protective-medium fills in void spaces around the at least one unit of the low-level radioactive waste.

2. The method according to claim 1, wherein the steps (c), (d), and (e) are repeated until the volume is at least mostly filled with a plurality of cells until the volume is more than half-way filled with the plurality of cells, wherein the plurality of cells includes the at least one cell.

3. The method according to claim 1, wherein the steps (c), (d), and (e) are carried out from a bottom of the volume towards a top of the volume.

4. The method according to claim 1, wherein the at least one open-pit-mine is substantially shaped as an inverted frustum that extends vertically downwards below a terrestrial surface of the Earth to a bottom the at least one open-pit-mine, wherein the at least one open-pit-mine has exterior surfaces that bound the volume from the bottom of the at least one open-pit-mine of to a top of the at least one open-pit-mine.

5. The method according to claim 1, wherein the water drainage system comprises:

at least one water-dispersion-wellbore that begins at a bottom of the at least one open-pit-mine and extends substantially vertically downwards into a particular geologic formation, wherein the at least one water-dispersion-wellbore is configured to convey water from the volume to the particular geologic formation; and at least one fluid-transport-zone that is located within the volume and disposed between at least some of exterior surfaces of the at least one open-pit-mine and the at least one cell, wherein the at least one fluid-transport-zone conveys water within the volume to an opening of the at least one water-dispersion-wellbore.

6. The method according to claim 5, wherein the water drainage system further comprises at least one water-injection-wellbore, wherein the at least one water-injection-wellbore extends from a distal portion of the at least one water-dispersion-wellbore, wherein the at least one water-injection-wellbore runs entirely within the particular geologic formation, wherein the at least one water-injection-wellbore is operatively connected to the distal portion, wherein the at least one water-injection-wellbore is configured to discharge water into the particular geologic formation.

7. The method according to claim 5, wherein the water drainage system further comprises at least one supplementary-water-collection-well, wherein at least one supplementary-water-collection-well is located within the volume, wherein supplementary-water-collection-well once installed within the volume is substantially oriented in a vertical configuration, such that a longitude of the at least one supplementary-water-collection-well is substantially vertical, wherein the at least one supplementary-water-collection-well is configured to transport received water to the at least one fluid-transport-zone.

8. The method according to claim 5, wherein the water drainage system further comprises at least one filter, wherein the at least one filter is located proximate to the opening of the at least one water-dispersion-wellbore, wherein the at least one filter is operatively connected to the opening of the at least one water-dispersion-wellbore, wherein the at least one filter is configured to filter out at least some particulates from at least some of the water that reaches the at least one water-dispersion-wellbore.

9. The method according to claim 5, wherein the method further comprises a step of fracturing at least a portion of the particular geologic formation that is proximate to a distal portion of the at least one water-dispersion-wellbore that is located within the particular geologic formation to increase a capacity of the particular geologic formation to receive water.

10. The method according to claim 1, wherein as the volume is filled with a plurality of cells, wherein the plurality of cells includes the at least one cell, the method further comprises a step of adding in additional elements to the water drainage system.

11. The method according to claim 10, wherein the additional elements are one or more of: water-dispersion-wellbores, water-injection-wellbores, fluid-transport-zones, supplementary-water-collection-wells, liners, sand/gravel filters, or sand/gravel layers.

12. The method according to claim 1, wherein the protective-medium is comprised of carbon nanotubes and a foam cement slurry.

13. The method according to claim 12, wherein the carbon nanotubes are formed from reacting a carbon source with a catalyst.

14. The method according to claim 13, wherein the carbon source is ethylene and the catalyst is vermiculite.

15. The method according to claim 12, wherein the carbon nanotubes are formed within a fluidized bed reactor.

16. The method according to claim 1, wherein sides vertical boundaries of the at least one cell, as viewed from above the at least one cell, are formed from one or more dividers.

17. The method according to claim 1, wherein prior to the step (c), the method comprises a step of selecting a type of cell to form within the volume.

18. The method according to claim 17, wherein the type of cell is one or more of: a block type or a layered type; wherein when the block type is viewed from above the at least one cell has a shape that is substantially polygonal; wherein in implementing the layered type, the at least one cell is a plurality of cells, wherein at least some cells selected from the plurality of cells are laid down in the volume in a horizontal layer configuration, with other cells selected from the plurality of cells being subsequently laid down in the volume in another horizontal layer configuration.

19. The method according to claim 1, wherein the at least one open-pit-mine is preexisting or newly built.

20. The method according to claim 1, wherein the steps (a) through (e) occur in sequential order.

* * * * *